(12) United States Patent
Ronzon et al.

(10) Patent No.: US 12,072,871 B2
(45) Date of Patent: Aug. 27, 2024

(54) SYSTEMS AND METHODS FOR GENERATING AN UPDATE CHARACTERISTIC VALUE FOR A CAPACITY PLAN HAVING MULTIPLE SUB-LEDGERS

(71) Applicant: Simnang IP, LLC, Farmington, UT (US)

(72) Inventors: Clement Ronzon, Conkal Yucatan (MX); Rhett M. Roberts, Kaysville, UT (US)

(73) Assignee: Simnang IP, LLC, Farmington, UT (US)

( * ) Notice: Subject to any disclaimer, the term of this patent is extended or adjusted under 35 U.S.C. 154(b) by 0 days.

(21) Appl. No.: 18/100,748

(22) Filed: Jan. 24, 2023

(65) Prior Publication Data
US 2024/0256524 A1 Aug. 1, 2024

(51) Int. Cl.
*G06F 16/23* (2019.01)
(52) U.S. Cl.
CPC ...... *G06F 16/2379* (2019.01); *G06F 16/2365* (2019.01)
(58) Field of Classification Search
CPC .......... G06F 16/2379; G06F 16/2365
See application file for complete search history.

(56) References Cited

U.S. PATENT DOCUMENTS

| | | | |
|---|---|---|---|
| 5,058,009 A | 10/1991 | Yoshino et al. | |
| 5,742,775 A * | 4/1998 | King | G06Q 40/00 705/38 |
| 6,190,256 B1 * | 2/2001 | Walker | G06Q 20/10 463/25 |
| 6,938,008 B1 * | 8/2005 | Stokes | G06Q 40/08 705/38 |
| 8,799,151 B2 | 8/2014 | Ang et al. | |
| 10,019,697 B2 | 7/2018 | Ang et al. | |

(Continued)

OTHER PUBLICATIONS

Citigroup, Inc., "Citi Flex Loan Access cash from your Citi card's existing credit line", https://www.citi.com/credit-cards/flex-loan' downloaded on Jan. 20, 2023 (Jan. 20, 2023).

(Continued)

*Primary Examiner* — Mariela Reyes
*Assistant Examiner* — Fatima P Mina
(74) *Attorney, Agent, or Firm* — Foley & Lardner LLP

(57) ABSTRACT

Systems, methods, and computer-readable storage media to calculate an update characteristic value for a capacity plan having multiple sub-ledgers. One system can include a communication network interface, a memory, and one or more processors. The memory can store a ledger to broadcast exchanges associated with the capacity plan. The one or more processors can identify a predetermined capacity plan characteristic value indicating a minimum update per cycle value for the capacity plan or a time period for completion of an update of a value of the capacity plan to zero. The one or more processors can calculate an update characteristic value for updating the value of the capacity plan to zero. The one or more processors can transmit, via the communication network interface, a record comprising the update characteristic value.

20 Claims, 38 Drawing Sheets

(56) References Cited

U.S. PATENT DOCUMENTS

| | | | |
|---|---|---|---|
| 2006/0178990 A1* | 8/2006 | Suzuki | G07F 15/12 |
| | | | 705/42 |
| 2007/0250442 A1 | 10/2007 | Hogan et al. | |
| 2009/0030819 A1 | 1/2009 | Vanleeuwen | |
| 2014/0324647 A1* | 10/2014 | Iyoob | G06Q 10/06 |
| | | | 705/30 |
| 2016/0210637 A1* | 7/2016 | Kumar | G06Q 40/12 |
| 2016/0371661 A1* | 12/2016 | Shah | G06Q 20/3674 |
| 2017/0046667 A1 | 2/2017 | Feng et al. | |
| 2020/0241929 A1 | 7/2020 | Arrasjid et al. | |

OTHER PUBLICATIONS

Karp, "Citi Flex Plan: What It Is and How It Works", Nerdwallet, Dec. 7, 2021, https://www.nerdwallet.com/article/credit-cards/citi-flex-plan-what-it-is-and-how-it-works.

Papandrea, "What Is a Citi Flex Plan and How Does It Work?", The Balance Money, Mar. 22, 2022, https://www.thebalancemoney.com/what-is-a-citi-flex-plan-5081199#:~:text=Citi Flex Pay lets you,using a fixed monthly payment.

International Search Report and Written Opinion dated Apr. 24, 2024 for PCT/US2024/010330.

* cited by examiner

LINE OF CREDIT

YOU CAN CREATE PRODUCTS FOR YOUR COMPANY'S CAPACITY PLAN OFFERINGS. THESE OFFER A QUICK WAY TO CREATE ACCOUNTS WITH UNIQUE DEFAULTS DEPENDING ON THE PRODUCT.

4 RESULTS

| ♦ NAME | STATUS | ADD (614) |
|---|---|---|
| DEFAULT ID:1 _602_ | ○ 612A | ▪ 618 |
| CONSTRUCTION ID:2 _604_ | ○ 612B | ✎ 616 |
| FINE DINING ID:3 _608_ | ○ 612C | ✎ |
| THE DIY ID:4 _610_ | ○ 612D | ✎ |

SHOW [10 ▼] ENTRIES          [▲][1][▼]

STANDARD CAPACITY PLAN
ENTER INFORMATION ABOUT THE CAPACITY PLAN INFORMATION AND CONTAINERS
ACCOUNT INFORMATION SECTION

ACCOUNT ID OPTION *  ACCOUNT ID *
CUSTOM ID           1008
AGENT USER          SOURCE COMPANY
NONE

666

ADD PORTFOLIO
668

PORTFOLIOS
THERE ARE NO ITEMS IN THIS CATEGORY.

BACK  CANCEL

① SELECT PRODUCT  ② CONFIGURE ACCOUNT  ③ ASSIGN CUSTOMER

664

NEXT
665

FIG. 6K

| SUMMARY | SERVICING▾ | AUTOPAY | STATEMENTS | CUSTOMER▾ | TOOLS▾ | ACCOUNT SETTINGS▾ | REPORTS▾ | COLLATERAL |

ACCOUNT SETUP

OPEN DATE
09/07/2022

FIRST DUE DATE
09/09/2022

FIRST STATEMENT DATE
09/08/2022

DRAW PERIOD EXPIRATION DATE

STATEMENT FREQUENCY
MONTHLY

TOTAL CREDIT LIMIT
$250,000.00

CALCULATOR ENABLED ⊙ — 674A

— 674B

CONTAINER

STRUCTURAL SUPPLIES & MATERIALS
INCLUDE ON ACCOUNT

CREDIT LIMIT
$250,000.00

NEW TRANSACTIONS
INCLUDE

INTEREST ABATEMENT DAYS
0

LABOR
NOT INCLUDE ON ACCOUNT

INTERIOR SUPPLIES & MATERIAL
NOT INCLUDE ON ACCOUNT

INTEREST CHARGE METHOD
INTEREST

INTEREST RATE
12.4900%

COMPUTATION METHOD
DAILY BALANCE

INTEREST ABATEMENT METHOD
OPEN DATE

CONTAINERS

PURCHASES
INCLUDE ON ACCOUNT

CONTAINERS
SELECT THE BUCKETS YOU WANT INCLUDE ON THE CAPACITY PLAN

- ☑ RESTAURANTS (PRIMARY BUCKET)  ☑ SCHOOL (OTHER BUCKET)
- ☑ GRADUATION (SPECIAL OCCASION BUCKET)

CREDIT LIMIT*
$250,000.00

| COMPUTATION METHOD* | NEW TRANSACTIONS | INTEREST CHANGE METHOD* | INTEREST RATE* |
|---|---|---|---|
| DAILY BALANCE | INCLUDE | INTEREST | 12.49 |

INTEREST ABATEMENT METHOD
OPEN DATE

INTEREST ABATEMENT DAYS*
0

☐ CASH ADVANCES

| SUMMARY | SERVICING ▾ | AUTOPAY | STATEMENTS | CUSTOMER ▾ | TOOLS ▾ | ACCOUNT SETTINGS ▾ | REPORTS ▾ | COLLATERAL |

ACCOUNT SETTINGS

AGENT USER
NONE
ACCOUNT STATUS
UNDERWRITING
EBILLING
NO
REPORTING TYPE
CAPACITY PLAN
CREDIT STATUS
0 - AUTO - ALLOW SYSTEM TO MANAGE THIS FIELD.
MERCHANT PROCESSOR GROUP

AUTOPAY STATUS
SUSPEND PROCESSING AUTOPAYS
ACCOUNT SUB STATUS
NEW APPLICATION
REPOSESSION DATE
09/07/22
LIQUIDATION DATE
09/07/22
CREDIT BUREAU
18. - CREDIT CARD
PAYMENT TYPE DEFAULT
REGULAR

PRIMARY ECOA CODE — 678A
0 - NOT SPECIFIED
SECONDARY ECOA CODE
0 - NOT SPECIFIED
CLOSE DATE
09/07/22
FOLLOW UP DATE
09/07/22
SOURCE COMPANY
STATEMENT TYPE

CUSTOM FIELDS

SOURCE OF BUSINESS — 678B

CONVENIENCE FEE

CONVENIENCE FEE — 678C
FIXED DOLLAR AMOUNT $5.00

FIG. 6O

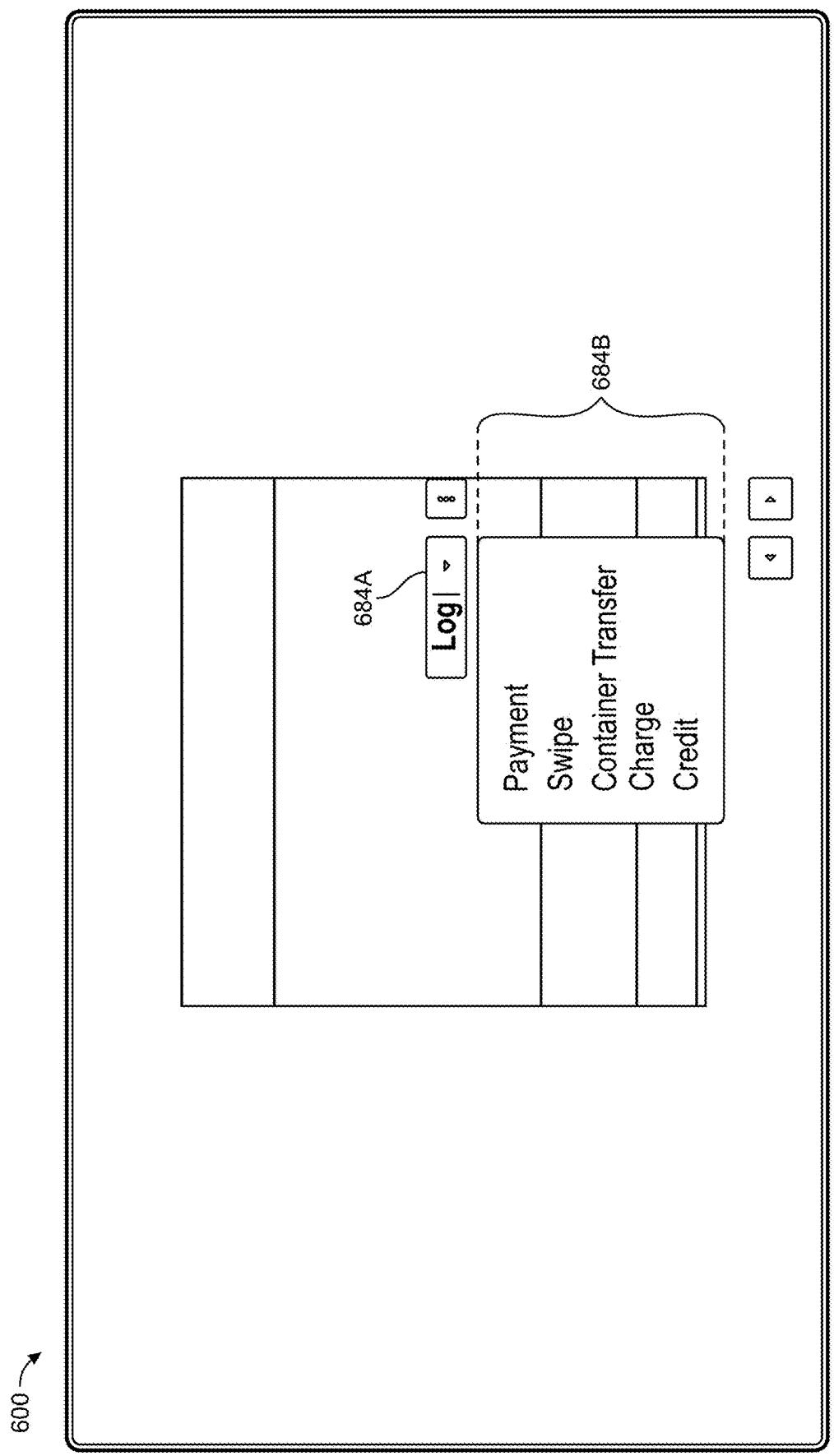

Log Payment

Amount*
$ 0.00

Apply Date*
09/07/22

Info*

Payment Type*
Select Option

Payment Method Details

Payment Profile
No Customer Available

Payment Method*
PleaseSelect

Custom Fields

Authorization Code

Log Swipe

Amount
$ 0.00

Container*
Big Box Stores

User
None

Apply Date*
09/07/22

Swipe Category*
General Swipe Category

Memo*

Merchant Information ◯
Merchant Name*

Merchant Address*

Cancel  Save

Add/Edit Payment Type

General

Name
Custom Payment Type 1

Prioritize Components?
Yes

Active

Minimum Payment

Components Waterfall
Interest Charges, Interest Free Fees, Abated Swipes, Interest Bearing Fees, Interest Bearing Past Fees, Swipes, Other Interest Bearing

Buckets Waterfall
Most Expensive First

Excess

Components Waterfall
Most Expensive First

Buckets Waterfall
Purchases, Cash Advances, Balance Transfers

Back

Minimum Payment - Buckets  Cancel  Save

☐ Most expensive first?

| | |
|---|---|
| ⇅ | Purchases |
| ⇅ | Cash Advances |
| ⇅ | Balance Transfers |
| ⇅ | Active Duty - Groceries |
| ⇅ | Active Duty - Healthcare |
| ⇅ | Active Duty - Travel |
| ⇅ | Non Active Duty - Groceries |

1512

Minimum Payment - Buckets  Cancel  Save

☑ Most expensive first?

Purchases
Cash Advances
Balance Transfers
Active Duty - Groceries
Active Duty - Healthcare
Active Duty - Travel
Non Active Duty - Groceries

FIG. 15D

SYSTEMS AND METHODS FOR GENERATING AN UPDATE CHARACTERISTIC VALUE FOR A CAPACITY PLAN HAVING MULTIPLE SUB-LEDGERS

BACKGROUND

The present disclosure relates generally to the field of capacity plan technology. In a computer networked environment, such as the Internet, users, and entities such as people or companies participate in exchanges (e.g., transactions). The exchanges may involve terms that indicate how a computer is to process and/or update data for the exchanges over time. Storing data for the exchanges can involve storing data for each exchange in a single database (or collective record). After accumulating the exchanges for a certain time period, the users, via respective computing devices, can communicate with the computer managing the data for the exchanges to initiate payments such as to update data related to the exchanges.

SUMMARY

Systems and methods are disclosed for generating an update characteristic value for a capacity plan having multiple sub-ledgers. Some implementations can include a communication network interface, a memory, and one or more processors. The network interface can interface with a communication network. The memory can store a plurality of containers corresponding to the capacity plan, each container of the plurality of containers can include configuration parameters specifying one or more aspects of handling an exchange included in the capacity plan. The memory can store a ledger to broadcast exchanges associated with the capacity plan. The ledger can include a plurality of sub-ledgers and sub-ledger values for the plurality of sub-ledgers. Each sub-ledger can be associated with a container of the plurality of containers. Each exchange of the ledger can be broadcasted within a sub-ledger of the plurality of sub-ledgers. The one or more processors can identify a predetermined capacity plan characteristic value indicating a minimum update per cycle value for the capacity plan or a time period for completion of an update of a value of the capacity plan to zero. The one or more processors can calculate an update characteristic value for updating the value of the capacity plan to zero based on the identified predetermined capacity plan characteristic value, the sub-ledger values, and the configuration parameters that correspond with each of the sub-ledgers. The one or more processors can transmit, via the communication network interface, a record comprising the update characteristic value to a computing device.

BRIEF DESCRIPTION OF THE DRAWINGS

FIGS. 15A-D are example user interfaces of a computing device for adjusting the payment allocation sequence, according to some implementations.

Figure 1A:
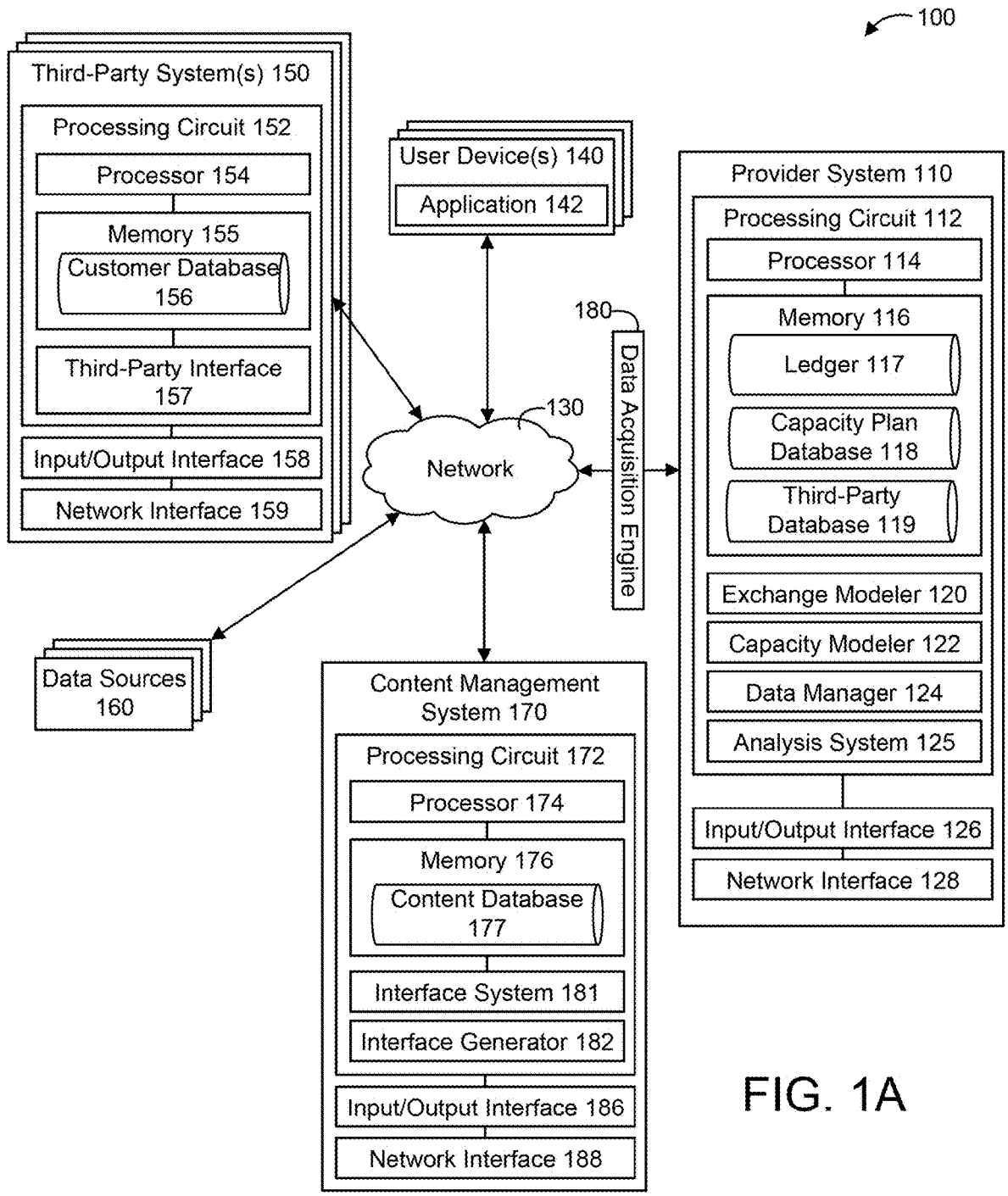
FIG. 1A is a block diagram depicting an implementation of a provider system and computing environment, according to some implementations.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The systems and methods described herein relate to allocating payment within a capacity plan among sub-ledgers. In certain systems, a computer may populate exchanges to a ledger having a single sub-ledger of a capacity plan. In such systems, any exchanges contributed by a user of the capacity plan may be applied with the terms or rules associated with the capacity plan, such as billing cycle dates, available credit, interest rate or charges, or other parameters associated with the sub-ledger.

The systems and methods of the technical solution discussed herein can provide a data structure including a ledger with multiple sub-ledgers, where each sub-ledger can be associated with different terms or rules in a "container" or "bucket." A computer configured to implement the systems and methods described herein may dynamically assign exchanges to different sub-ledgers of the capacity plan based on characteristic(s) or type(s) of the exchanges, attributes or data of the capacity plans, and/or attributes of an individual or other entity involved in the exchange, and can store the exchanges on a ledger. The computer may then implement terms or rules of the different sub-ledgers to which the exchanges are assigned to update data for the exchanges and the capacity plan, thereby allowing flexibility in the implementation of the terms or rules on exchanges according to the types of exchanges initiated by the user.

For example, in many systems, service providers can create or otherwise provide accounts or lines of credit for exchanges (e.g., credit card account, debit card account). An account can be used by a customer of the service provider and the recordation of the exchange can be linear. In certain systems described above, a single set of terms is generally associated with all exchanges of the account. To provide flexibility or incentives for the user when engaging in certain types of exchange, the service provider can provide multiple lines of credits for the account. Each line of credit can be associated with a different set of terms for handling exchanges with one or more of the multiple sets of terms customized for the customer.

By routing exchanges to containers on the front end (e.g., labeling exchanges on the ledger with labels for containers to which the exchanges have been routed or storing the exchanges in separate ledgers (or sub-ledgers) that are dedicated to exchanges routed to containers of the ledgers), a calculator the computer executes to update the exchanges can operate more efficiently and quickly because the calculator may avoid parsing individual exchanges one at a time to identify which terms to apply to which exchange. The calculator may not need to process configuration parameters that do not apply to the containers to which the exchanges were assigned because the calculator can update the exchanges for each container in isolation. The computer may separately perform calculations for each container in this way and then compile the calculations to update the capacity plan for the ledger. This process is faster, more accurate, and more scalable as a micro-service because the calculator may only need to be aware of the configuration parameters of individual containers and the exchanges linked to the containers, not any other noise.

Another advantage to implementing the systems and methods described herein is that routing exchanges to different sub-ledgers can increase the tools that are available for fraud detection and prevention. For example, because the computer can categorize different exchanges into different containers and sub-ledgers, the computer can identify unusual exchange patterns in the different sub-ledgers (e.g., a malicious actor that goes on a spending spree purchasing new cars using someone else's card). The computer can identify such irregularities based on a sudden change in values or frequency of exchanges in individual sub-ledgers and generate an alert to a fraud detection system.

With multiple sub-ledgers, there is a need to determine which sub-ledgers to update when provided with a request to update the capacity plan (e.g., apply a payment to an aggregate value of the capacity plan). Instead of updating the total value aggregated from the sub-ledgers, the computer implementing the systems and methods of the technical solution can determine one or more of the sub-ledgers to allocate at least a portion of the payment according to the priority values of the sub-ledgers. Further, the computer can determine to update data (e.g., exchange values) of individual exchanges for each sub-ledger allocated with the portion of the payment, for instance, based on the types of exchanges broadcasted in the sub-ledger. Therefore, the systems and methods of the technical solution can optimally update the capacity plan associated with the ledger with multiple sub-ledgers while taking into consideration custom rules or terms associated with individual sub-ledgers and exchanges of each sub-ledger. Aspects of the present disclosure address problems specific to computing in managing different accounts by traversing the data structure of the ledger to update the data of the exchanges for one or more sub-ledgers allocated with portion(s) of the payment.

Additionally, there is a need to comply with various laws and/or regulations (e.g., the CARD act of 2009) that govern certain financial terms that are to be included in billing statements using the multiple sub-ledgers. A computer implementing the systems and methods of the technical solution can generate a minimum update per cycle value (e.g., minimum payment value) for a fixed time period (e.g., a time period to update the capacity plan value to zero). The computer can additionally or instead generate a number of update cycles to reduce the value of a capacity plan to zero for a fixed minimum update per cycle value. The computer can generate such values for a capacity plan using a series of functions and based on the payment allocation system as described above. For example, the computer can generate or calculate the number of update cycles to reduce the value of a capacity plan to zero for a fixed minimum update per cycle value. The computer can do so by iteratively "simulating" payment on the ledger using the fixed minimum update per cycle value to the ledger as payment. Simulating can mean performing calculations based on the payment occurring but not adjusting (e.g., not permanently adjusting) any of the values within the ledger. The computer can apply the fixed minimum update per cycle value to the ledger and reduce the exchange values of the exchanges on the ledger according to the priorities of the sub-ledgers of the exchanges and the types of the exchanges to determine how to update the exchanges. The computer can iteratively increase the exchange values of the capacity plan based on configuration parameters for the exchanges of the capacity plan and reduce the exchange values based on the minimum update per cycle value until determining the value of the capacity plan is below a threshold or is zero. The computer can maintain and increment a counter for each simulated payment to determine the number of cycles to reduce the value of the capacity plan to zero.

In another example, the computer can generate or calculate the minimum update per cycle value to cause the value of the capacity plan to reduce to zero or below a threshold within a time period for completion of an update of the value of the capacity plan to zero. The computer can do so by executing a function on the value of the capacity plan (e.g., dividing the value of the capacity plan in half) to generate an initial minimum update per cycle value. The computer can calculate the number of cycles of payment it would take with the minimum update per cycle value by iteratively increasing exchange values of the ledger and simulating payment of the capacity plan as described above. The computer can determine if the number of cycles is within the time period for completion of the update of the value of the capacity plan to zero. Responsive to determining the number of cycles is not within the time period for completion, the computer can adjust the initial minimum update per cycle and simulate payment of the capacity plan again to determine an updated number of cycles. The computer can repeat this process until identifying a minimum payment per cycle that will cause the value of the capacity plan to reduce to zero or below a threshold within the time period for completion of the update of the value of the capacity plan to zero.

The computer can comply with the laws and/or regulations by including the calculated number of cycles and/or the calculated minimum update per cycle value in a billing statement for the account associated with the capacity plan. The computer can generate a record including the calculated values for a capacity plan and transmit the record to a computing device associated with the capacity plan. In this way, the computer can use priorities and exchange types to simulate payment on a capacity plan to determine update characteristic values for the capacity plan divided between different sub-ledgers and containers. Thus, the systems and methods described herein enable the storage of exchange data in multiple sub-ledgers and containers for a single capacity plan while remaining in compliance with various laws and regulations.

As used herein, a "capacity plan" can be an account or line of credit (LOC) enabling customers (e.g., borrowers) of service providers (e.g., financial institutions ("FI"), credit card institutions, other borrowing/lending services) to draw on the account or LOC when the customer desires to borrow funds (e.g., fiat money, digital currency, cryptocurrency) or other assets (e.g., physical, or digital).

As user herein, a "container" (also referred to as a "bucket") can provide a set of terms (or rules) for handling exchanges of the capacity plan as specified by configuration parameters. A container can be considered to define a sub-account or sub-line of credit (SLOC), with configuration parameters unique to the sub-account. The configuration parameters can include a set of terms by which an exchange (sometimes referred to herein as a "transaction") is handled by the container. Each capacity plan can include a plurality of containers and can have configuration parameters per container.

As used herein, a "control structure" can be a data structure including one or more instructions (e.g., controls and rules) executable by a processing circuit to route and broadcast (e.g., record) an exchange to a container (or to a sub-ledger corresponding to a container). For example, a control structure can include a control heuristic that can model a received exchange and broadcast the exchange in an appropriate sub-ledger. In another example, a control structure can include a smart contract that includes controls (or rules or parameters) for routing an exchange, via broadcast, to an appropriate sub-ledger. In some implementations, the control structure can restrict or allow access (e.g., restrict or allow broadcasting) to a particular sub-ledger based on the control heuristic or smart contract.

FIG. 1A is a block diagram depicting an implementation of a provider system 110 and a computing environment 100, according to some implementations. The computing environment 100 is shown to include the provider system 110, user devices 140, third-party systems 150, data sources 160, and content management system 170. The plurality of devices and/or systems 110, 140, 150, 160, and/or 170, may initiate, collect, and/or route (e.g., provide) data over a network 130. The data acquisition engine 180 may provide a single application programming interface (API) or multiple APIs to access various data generated, stored, or routed by devices and systems 110, 140, 150, 160, and/or 170.

Each system or device in the computing environment 100 may include one or more processors, memories, network interfaces (sometimes referred to herein as a "network circuit") and user interfaces. The memory may store programming logic that, when executed by the processor, controls the operation of the corresponding computing system or device. The memory may also store data in databases. For example, memory 116 may store programming logic that when executed by a processor 114 within processing circuit 112, causes a capacity plan database 118 to update information for a capacity plan with communications received from a user device 140 or a third-party system 150. The network interfaces (e.g., a network interface 128 of the provider system 110) may allow the computing systems and devices to communicate wirelessly or otherwise, e.g., via the network 130. The various components of devices in the computing environment 100 may be implemented via hardware (e.g., circuitry), software (e.g., executable code), or any combination thereof. Systems, devices, and components in FIG. 1A can be added, deleted, integrated, separated, and/or rearranged in various embodiments of the disclosure.

The provider system 110 includes a network interface 128, a processing circuit 112, and an input/output interface 126. The network interface 128 is structured and used to establish connections with other computing systems and devices (e.g., the user devices 140, the third-party system 150, the data sources 160, the content management system 170, etc.) via the network 130. The network interface 128 includes program logic that facilitates connection of the provider system 110 to the network 130. For example, the network interface 128 may include any combination of a wireless network transceiver (e.g., a cellular modem, a Bluetooth transceiver, a Wi-Fi transceiver, etc.) and/or a wired network transceiver (e.g., an Ethernet transceiver). In some implementations, the network interface 128 includes the hardware (e.g., processor, memory, and so on) and machine-readable media sufficient to support communication over multiple channels of data communication. Further, in some arrangements, the network interface 128 includes cryptography capabilities to establish a secure or relatively secure communication session in which data communicated over the session is encrypted. In various embodiments, the network 130 can adapt to network traffic needs by compressing content, using any computing device described herein, and sending it (e.g., via network 130) to various other computing devices, by adjusting security filters to remove junk traffic from network 130 (e.g., by monitoring packets), and so on.

The processing circuit 112 includes a processor 114, a memory 116, a ledger 117, a capacity plan database 118, a third-party database 119, an exchange modeler 120, a capacity modeler 122, a data manager 124, and an analysis system 125. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. Memory 116 may include database components, object code components, script components, or any other type of information structure for supporting the various activities and information structures described herein. The memory 116 may be communicably and electrically coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the provider system 110 is configured to execute a variety of tasks and jobs and store associated data in a database of the memory 116 (e.g., the ledger 117, the capacity plan database 118, the third-party database 119).

The memory 116 may store a ledger 117, according to some embodiments. The ledger 117 may include a plurality of sub-ledgers. Each of the sub-ledgers can be identified with categorization mechanisms of a capacity plan name and a container (or bucket) name. In some implementations, the ledger 117 can map a root (e.g., dummy) to capacity plans, and each capacity plan can be mapped to a plurality of containers. Thus, the ledger 117 can generate and assign an identifier to each container based on a naming convention.

For example, each container may be given a CP--#######--bucket--###identifier. Each of the containers can store sub-ledger values (e.g., a set of configuration parameters, identifiers of the containers, exchange data for the containers, etc.), and the capacity plan can include an aggregate of the containers (e.g., the individual exchanges of the different containers and/or aggregate values of the exchanges within each respective container). For example, a capacity plan containing ten containers may be assigned identifiers. For example, the capacity plan may be assigned identifiers according to Table 1:

TABLE 1

| Ledger |
| --- |
| CP--1234--container-001 |
| CP--1234--container-002 |
| CP--1234--container-003 |
| CP--1234--container-004 |
| CP--1234--container-005 |
| CP--1234--container-006 |
| CP--1234--container-007 |
| CP--1234--container-008 |
| CP--1234--container-009 |
| CP--1234--container-010 |

As shown, with this naming convention other circuits and systems described herein (e.g., exchange modeler 120, capacity modeler 122, and analysis system 125) can request or query the ledger 117 according to the naming convention. For example, the requests and queries can include requests for exchanges including exchange data (sometimes referred to as "exchange information"). In some implementations, the ledger 117 (or exchange modeler 120 querying the ledger 117) can store a plurality of exchanges based on one or more data structures according to Table 2:

TABLE 2

| CP--1234--container-001 |
| --- |
| Exchange-1: Exchange-Data |
| Exchange-2: Exchange-Data |
| Exchange-3: Exchange-Data |
| Exchange-4: Exchange-Data |
| Exchange-5: Exchange-Data |
| Exchange-6: Exchange-Data |

In some implementations, the ledger 117 may include a master ledger containing all exchanges. The exchanges can be routed to the master ledger and one or more fields of the received exchange can be updated to include an identifier according to Table 3:

TABLE 3

| Ledger |
| --- |
| Exchange-1 (CP--1234--container-001): |
| Exchange-Information |
| Exchange-2 (CP--1234--container-002): |
| Exchange-Information |
| Exchange-3 (CP--1234--container-003): |
| Exchange-Information |
| Exchange-4 (CP--1234--container-004): |
| Exchange-Information |
| Exchange-5 (CP--1234--container-005): |
| Exchange-Information |
| Exchange-6 (CP--1234--container-006): |
| Exchange-Information |

For example, the exchange modeler 120 may receive exchange data for an exchange and apply one or more control structures to the exchange data to identify a container to which to route the exchange. Exchange modeler 120 can identify the container and an identifier for the container. Exchange modeler 120 can add the exchange data for the exchange to the ledger 117 (e.g., add a new line or record containing the exchange data to the ledger 117). Exchange modeler 120 can insert the identifier for the identified container in the line or record for the exchange in the ledger 117 to label or tag the exchange with the container and indicate which container the exchange is linked to or a part of. A sub-ledger for each container may be the exchanges that have been labeled with an identifier for the respective container. The exchanges may be retrieved and updated by querying the labels or tags that correspond to the individual containers. Accordingly, when updating the exchanges, analysis system 125 or data manager 124 may not need to individually determine which configuration parameters to apply to each individual exchanges and instead may apply the configuration parameters that correspond to the different containers, substantially reducing the processing resources that may be needed to search and update (e.g., broadcast) exchanges on the ledger.

In some implementations, exchanges for separate containers may be stored in sub-ledgers separated from the ledger 117. The sub-ledgers may each correspond to a respective container. For example, after or when routing an exchange to a particular container, exchange modeler 120 may insert the data for the exchange in an entry in a separate data structure from the ledger 117 that corresponds to the container. The exchange modeler 120 may separately route exchanges into different sub-ledgers in this way over time. The data manager 124 or the analysis system 125 may calculate aggregate values for the different sub-ledgers and input the aggregate values into the ledger 117 and do so over time based on configuration parameters of the individual containers. The analysis system 125 or the data manager 124 may then update the capacity plan of the ledger 117 based on the aggregate values (e.g., subtract the aggregated value from the capacity plan to calculate a remaining amount for the capacity plan).

The ledger 117 may assign one or more tags (e.g., array of tags) to each container based on the content of the exchanges in or linked to the containers. The tags can be used to enable users utilizing a graphical interface, the data manager 124, or other systems and devices described herein to enable searching (e.g., utilizing attributes, such as status) for exchanges or content of each container or a plurality of containers. For example, one tag can indicate the status of a particular container and can be updated in real-time by the ledger 117 or analysis system 125. In another example, one tag can indicate the balance of a particular container and can be updated in real-time by the ledger 117 analysis system 125. In yet another example, one tag can indicate the number of exchanges of a particular container and can be updated in real-time by the ledger 117 or analysis system 125. In these examples, the data manager 124 or analysis system 125 can execute calculations such as grouping of exchanges by tag on a per container basis or calculating balances on a particular date. Thus, each container can include a plurality of tags unique to the container. Therefore, the plurality of containers improves resource utilization by reducing search time and traversals associated with locating an exchange on a typical pooling exchange. Additionally, the generating and utilization of containers and identifiers unique to a particular sub-ledger in the ledger 117 provide improvements to ledger architectures by increasing access speed to systems and devices.

The memory 116 may store a capacity plan database 118, according to some embodiments. The capacity plan database 118 may store capacity plans, configuration parameters, and control structures. In some implementations, the capacity plan includes a plurality of containers and a plurality of configuration parameters corresponding to each specific container. For example, configuration parameters of a container can include a balance, an interest rate, a charge method, a credit limit, an identifier, and/or a primary account Boolean.

The memory 116 may store a third-party database 119, according to some embodiments. The third-party database 119 may store updated personal information for customer accounts associated with the third-party (e.g., the FI). For example, the third-party database 119 saves personal customer information, such as name, age, gender, address, education, occupation, etc., customer preferences, such as notification preferences, security preferences, etc., and authentication information, such as customer passwords, biometric data for the customer, geometric information (e.g., latitude, longitude), etc. The third-party database 119 may further be configured to store financial data for each customer account of the third-party, such as past exchanges or transactions, different third-party account information (e.g., balances, debt, type of account, etc.), investments, securities, loans, mortgages, other services offered by the third-party, etc.

Referring to the exchange modeler 120 generally. The exchange modeler 120 can receive data (e.g., environmental data, exchange data, third-party data, ledger data) from a plurality of data sources (e.g., ledger 117, capacity plan database 118, third-party database 119, user devices 140, third-party system 150, data sources 160, content management system 170) via one or more data channels (e.g., over network 130). Each data channel may include a network connection (e.g., wired, wireless, cloud) between the data sources and the system (e.g., 110, 150, 170). The plurality of data can include, but is not limited to, environmental data (e.g., IP addresses, ledger information, environmental information (e.g., geolocation, sensor data) associated with the exchange data, and so on), additional exchange data (e.g., amount, exchange history, interest rate, payment calculations, balances, etc.), and ledger data (e.g., container information, sub-ledger records), and so on. For example, the exchange modeler 120 can receive exchange data from a third-party system 150 and, in turn, assign or route the exchange to a sub-ledger associated with a particular container of a capacity plan. In the following example, the particular container can include a plurality of configuration parameters for determining how the exchange (e.g., the draw, or the swipe or any other mode of exchange) is handled.

Assigning or routing can include accessing, by the exchange modeler 120, the ledger 117 and executing one or more control structures to determine a particular sub-ledger of ledger 117 to store the newly received exchange. For example, the exchange modeler 120 can access the capacity plan database 118 based on submitting an API request for one or more control structures, and in turn execute the one or more control structures to determine a designated container to store the new exchange. In the following example, upon determining the container, the exchange modeler 120 can access the ledger 117 to determine the appropriate sub-ledger associated with the container to query and/or store the new exchange. In some implementations, prior to storing the exchange the ledger 117 can update the exchange data to include an exchange identifier.

The exchange modeler 120 can generate various data structures stored in the provider system 110. For example, the exchange modeler 120 can be configured to generate one or more control structures including one or more rules datasets for routing received exchanges to a sub-ledger of ledger 117. The control structure may be a data structure executable instructions stored in memory 116. In general, the executable instructions can include instructions to analyze exchanges (including the exchange data) and select a "direction" or "route" in which to go based on applying rules of the rules datasets. In some implementations, the rules can be set by the user such that the user may customize desired routes of a particular exchange (e.g., via graphical information such as shown and described with reference to FIGS. 6A-6T). In various implementations, the exchange modeler 120 can generate rules (storing in a rules dataset) based on historical exchange information, user information (e.g., tendencies, geolocation, biometrics) of a particular user, user information of a plurality of users, etc. Accordingly, control structures can control the flow of received exchanges based on one or more rules. In particular, controlling the flow can include executing one or more instructions of the control structure to determine a sub-ledger associated with a container, and storing the exchange including updating one or more fields of the exchange to include an identifier. In some implementations, the executable instruction of a control structure can implement one or more flows of control including, but not limited to, sequential logic (sequential flow), selection logic (conditional flow) (e.g., sign alternative logic, double alternative logic, multiple alternative logic), iteration logic (repetitive flow). The exchange modeler 120 can also receive data that can be used in performing exchanges and/or updating capacity plans and containers. For example, exchange modeler 120 can be configured to receive exchange data from one or more systems and/or devices described herein.

A received exchange may be modeled by executing a plurality of control structures (e.g., applying rules of the rules datasets to data received for an exchange). In general, modeling an exchange is the process of determining a relationship between the exchange and one or more containers. The determining of the relationship of the exchange can include using or otherwise considering exchange data such as, but not limited to, date, time, geolocation, merchant, merchant attributes, merchant classification, merchant categorization, payment form, authorization method, authorizer, etc. to determine at least one relationship to a container of the ledger 117. Modeling can include determining that relationship based on executing the plurality of control structures. In particular, the control structures can include a rules dataset (e.g., variables) that can characterize the relationship between a particular exchange and a particular container. In doing so, the exchange modeler 120 can determine the sub-ledger of ledger 117 to which the exchange is broadcast. The exchange modeler 120 can process exchanges received and may perform various actions and/or access various types of data, some of which may be provided over network 130. In general, processing an exchange can include modeling the exchange by executing one or more control structures based on the context of the exchange. The context of the exchange can include exchange data (e.g., payment method, amount, date, time, MCC code), environmental data (e.g., real-time sensor information at the merchant, such as from the point-of-sale (POS)

computing system or from the user device 140), activity data (e.g., previous locations of the customer, previous exchanges of the customer). In particular, the exchange modeler 120 can be configured to process exchanges based on received exchange data, additional exchange data, capacity plans, capacity plan attributes (e.g., configuration parameters and control structures, historical information) customer attributes (e.g., location, merchant, credit limit, current balance, biometric information) from the systems and devices described herein. Processing exchanges can include executing one or more control structures.

In some implementations, the control structures can be linked or associated with a particular container of a capacity plan, such that each sub-ledger is restricted by the control structure of the particular container. In various implementations, the control structures can be linked or associated with a capacity plan (e.g., a value), such that each exchange is modeled and routed to an appropriate sub-ledger by the control structure. For example, each capacity plan may have a plurality of control structure unique to the capacity plan that can be executed upon receiving an exchange. In particular, each capacity plan can be owned or administrated by a user and each user may configure different rules stored in the rules dataset for routing exchanges to containers, and the different rules can be executed by different control structures. Additionally, each capacity plan may include a plurality of different containers. Accordingly, each capacity plan may have a unique group of control structures for routing exchanges particular to the capacity plan.

Accordingly, when an exchange or exchange data is received, the exchange modeler 120 may communicate or broadcast a command to the ledger 117, updating the sub-ledger associated with a capacity plan (e.g., adjusting a value stored in the sub-ledger). For example, updating the sub-ledger can include storing an exchange including exchange data and an exchange identifier into a particular sub-ledger. In various arrangements, each command can include program code (e.g., a script, an executable) that, when executed by the ledger 117, causes the control structure to execute a specific set of instructions. In terms of conflict handling and/or the prioritization of two control structures (for different buckets), a routing priority can be determined by the modeler 120 or accessed in the third-party database 119 based on a user designation of priority. Accordingly, when control structures conflict and have a mutually exclusive categorization on a container, the priority order can be used to determine which container the exchange will be routed to. In some implementations, if no control structure categorizes the exchange, the exchange can be routed to a remainder container.

For example, a first control structure can route an exchange to a first container based on the specific type of vendor (e.g., restaurant, travel, groceries, health and wellness, food, and drink, personal, shopping, gas, entertainment, education, home, etc.) from which it is received. In another example, a second control structure can route an exchange to a second container based on the value relative to a designated price (e.g., greater than or equal to $100, less than or equal to $10, greater than or equal to $1,500, less than or equal to two Bitcoin, etc.). In yet another example, a third control structure can route an exchange to a third container based on exchange data (e.g., time of day, zip code, MCC code). In yet another example, a fourth control structure can route an exchange to a fourth container based on the date (e.g., customer's birthday, holiday, particular day of the week). In yet another example, a fifth control structure can route an exchange to a fifth container based on the merchant or vendor (e.g., Merchant A, Merchant B, Vendor C). In yet another example, when a sixth control structure and a seventh control structure both categorize an exchange to different containers based on different rules, a routing priority can be accessed and/or assessed by the exchange modeler 120 to determine the sixth control structure takes priority over the seventh control structure, and accordingly the exchange can be routed to a sixth container rather than a seventh container. As such, it should be understood control structure implementations can utilize a combination of data from various data sources. For example, an eighth data structure can route an exchange to the first container based on a combination of merchant data, exchange amount, customer date of birth, and balance on the capacity plan.

The capacity modeler 122 implements capacity plan generation operations of the provider system 110. In various implementations, the capacity modeler 122 can be configured to receive a plurality of data from a plurality of data sources (e.g., the data manager 124, the memory 116, the user devices 140, the third-party systems 150, the data sources 160, the content management system 170) via one or more data channels (e.g., over the network 130). Each data channel may include a network connection (e.g., wired, wireless, cloud) between the data sources and the provider system 110. For example, the capacity modeler 122 could receive customer data from the third-party system 150. In another example, the capacity modeler 122 could receive geolocation data from a user device (e.g., user devices 140) indicating a current location of a user associated with a capacity plan (e.g., at a restaurant and the capacity plan including a container for exchanges made at the restaurant).

Capacity modeler 122 can generate capacity plans including containers based on configuration parameters set by a customer or third-party (e.g., FI). In particular, capacity plans can be generated including various containers that are restricted to exchanges by control structures. In some implementations, the containers and configuration parameters of particular containers may be generated based on various factors, including, but not limited to, user factors (e.g., such as age, life event, history, location, credit score), third-party factors (e.g., loans offered, promotions offered, interest rates offered, payment flexibility offered), capacity plan status (e.g., all payments up-to-date, credit limit almost reached, interest rate changing, etc.), and so on. Accordingly, each capacity plan and the containers stored within may have a unique capacity model with unique configuration parameters. Accordingly, as containers and capacity plans are generated by the capacity modeler 122 based on a capacity model, they can be immediately (e.g., in real-time) group exchanges to a particular container based on the configuration parameters and control structures of the particular capacity plan.

In various implementations, the capacity modeler 122 can adjust configuration parameters of one or more containers or to a capacity plan generally. For example, the configuration parameters than can be adjusted (or change) can include, but not be limited to, billing cycle dates, balances, available credit, interest rate or charges, minimum payment, future minimum payment, past due, waterfall application, CARD Act payoff payment-fixed, CARD Act payoff term-fixed, draw expiration date, interest rounding, credit limit, payment type, fees, interest, and so on. Thus, the capacity modeler 122 can set configuration parameters that the third-party (and sometimes the user) can change. In particular, containers can be built over time (e.g., increase or decrease configuration parameters) based on some or all exchange data, environmental data, activity data, or third-party data of a third-party system 150 or user device 140, and the third-party or user can customize configuration parameters in real-time as exchange are routed and broadcast to sub-ledgers based on the control structures.

The data manager 124 can store various data structures in the memory 116. For example, the data manager 124 can store one or more configuration parameters or control structures. The configuration parameters and control structures may be a data structure included in the capacity plan database 118 and can be associated with a capacity plan. The data manager 124 can receive exchange data for each of the capacity plans. For example, for a particular capacity plan, the capacity plan may have five containers that each include a plurality of configuration parameters. The data manager 124 can be configured to receive the exchange data (e.g., from user devices 140 or third-party system 150) of one or more capacity plans. Based on the one or more control structures of a capacity plan, the exchange data can be routed and broadcast (grouped) into a sub-ledger of ledger 117 by the data manager 124. In some embodiments, the data manager 124 can receive exchange data for the capacity plan as a whole (e.g., stored capacity plan database 118) instead of exchange data specific to a particular container. For example, the exchange data can include a plurality of exchanges that can be routed and broadcast (e.g., by exchange modeler 120). The exchange data that the data manager 124 receives can be exchange data from third-party system 150. For example, upon a predetermined time period (or in real-time) the third-party system 150 can transmit packets of exchange data for a plurality of exchanges. In some implementations, the data manager 124 can communicate with content management system 170 via network 130 in order to present capacity plan information in real-time (or near real-time).

The analysis system 125 can receive calculation requests from other systems described herein (e.g., exchange modeler 120, capacity modeler 122, data manager 124, third-party systems 150, etc.) to execute one or more calculation functions on a capacity plan or container. Each calculation request can include a data payload. The data payload can be in a format such as, but not limited to JSON format, Real-time Transport Protocol (RTP) format, HTTP format, etc. The data payload can include arguments (e.g., actions, context, date, setup, transaction), in a particular structure. For example, arguments in a particular structure can be: {"actions": ["loc/billing-cycle-dates", "loc/balances"], "context": [ . . . ], "date": [ . . . ], "setup": [ . . . ], "transactions":[ . . . ]}. Accordingly, the one or more calculation functions can be executed based on the data payload indicating one or more actions, and each action can have a plurality of arguments (e.g., context, date, setup, transactions). Upon receiving a calculation request including an action, the analysis system 125 can request or query (e.g., executing API calls with an API, where the API calls return the requested or queried information) the memory 116 to process the request to generate an output. In some implementations, the analysis system 125 can be stateless such that it has no records of previous interactions and calculations, and each calculation can be handled based on entirely on information that comes from the calculation request. In particular, stateless or stateful can be derived from the implementation of states as a set of conditions at a moment in time. In some implementations, an output can be generated based on the calculation request and the output can be transmitted to the system or device that submitted the calculation request.

For example, upon receiving a "billing-cycle-dates" action, the analysis system 125 can query the capacity plan database 118 for all billing cycle dates of a particular container of a capacity plan. In the following example, the analysis system 125 can receive a API call return and can format an output to the system or device that submitted the calculation request. The output can include: {"current-billing-cycle": {"start-date": <date>, "end-date": <date>, "due-date": <date>} "next-billing-cycle": {"start-date": <date>, "end-date": <date>, "due-date": <date>}}. For example, upon receiving a "balance" action, the analysis system 125 can query a particular sub-ledger of ledger 117 for aggregate balances of containers (e.g., container-id-1, container-id-2). In the following example, the analysis system 125 can receive a API call return and can format an output to the system or device that submitted the calculation request. The output can include: {"balances": {"container-id-1": {"balance": <rational>, "fees": <non-neg rational>, "interest-charges": <non-neg rational>, "interest-bearing-amount": <non-neg rational>, "payments-and-credits": <non-neg rational>, "swipes": <non-neg rational>, "keep-accruing-interest?": <boolean>}, "container-id-2": { . . . }, { . . . }, "totals": {"balance": <rational>, "fees": <non-neg rational>, "interest-charges": <non-neg rational>, "interest-bearing-amount": <non-neg rational>, "payments-and-credits": <non-neg rational>, "swipes": <non-neg rational>}, "abated-swipes": [<transaction-1>, <transaction-2>, . . . ], "past-fees": [<transaction-1>, <transaction-2>, . . . ]}. In another example, additional actions can be received such as, but not limited to, available credit action, interest charge action, minimum payment action, future minimum payment action, past due action, waterfall application action, CARD act payoff payment-fixed action, and so on.

The analysis system 125 can also include updating sub-ledgers of the ledger 117 and/or specific exchanges on a sub-ledger. In some implementations, the analysis system 125 can query the ledger 117 for particular exchanges based on a calculation parameter(s) such as a date or date range, exchange amount, tag or a plurality of tags, a particular interest rate, a particular sub-ledger(s), and so on. The calculation parameter can be received from a user or third-party (e.g., interacting with GUI 600) or can be periodically performed by the analysis system 125 based on a schedule (e.g., every 2 minutes, every 1 hour, every Tuesday, every month). The query can return the exchanges satisfying the calculation parameter (or calculation parameters). In response to the return exchanges, the analysis system 125 can retrieve and/or identify (e.g., utilizing the identifier of the exchange such as, "Exchange-1 (CP--1234--container-001): Exchange-Information", "Exchange-2 (CP--6542--container-005): Exchange-Information", "Exchange-3 (CP--3421--container-090): Exchange-Information") the configuration parameters of a particular container of a capacity plan for each exchange. In some implementations, in response to retrieving and/or identifying the configuration parameters, the analysis system 125 can apply the configuration parameters to the particular exchange in the sub-ledger. For example, the configuration parameters can include a 5% interest rate and an update payment due date. The analysis system 125 can calculate and apply the interest rate to the particular exchange (e.g., apply 10% interest rate to $10, with a new balance of $11). In the following example, the analysis system 125 can update the balance and payment due date of the particular exchange on a sub-ledger. In general, the calculating interest each billing cycle is completed by aggregating the interest from each container, with awareness of each of their own configuration parameters. Thus, if one container is having interest abated at an exchange level for 90 days for each exchange starting on the exchange start date, and then afterwards if there is still an outstanding balance in that container on that exchange then the analysis system 125 can apply a 10% interest rate. On another container the configuration parameters include charging a 9% interest but not charge it until the individual carries a balance forward past a due date, or other various financial settings. Accordingly, then the analysis system 125 can collect all the mentioned information, aggregate it from each container and keep track in the memory 116 how the interest was calculated (e.g., a log of interest calculations).

In another example, the configuration parameters can include an interest rate accrued based on a sub-ledger per billing cycle. In the following example, the analysis system 125 can calculate and apply the interest rate to each sub-ledger per billing cycle, where a new exchange on each sub-ledger can be created with the applied interest rate. In another example, the configuration parameters can include a next due date and interest abated by exchange schedule. In the following example, the analysis system 125 can calculate the next due date and interest abated. In another example, the configuration parameters can include a billing cycle date, interest bearing balance (e.g., per sub-ledger), minimum due, and delinquency amount of days (e.g., days past due and amount past due). In the following example, the analysis system 125 can calculate each of the following configuration parameters based on querying the ledger 117 and access various data stored in memory 116 and/or other systems and devices described herein (e.g., user device 140, third-party system 150, data sources 160, content management system 170).

In various implementations, in response to retrieving and/or identifying the configuration parameters, the analysis system 125 can apply the configuration parameters to the particular sub-ledger. For example, the sub-ledger may have a balance and credit limit, and the analysis system 125 can apply an interest to one or more exchanges which in turn can include updating the balance of the sub-ledger. As such, it should be understood that the sub-ledger or exchange can be updated individually (e.g., in isolation) or can be collectively updated (e.g., when a balance on an exchange is updated, the sub-ledger balance is also updated).

In another example of updating exchanges, the analysis system 125 can query the ledger 117 for exchanges of individual containers. For example, the analysis system 125 can query the ledger 117 for a container A that corresponds to configuration parameters XYZ. The analysis system 125 may query the ledger 117 using "A" as an index value and retrieve ever exchange that is labeled or tagged with the label or tag A. Responsive to retrieving the exchanges linked to the A container, the analysis system 125 can identify the configuration parameters XYZ that correspond to container A and apply the configuration parameters XYZ to each of the retrieved exchanges to update the exchanges. The analysis system 125 can update the ledger 117 with the updated exchanges by either inserting new entries for the updated exchanges into the ledger 117 or updating (e.g., replacing) the corresponding exchanges in the ledger 117 with the updated exchanges. The analysis system 125 may similarly update the exchanges for different containers over time to update the ledger 117. Accordingly, the analysis system 125 may maintain an up-to-date ledger 117 while minimizing the querying processing requirements to do so.

Still referring to FIG. 1A, the input/output interface (or circuit) 126 is structured to receive communications from and provide communications to third-parties and third-party customers associated with the provider system 110. The input/output interface 126 is structured to exchange data, communications, instructions, etc., with an input/output component of the provider system 110. In one embodiment, the input/output interface 126 includes communication circuitry for facilitating the exchange of data, values, messages, and the like between the input/output interface 126 and the components of the provider system 110. In yet another embodiment, the input/output interface 126 includes machine-readable media for facilitating the exchange of information between the input/output interface 126 and the components of the provider system 110. In yet another embodiment, the input/output interface 126 includes any combination of hardware components, communication circuitry, and machine-readable media.

In some embodiments, the input/output interface 126 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output interface 126 may provide an interface for the user to interact with various applications stored on the provider system 110. For example, the input/output interface 126 includes a keyboard, keypad, mouse, joystick, touch screen, microphone, biometric device, virtual reality headset, smart glasses, smart headset, and the like. As another example, input/output interface 126, may include, but is not limited to, a television monitor, computer monitor, printer, facsimile machine, speaker, and so on. As used herein, virtual reality, augmented reality, and mixed reality may each be used interchangeably yet refer to any kind of extended reality.

In general, one or more third-party systems 150 may be used by a third-party with a relationship to a user (e.g., provider, vendor, supplier, business partner, and so on) to perform various actions and/or access various types of data, some of which may be provided over network 130. A "third-party" as used herein may refer to an individual operating one or more third-party systems 150, interacting with resources or data via the third-party systems 150. The third-party systems 150 may be used to electronically transmit data (e.g., third-party data) to the user devices 140, and/or provider system 110, to access websites (e.g., using a browser), supply services, supply products, and to receive and/or transmit other types of data. In various implementations, the application 142 of user device 140 may be provided by third-party system 150. For example, a bank that offers loans may have an application form (e.g., 142) that is downloadable onto a mobile phone (e.g., 140). In some implementations, the provider system 110 can be integrated (or embedded) into a third-party application (e.g., application 142 downloaded by user device 140) such that API calls can be executed to provide capacity plans, configuration parameters and controls structures to users associated with the third-party of the third-party system 150. In various implementations, integration can include communicating over network 130 with a host process (e.g., of the third-party systems) via an API and/or an interface that is embedded into the host's webservice or application. Once integrated, the third-party application can collect environmental data, present real-time capacity plans, provide configuration parameters (including one or more terms), provide control structures (including one or more rules datasets) and/or other functionality described herein associated with the provider system 110.

The third-party system 150 may be managed by a provider, such as a credit card issuer, a financial institution, consultant, retailer, service provider and/or the like. The third-party system 150 similarly includes a processing circuit 152, a processor 154, memory 155, an input/output interface 158 and a network interface 159. The processing circuit 152, processor 154, memory 155, input/output interface 158 and the network interface 159 may function substantially similar to and include the same or similar components as the components of provider system 110, such as the processing circuit 112, processor 114, memory 116, input/output interface 126 and network interface 128, described above. As such, it should be understood that the processing circuit 112, processor 114, memory 116, input/output interface 126, and network interface 128 of the provider system 110 described above may be similarly applied to the processing circuit 152, processor 154, the memory 155, input/output interface 158 and network interface 159 of the third-party system 150.

For example, the network interface 159 is similarly structured and used to establish connections with other computing systems (e.g., the provider system 110, user devices 140, data sources 160 and content management system 170) via the network 130. The network interface 159 may further include any or all of the components discussed above, with reference to the network interface 128.

The processing circuit 152 similarly includes a processor 154 and a memory 155. The processor 154 and the memory 155 are substantially similar to the processor 114 and the memory 116 described above, with reference to the provider system 110. In some embodiments, the memory 155 includes a customer database 156. The customer database 156 may be structured to store data concerning each customer of with the third-party (e.g., FI customer). In some embodiments, the customer database 156 may store data regarding identification information, bank account information, investments, securities, loans, mortgages, other services used by the customer of the third-party, an associated user device 140, credentials, and so forth, of a customer of the third-party associated with the third-party system 150. For example, the customer database 156 may save biometric information (e.g., a fingerprint scan, eye scan, voice memo, etc.) and a password (e.g., PIN, alphanumeric code, QR code, barcode, etc.) for each customer of the third-party. As another example, the customer database 156 stores security and data access rights for each customer that are utilized in conducting particular exchanges (e.g., credit card exchanges, loans, cryptocurrency exchanges, etc.) or updates (e.g., plan allocations, capacity plan updates, configuration parameters). Furthermore, the data stored in the customer database 156 may include personal information (e.g., names, addresses, phone numbers, and so on), authentication information (e.g., username/password combinations, device authentication tokens, security question answers, unique client identifiers, biometric data, geographic data, social media data, and so on), and financial information (e.g., capacity plan information, configuration parameters, account numbers, account balances, available credit, credit history, exchange histories, and so on) relating to the various users and associated third-party accounts.

The processing circuit 152 also is shown to include a third-party interface 157. In some embodiments, the third-party interface 157 can transmit and receive a plurality of data (e.g., environmental data, exchange data, activity data, ledger data) to and from a plurality of data sources (e.g., provider system 110, ledger 117, capacity plan database 118, third-party database 119, user devices 140, data sources 160, and content management system 170) via one or more data channels (e.g., over network 130). Each data channel may include a network connection (e.g., wired, wireless, cloud) between the data sources and the system (e.g., 140, 150, 170). For example, the third-party interface 157 can receive exchange data from a user device 140 (e.g., via application 142) and in turn, update the customer database 156. In some implementations, the exchange may be sent to the provider system 110. In various implementations, the user device 140 may send the exchange data in parallel to the third-party system 150 and the provider system 110. Additionally, the third-party interface 157 may provide an application to the user device 140. In some implementations, the application may be generated and presented by the content management system 170 based on source code and parameters provided by third-party system 150. Although the customer database 144 and third-party interface 157 are shown as being a part of the third-party system 150, these components may alternatively be a part of or integrated in the provider system 110.

The input/output interface 158 may function substantially similarly to and include the same or similar components as the input/output interface 126 described above, with reference to the provider system 110. Accordingly, it will be understood that the description of the input/output interface 126 described above may also be applied to the input/output interface 158 of the third-party system 150. As an example, the input/output interface 158 is similarly structured to receive communications from and provide communications to user devices 140 of customers.

Further with respect to the components of FIG. 1A, a content management system 170 may be configured to generate content for displaying to users. The content can be selected from among various resources (e.g., webpages, applications). The content management system 170 is also structured to provide content (e.g., via a graphical user interface (GUI)) to the user devices 140 and/or third-party system 150, over the network 130) for display within a resource. For example, in various arrangements, a capacity plan dashboard may be integrated in an institution's application or provided via an Internet browser. The content from which the content management system 170 selects may be provided by the provider system 110 via the network 130 to one or more user devices 140. In some implementations, the content management system 170 may select content to be displayed on the user devices 140. In such implementations, the content management system 170 may determine content to be generated and published in one or more content interfaces of resources (e.g., webpages, applications).

The content management system 170 may include one or more systems (e.g., computer-readable instructions executable by a processor) and/or circuits (e.g., ASICs, Processor Memory combinations, logic circuits) configured to perform various functions of the content management system 170. The content management system 170 can be run or otherwise be executed on one or more processors of a computing device, such as those described below with respect to FIG. 1A. In some implementations, the systems may be or include an interface system 181 and an interface generator 182. It should be understood that various implementations may include more, fewer, or different systems relative to those illustrated in FIG. 1A, and all such modifications are contemplated within the scope of the present disclosure.

The content management system 170 similarly includes a processing circuit 172, a processor 174, a memory 176, an input/output interface 186, and a network interface 188. The processing circuit 172, processor 174, memory 176, input/output interface 186 and network interface 188 may function substantially similar to and include the same or similar components as the components of provider system 110, such as the processing circuit 112, processor 114, memory 116, input/output interface 126 and network interface 128, described above. As such, it should be understood that the processing circuit 112, the processor 114, the memory 116, the input/output interface 126, and the network interface 128 of the provider system 110 provided above may be similarly applied to the processing circuit 172, the processor 174, the memory 176, the input/output interface 186, and the network interface 188 of the content management system 170.

For example, the network interface 188 is similarly structured and used to establish connections with other computing systems (e.g., the provider system 110, user devices 140, third-party systems 150 data sources 160) via the network 130. The network interface 188 may further include any or all of the components discussed above, with reference to the network interface 128.

The processing circuit 172 similarly includes a processor 174 and a memory 178. The processor 174 and the memory 176 are substantially similar to the processor 114 and the memory 116 described above, with reference to the provider system 110. In some embodiments, the memory 176 includes a content database 177. The content database 177 may be structured to store data concerning source code, data structures, and content of capacity plan dashboards. The content database 177 can include data structures for storing information such as system definitions for customized dashboards generated by the interface generator 182, animated or other content items, and/or additional information. The content database 177 can be part of the content management system 170, or a separate component that the content management system 170, interface system 181, and/or interface generator 182, can access via the network 130. The content database 177 can also be distributed throughout the computing environment 100 and provider system 110. For example, the content database 177 can include multiple databases associated with a specific third-party (e.g., third-party systems 150), and/or a specific user device (e.g., user devices 140). The content database 177 and/or the content management system 170 can use various APIs to perform database functions (e.g., managing data stored in content database 177). The APIs can include SQL, NoSQL, NewSQL, ODBC, and/or JDBC components.

The processing circuit 172 is also shown to include an interface system 181 and an interface generator 182. In some embodiments, the interface system 181 can be configured to provide one or more customized dashboards (e.g., stored in content database 177) to one or more computing devices (e.g., user devices 140, third-party systems 150 and/or the provider system 110) for presentation. That is, the provided customized dashboards can execute and/or be displayed at the computing devices described herein. In some arrangements, the customized dashboards can be provided within a web browser. In some arrangements, the customized dashboards can include PDF files. In some arrangements, the customized dashboards can be provided via email. According to various arrangements, the customized dashboards can be provided on-demand or as part of push notifications.

In various implementations, the interface system 181 executes operations to provide the customized dashboards to the user devices 140, third-party systems 150, and/or the provider system 110 without utilizing the web browser. In various arrangements, the interface system 181 (the customized dashboard) can be provided within an application (e.g., mobile or desktop application). The dashboard from which the content management system 170 generates (e.g., the interface generator 182) may be provided to one or more third-parties, via the network 130, to one or more third-party systems 150. In some arrangements, the content management system 170 may select capacity plan and specific container information to be displayed on the user devices 140.

In some embodiments, the interface system 181 can include both a client-side application and a server-side application. For example, the interface system 181 can be written in one or more general purpose programming languages and can be executed by user devices 140, third-party systems 150, and/or provider system 110. The server-side interface system 181 can be written, for example, in one or more general purpose programming languages, and can be executed by the provider system 110 and/or content management system 170.

The interface generator 182 can be configured to generate a plurality of customized dashboards and their properties. The interface generator 182 can generate customized user-interactive dashboards for one or more entities, such as the third-party systems 150, based on data received from provider system 110, any other computing device described herein, and/or any database described herein (e.g., 116, 155, 160). The generated dashboards can include various data (e.g., data stored in the content database 177, memory 155, and/or memory 116) associated with one or more capacity plans, containers, configuration parameters, and control structures.

The input/output interface 186 may function substantially similarly to and include the same or similar components as the input/output interface 126 described above, with reference to the provider system 110. Accordingly, it will be understood that the description of the input/output interface 126 described above may also be applied to the input/output interface 186 of the third-party system 150. As an example, the input/output interface 186 is similarly structured to receive communications from and provide communications to user devices 140 of customers.

The network 130 may include a local area network (LAN), wide area network (WAN), telephone network (such as the Public Switched Telephone Network (PSTN)), wireless link, intranet, the Internet, or combinations thereof. The provider system 110 and computing environment 100 can also include at least one data processing system or processing circuit, such as the provider system 110, user devices 140, third-party systems 150, multi-data sources 160 and/or the content management system 170. The provider system 110 can communicate via the network 130, for example with the user devices 140, the third-party systems 150, and/or the data sources 160.

The network 130 can enable communication between various nodes, such as the provider system 110 and user devices 140. In some implementations, data flows through the network 130 from a source node to a destination node as a flow of data packets (e.g., formed in accordance with the Open Systems Interconnection (OSI) layers). A flow of packets may use, for example, an OSI layer-4 transport protocol such as the User Datagram Protocol (UDP), Transmission Control Protocol (TCP) or Stream Control Transmission Protocol (SCTP), transmitted via the network 130 layered over an OSI layer-3 network protocol such as Internet Protocol (IP), e.g., IPv4 or IPv6. The network 130 is composed of various network devices (nodes) communicatively linked to form one or more data communication paths between participating devices. Each networked device includes at least one network interface for receiving and/or transmitting data, typically as one or more data packets. An illustrative network 130 is the Internet; however, other networks may be used. The network 130 may be an autonomous system ("AS"), e.g., a network that is operated under a consistent unified routing policy (or at least appears to from outside the AS network) and is generally managed by a single administrative entity (e.g., a system operator, administrator, or administrative group).

The network 130 may be composed of multiple connected sub-networks or AS networks, which may meet at one or more of an intervening network (a transit network), dual-homed gateway node, point of presence (POP), Internet exchange Point (IXP) and/or additional network boundaries. The network 130 can be a local-area network (LAN) such as a company intranet, a metropolitan area network (MAN), a wide area network (WAN), an inter network such as the Internet, or a peer-to-peer network, e.g., an ad hoc Wi-Fi peer-to-peer network. The data links between nodes in the network 130 may be any combination of physical links (e.g., fiber optic, mesh, coaxial, twisted-pair such as Cat-5 or Cat-6, etc.) and/or wireless links (e.g., radio, satellite, microwave, etc.).

The network 130 can include carrier networks for mobile communication devices, e.g., networks implementing wireless communication protocols such as the Global System for Mobile Communications (GSMC), Code Division Multiple Access (CDMA), Time Division Synchronous Code Division Multiple Access (TD-SCDMA), Long-Term Evolution (LTE), or any other such protocol including so-called generation 3G, 4G, 5G, and 6G protocols. The network 130 can include short-range wireless links, e.g., via Wi-Fi, BLUETOOTH, BLE, or ZIGBEE, sometimes referred to as a personal area network (PAN) or mesh network. The network 130 may be public, private, or a combination of public and private networks. The network 130 may be any type and/or form of data network and/or communication network.

The network 130 can include a network interface controller that can manage data exchanges with devices in the network 130 (e.g., the user devices 140) via a network interface (sometimes referred to as a network interface port). The network interface controller handles the physical and data link layers of the Open Systems Interconnection (OSI) model for network communication. In some implementations, some of the network interface controller's tasks are handled by one or more processing circuits. In various implementations, the network interface controller is incorporated into the one or more processing circuits, e.g., as circuitry on the same chip.

In some implementations, the network interface controller supports wireless network connections and an interface is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In various implementations, the network interface controller implements one or more network protocols, such as Ethernet. Generally, the provider system 110 can be configured to exchange data with other computing devices via physical or wireless links through a network interface. The network interface may link directly to another device or to another device via an intermediary device, e.g., a network device such as a hub, bridge, switch or router, connecting the provider system 110 to the network 130.

One or more user devices 140 (e.g., smartphones, tablets, computers, etc.) may be used by a user to perform various actions and/or access various types of content, some of which may be provided over a network 130 (e.g., the Internet, LAN, WAN, etc.). A "user" or "entity" as used herein may refer to an individual operating user devices 140, interacting with resources or content via the user devices 140, etc. The user devices 140 may be used to send data (e.g., activity data, environmental data) to the provider system 110 or may be used to access websites (e.g., using an Internet browser), the Internet (e.g., using a mobile application), media files, and/or any other types of content. In some implementations, the user devices 140 have enabled location services which can be tracked over the network 130. Locations services may use global positioning system (GPS) or other technologies to determine a location of the user devices 140.

The user device 140 (sometimes referred to herein as a "computing system") may be a mobile computing device, desktop computer, smartphone, tablet, smart watch, smart sensor or any other device configured to facilitate receiving, displaying and interacting with content (e.g., webpages, mobile applications, etc.). The user device 140 may include an application 142 to receive and display content and to receive user interactions with the content. For example, an application 142 may be a web browser. Additionally, or alternatively, the application 142 may be a mobile application.

User device 140 may also include an input/output circuit for communicating data over network 130 (e.g., receive and transmit to provider system 110 and/or third-party systems 150). In particular, the input/output circuit that is structured to send and receive communications over network 130 (e.g., with the provider system 110 and/or third-party systems 150). The input/output circuit is structured to exchange data (e.g., exchange data, capacity plan information, configuration parameters, control structures), communications, instructions, etc., with an input/output component of the various systems and devices described herein. In one implementation, the input/output circuit includes communication circuitry for facilitating the exchange of data, values, messages, and the like between the input/output circuit and the provider system 110 and/or third-party systems 150. In yet another implementation, the input/output circuit includes machine-readable media for facilitating the exchange of information between the input/output circuit and the provider system 110 and/or third-party systems 150. In yet another embodiment, the input/output circuit includes any combination of hardware components, communication circuitry, and machine-readable media.

In various implementations, the user device 140 can receive user input from a user (e.g., via sensors, or any other input/output devices/ports described herein). A user input can be a plurality of inputs, including, but not limited to, a gesture (e.g., a flick or a shake of user device 140, a user-defined custom input (e.g., utilizing an API), biological data (e.g., stress level, heart rate, hand geometry, facial geometry, psyche), and/or behavioral data (e.g., haptic feedback, gesture, speech pattern, movement pattern (e.g., hand, food, arm, facial, iris)), or combination thereof, etc. In some embodiments, one or more user inputs can be utilized to perform various actions on user device 140. For example, a user that performs an input may invoke a interface schemes for customizing one or more capacity plans, configuration parameters or control structures.

The application 142 may include a collection of software development tools contained in a package (e.g., software development kit (SDK), API, integrated development environment (IDE), debugger, etc.). For example, application 142 may include an application programming interface (API) configured for communication with provider system 110—in particular, the data manager 124. In another example, application 142 may include a debugger. In yet another example, application 142 may be an SDK that includes an API, a debugger, an IDE, and so on. In some implementations, application 142 includes one or more libraries having reusable functions that interface with a particular system software (e.g., iOS, Android, Linux, etc.). For example, application 142 can automatically transmit (e.g., via a secure connection) environmental data whenever an exchange associated with a capacity plan occurs. In various implementations, application 142 can be provided within an application (e.g., mobile application, desktop application). The application 142, from which the provider system 110 and/or third-party systems 150 hosts may be provided (e.g., downloaded, or via a webpage) to one or more user devices 140 (via the network 130).

In an example implementation, the application 142 can be executed (e.g., downloaded for a mobile-based application) and/or presented (e.g., via a website for a web-based application) by the user device 140 that can cause an application interface to be overlaid with a schemes interface on the user device 140. For example, the user may perform a gesture (e.g., input) and/or selection (e.g., from a selectable element or actionable object) on the user device 140 to invoke the application 142. In response, the application 142 may request data, such a capacity plan information, configuration parameters, third-party information, and/or control structure information stored in memory 116. For example, upon the request, the user device 140 may present configuration parameters for one or more containers of the capacity plan, and allow selection, in real-time, to make modifications to one or more configuration parameters (e.g., coverage change for a plan, credit limit change, rewards change, due date change, interest rate update, etc.)

In another example implementation, the application 142 being executed by the user device 140 can cause a web browser to the display the customized capacity plan. For example, the user may connect (e.g., via the network 130) to a website structured to host the customized capacity plan interface (e.g., GUI). The web browser operates by receiving input of a uniform resource locator (URL) into a field from an input device (e.g., a pointing device, keyboard, touchscreen, mobile phone, etc.). In response, application 142 executing the customized capacity plan interface in the web browser may request data such as all containers associated with the user or potential containers based on activity data (e.g., previous exchanges, financial history, etc.). The web browser may include other functionalities, such as navigational controls (e.g., backward, forward and home buttons). In some implementations, the customized capacity plan interface can include both a client-side interface and a server-side interface. For example, a client-side interface can be written in one or more general purpose programming languages and can be executed by user device 140. The server-side interface can be written, for example, in one or more general purpose programming languages and can be executed by the provider system 110.

In some implementations, the user devices 140 and/or third-party systems 150 have enabled location services which can be tracked over the network 130. Location services may use a GPS or other technologies to determine a location of the user devices 140 and/or third-party systems 150. In some implementations, location information can be used by the provider system 110 to generate containers, update configuration parameters, generate additional exchange data or process exchanges associated with a capacity plan. In some implementations, users of the application 142 may have various levels of access to perform operations and review information (e.g., restricted access, access containers, review containers, submit claims, modify containers, initiate containers, authorize payment). Using a unique credentials (e.g., username, password, security code) (generally referred to herein as an "account"), a user (e.g., internal, or external) may gain access to perform various operations and review various information. Permissions associated with a user can be used to determine which data a user may access. That is, permissions can be used to define the access level of each user. For example, a certain interface can be generated that is only accessible to the users having permission to initiate or modify containers. In some implementations, permissions can be user-specific and/or each user can have separate and distinct accounts.

The computing environment 100 can include a data acquisition engine 180. In various implementations, the provider system 110 can be communicatively and operatively coupled to the data acquisition engine 180. The data acquisition engine 180 can include one or more processing circuits configured to execute various instructions. In various implementations, the data acquisition engine 180 can be configured to facilitate communication (e.g., via network 130) between provider system 110, and systems and devices described herein (e.g., user devices 140, third-party systems 150, data sources 160, content management system 170). The facilitation of communication can be implemented as an API (e.g., REST API, Web API, customized API), batch files, SDK, and/or queries. In various implementations, the data acquisition engine 180 can also be configured to control access to resources of the provider system 110. The API can be used by the data acquisition engine 180 and/or computing systems to exchange data and make function calls in a structured format. The API may be configured to specify an appropriate communication protocol using a suitable electronic data interchange (EDI) standard or technology.

The data sources 160 can provide data to the provider system 110. In some implementations, the data sources 160 can be structured to collect data from other devices on network 130 (e.g., user devices 140, third-party systems 150, content management system 170) and relay the collected data to the provider system 110. In one example, an entity may have a server and database (e.g., proxy, enterprise resource planning (ERP) system) that stores network information associated with the user and/or third-party. In this example, the provider system 110 may request data associated with specific data stored in the data source (e.g., data sources 160) associated with the user (e.g., exchange data, configuration parameter information, control structure information). For example, in some implementations, the data sources 160 can host or otherwise support a search or discovery engine for Internet-connected devices. The search or discovery engine may provide data, via the data acquisition engine 180, to the provider system 110.

The data sources 160 can provide data to the provider system 110 based on the data acquisition engine 180 scanning (e.g., monitoring) the Internet (e.g., various data sources and/or data feeds) for data associated with capacity plans. That is, the data acquisition engine 180 can hold (e.g., in non-transitory memory, in cache memory, and/or in the database 118) the executables for performing the scanning activities on the data sources 160. Further, the provider system 110 can initiate scanning operations. For example, the provider system 110 can initiate scanning operations by retrieving plan information or account information from the database 118. As used herein, the terms "scan" and "scanning" refer to and encompass various data collection operations, which may include directly executing and/or causing to be executed any of the following operations: query(ies), search(es), web crawl(s), interface engine operation(s) (structured to enable the data acquisition engine 180 to enable an appropriate system interface to continuously or periodically receive inbound data), document search(es), dataset search(es), retrieval from internal systems of previously received data, etc. These operations can be executed on-demand and/or on a scheduled basis. In some embodiments, these operations include receiving data (e.g., exchange data, container data, capacity plan data, configuration parameters, control structures) in response to requesting the data (e.g., data "pull" operations). In some embodiments, these operations include receiving data without previously requesting the data (e.g., data "push" operations). In some embodiments, the data "push" operations are supported by the data acquisition engine 180.

In some implementations, scanning occurs in real-time such that the data acquisition engine 180 continuously scans (or collects) the data sources 160 for data associated with capacity plans in general and/or particular containers. In various implementations, scanning may occur in periodic increments such that the data acquisition engine 180 can scan the Internet for data associated with the specific user or third-party periodically (e.g., every minute, every hour, every day, every week, or any other increment of time.) In some embodiments, data acquisition engine 180 may receive feeds from various data aggregating systems that collect data associated with specific users. For example, the provider system 110 can receive specific user data from the data sources 160, via the network 130 and data acquisition engine 180. The information collected by the data acquisition engine 180 may be stored as data in or more of the databases (e.g., the capacity plan database 118, the third-party database 119) or ledgers (e.g., ledger 117).

Figure 1B:
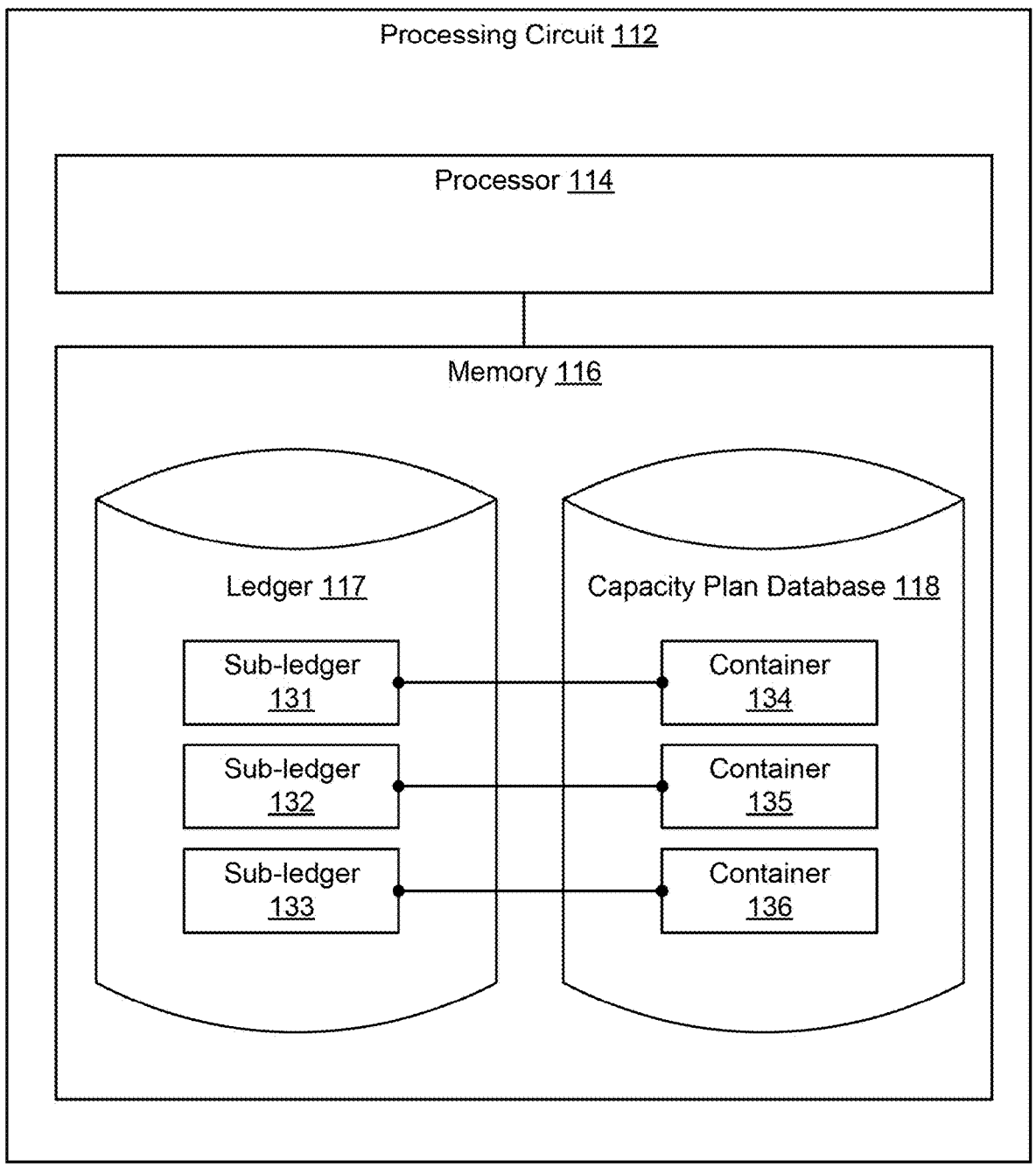
FIG. 1B is a block diagram depicting sub-ledgers linked with containers, according to some implementations.

FIG. 1B is a block diagram of a system 129 depicting sub-ledgers linked with containers, according to some implementations. As illustrated in the block diagram of the system 129, the processing circuit 112 can include the processor 114 and the memory 116. The memory 116 can include the ledger 117 and the capacity plan database 118. The ledger 117 can include sub-ledgers 131, 132, and 133. The ledger 117 can include any number of sub-ledgers. Each of the sub-ledgers 131, 132, and 133 can include one or more exchanges (e.g., data for one or more exchanges) and/or a sub-ledger value that indicates an aggregate of exchange values of the exchanges within the respective sub-ledgers 131, 132, and 133. The exchanges can be in the sub-ledgers 131, 132, and 133 based on the exchanges being labeled with labels indicating the sub-ledgers of which the exchanges are a part. In some implementations, the sub-ledgers 131, 132, and 133 can be separate data structures (e.g., tables) from each other. In such implementations, the exchanges can be stored in the separate data structures of the sub-ledgers 131, 132, and 133.

The capacity plan database 118 can include containers 134, 135, and 136. The capacity plan database 118 can include any number of containers. The containers 134, 135, and 136 can each include configuration parameters that indicate how to handle exchanges stored in the ledger 117. The configuration parameters for each container can be set by an administrator.

The sub-ledgers 131, 132, and 133 can be separately linked with the containers 134, 135, and 136. The sub-ledgers 131, 132, and 133 can be linked with the containers 134, 135, and 136 by identifiers or labels (e.g., pointers) in the respective exchanges of the sub-ledgers 131, 132, and 133 or the data structures of the sub-ledgers 131, 132, and 133 that identify the containers 134, 135, and 136. In implementations in which the sub-ledgers 131, 132, and 133 indicate labels of the exchanges within the sub-ledgers 131, 132, and 133, the labels linking the exchanges to the containers 134, 135, and 136 can be the same labels that indicate the sub-ledgers of which the exchanges are a part (e.g., the labels can be the links between the sub-ledgers and the containers). In some implementations, each sub-ledger of the ledger 117 can be linked with a single container within the capacity plan database 118.

The links between the sub-ledgers 131, 132, and 133 and the containers 134, 135, and 136 can enable the processing circuit 112 to update and perform calculations using the data of the exchanges in a manner involving less processing power and more quickly than systems that do not use the systems and methods described herein. For example, instead of updating exchange values on an exchange-by-exchange basis in which each exchange corresponds to its own configuration parameters, the processing circuit 112 can identify, using the links, the containers 134, 135, and 136 that are linked with the sub-ledgers 131, 132, and 133 of the exchanges and apply the same configuration parameters from the containers 134, 135, and 136 to each of the exchanges within the respective sub-ledgers 131, 132, and 133. In this way, the sub-ledger and container data architecture can be useful for quickly updating the exchange values as well as generating update characteristic values in compliance with applicable laws and regulations.

Figure 2:
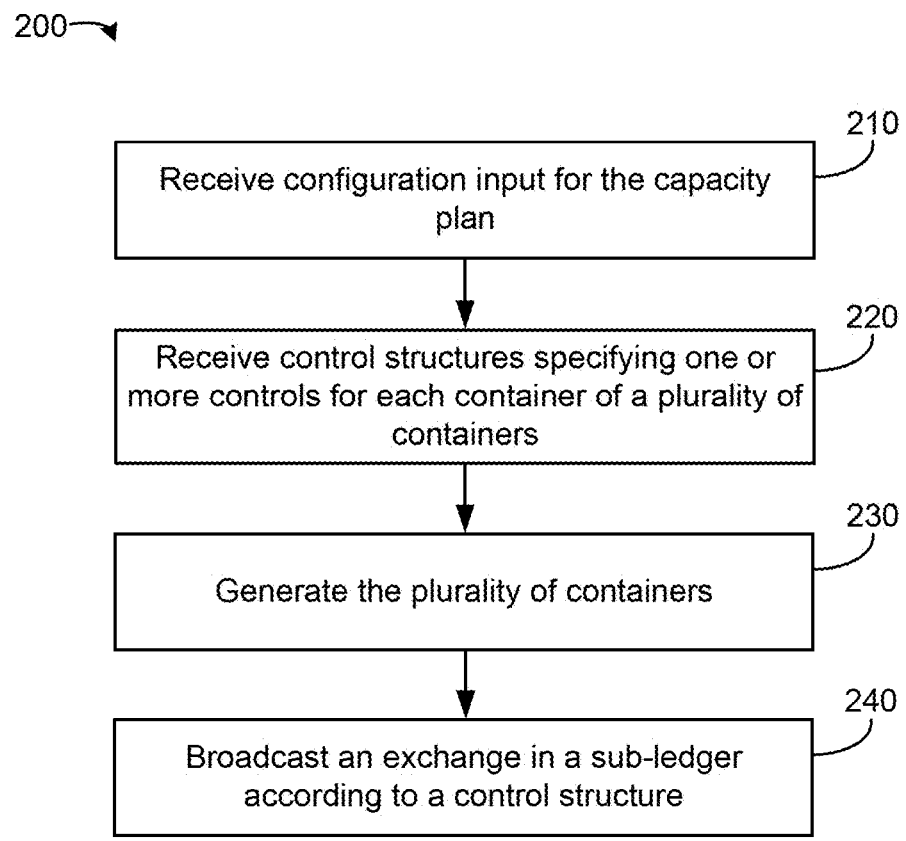
FIG. 2 is a flowchart of a method to provide a plurality of configuration parameters for individual exchanges included in a capacity plan, according to some implementations.

FIG. 2 is a flowchart of a method 200 to provide a plurality of configuration parameters for individual exchanges included in a capacity plan, according to some implementations. Provider system 110 can perform method 200. Further, any computing device described herein can be configured to perform method 200.

In broad overview of method 200, at block 210, the one or more processing circuits can receive configuration input for the capacity plan. At block 220, the one or more processing circuits can receive control structures specifying one or more controls for each container of a plurality of containers. At block 230, the one or more processing circuits can generate the plurality of containers. At block 240, the one or more processing circuits can broadcast an exchange in a sub-ledger according to a control structure. Additional, fewer or different operations may be performed depending on the particular arrangement. In some embodiments, some, or all operations of method 200 may be performed by one or more processors executing on one or more computing devices, systems or servers. In various embodiments, each operation may be re-ordered, added, removed or repeated.

At block 210, the one or more processing circuits can receive, via the communication network interface, configuration input for the capacity plan, the configuration input indicating the configuration parameters of each container of the plurality of containers. For example, the configuration input can include a plurality of terms for handling (e.g., updating) exchanges routed to a particular container.

At block 220, the one or more processing circuits can receive, via the communication network interface, control structures specifying one or more controls for each container of the plurality of containers, the control structures for a given container of the plurality of containers to be used to determine allocation of exchanges to the given container for handling according to the configuration parameters of the given container. In some implementations, the one or more processing circuits can generate the control structures specifying the one or more controls for each container of the plurality of containers, wherein each control structure of the control structures includes and executes one or more instructions determining the sub-ledger of the plurality of sub-ledgers to receive the broadcasted exchange.

At block 230, the one or more processing circuits can generate the plurality of containers to include the configuration parameters of each container of the plurality of containers. In some implementations, a plurality of containers can correspond to the capacity plan. In various implementations, each container of the plurality of containers can include configuration parameters specifying one or more aspects of handling an exchange (e.g., draw, such as withdrawal) included in the capacity plan. For example, a first container of the plurality of containers corresponds to a first control structure of the control structures, and a second container of the plurality of containers corresponds to a second control structure of the control structures. In the following example, the one or more instructions of each control structure restrict or allow the broadcasting of the exchange to one of the plurality of containers based on a rules dataset.

At block 240, the one or more processing circuits can receive exchange data for an exchange and broadcast the exchange in a sub-ledger of the plurality of sub-ledgers according to a control structure of the control structures of a corresponding container. For example, the exchange data can include exchange-specific data including, but not limited to, one or more of a merchant identifier, a date, a time, a geolocation, a merchant, a hash, or a cryptogram. In another example, the exchange data can include capacity-plan-specific exchange data including, but not limited to, one or more of a line of capacity limit, a plan product, a portfolio, a status, a balance, or a delinquency measure. In yet another example, the exchange data can include customer-specific exchange data including, but not limited to, one or more of a date of birth, a customer identifier (e.g., a customer name), a customer address, a geolocation, a zip code, a wallet identifier, or a public key. In some implementations, the one or more processing circuit can establish, utilizing a first application programming interface (API), a data feed associated with the exchange request. The data feed can be at least one of a credit card network, an exchange acquiring institution, or a merchant. In some implementations, the one or more processing circuit, in response to broadcasting the exchange in the sub-ledger of the plurality of sub-ledgers, update a second sub-ledger based on the exchange data and according to a second control structure of the control structures of a second corresponding container. In particular, the update to the second sub-ledger can include updating a sub-ledger to reconcile the exchange. For example, the second sub-ledger may be associated with a different user and the exchange may be between the user and the different user (e.g., if deposit is recorded in the first sub-ledger, then withdrawal is recorded in the second sub-ledger, if withdrawal is recorded in the first sub-ledger, then record a deposit in the second sub-ledger). In another example, a second sub-ledger may be updated if it is a universal sub-ledger that records all exchanges on all the sub-ledgers.

In some implementations, the one or more processing circuits can store, in memory, a ledger to broadcast exchanges associated with the capacity plan. The ledger can include a plurality of sub-ledgers each associated with a container of the plurality of containers. In some implementations, each exchange of the ledger is broadcasted within at least one sub-ledger of the plurality of sub-ledgers. For example, the one or more processing circuits can write an entry in a sub-ledger. In another example, the broadcasted exchange may be approved prior to being written into an entry in the sub-ledger. In some implementations, the one or more processing circuits can broadcast the exchange based on modelling the ledger by inputting the configuration parameters, exchange data, and/or the ledger including the plurality of sub-ledgers and generating an output prediction to the ledger, wherein the output prediction is a currency estimate or currency calculation associated with at least one container. Modeling the ledger can include training a model (e.g., artificial intelligence (AI), machine learning, neural network, linear regression, estimator) by the one or more processing circuits using previous exchanges that were routed based on exchange data and configuration parameters. The model can then be configured to receive configuration parameters and/or the ledger as input and output a prediction of the sub-ledger to broadcast the exchange to.

In some implementations, the one or more processing circuits can generate a statement of the capacity plan according to all exchanges broadcasted in the ledger and according to the plurality of configuration parameters and present, via a viewport (e.g., a display) of a user device, a graphical user interface (GUI) including the statement. In some implementations, the one or more processing circuits can generate the ledger according to the plurality of containers, wherein generating includes configuring the plurality of sub-ledgers associated with the plurality of containers based on the control structures. For example, upon the user or a third-party requesting a new capacity plan, the ledger can generate a plurality of sub-ledgers based on containers of the capacity plan. The generation of sub-ledgers can include generating one or more data structures and generating control structures based on received rules of the user or third-party or based on the one or more processing circuits generating rules. The ledger can include pointers to each of the sub-ledgers, and the ledger can point (using a pointer) to a root node, where the root node includes pointers to the plurality of ledgers stored in the ledger 117.

In some implementations, the one or more processing circuits can determine global configuration parameters of the plurality of containers, wherein the global configuration parameters include an aggregate of the configuration parameters of each of the plurality of containers. In particular, the global configuration parameters can be an aggregate of the configuration parameters of the plurality of containers. For example, the credit limit (e.g., a configuration parameter) on container A may be $5,000 and the credit limit on container B may be $2,500. In the following example, a global configuration parameter may be an aggregate credit limit of all the containers (e.g., $7,500).

In some implementations, the one or more processing circuits can generate, in real-time, one or more global estimates based on executing one or more functions calls with the control structures of each of the plurality of containers, wherein the one or more global estimates include at least one of a minimum threshold amount, a frequency, a response cycle (e.g., where a response can be a payment or exchange of currency), an end date cycle, a compliance rating. For example, a global estimate can be an estimate of a minimum threshold amount (or minimum payment amount) to satisfy a global configuration parameter of a container specific configuration. In another example, the global estimate can be any approximation associated with the current activity of a particular container or a plurality of containers. In some implementations, the third-party system 150 or user device 140 may request one or more global estimates.

Figure 3:
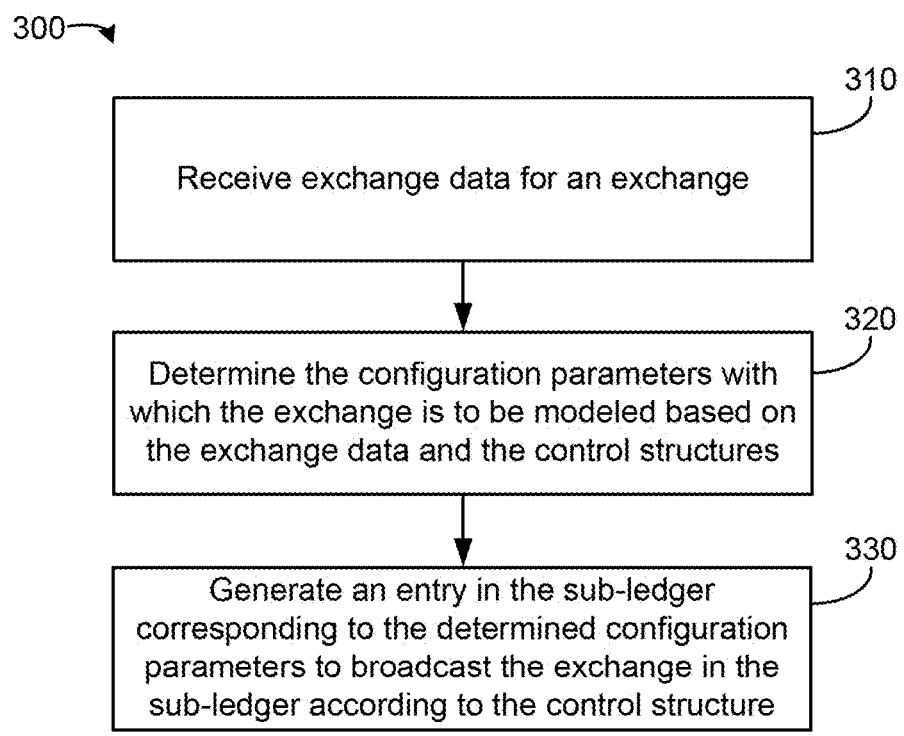
FIG. 3 is a flowchart of a method to model exchanges of a capacity plan with configuration parameters, according to some implementations.

FIG. 3 is a flowchart of a method 300 to model exchanges of a capacity plan with configuration parameters, according to some implementations. Provider system 110 can perform method 300. Further, any computing device described herein can be configured to perform method 300.

In broad overview of method 300, at block 310, the one or more processing circuits can receive exchange data for an exchange. At block 320, the one or more processing circuits can determine the configuration parameters with which the exchange is to be modeled based on the exchange data and the control structures. At block 330, the one or more processing circuits can generate an entry in the sub-ledger corresponding to the determined configuration parameters to broadcast the exchange in the sub-ledger according to the control structure. Additional, fewer or different operations may be performed depending on the particular arrangement. In some embodiments, some or all operations of method 300 may be performed by one or more processors executing on one or more computing devices, systems or servers. In various embodiments, each operation may be re-ordered, added, removed or repeated.

At block 310, the one or more processing circuits can receive, via the communication network interface, exchange data for an exchange. In some implementations, the one or more processing circuits can request or collect additional exchange data from a data source identified based on the exchange data. That is, the user device 140 or third-party system 150 may provide the exchange data for the exchange but the one or more processing circuits may request additional data from data sources 160. For example, the third-party system 150 may provide credit card information for the exchange but the one or more processing circuits may also need credit network information (e.g., rewards information, other card holders, credit score, etc.), and as such may request information from a credit card network (e.g., data source 160). The additional exchange data can be enriched with the exchange data based on aggregating the additional exchange data into the exchange data. For example, enriching can include removing duplicate information and aggregating the additional exchange data and exchange data into a new data structure or into the existing exchange data.

At block 320, the one or more processing circuits can determine the configuration parameters with which the exchange is to be modeled based on the exchange data and the control structures of the plurality of sub-ledgers. The control structures can include one or more instructions for modeling exchanges with the configuration parameters of a given sub-ledger of the plurality of sub-ledgers. In some implementations, determining the configuration parameters with which the exchange is to be modeled is further based on at least one of cross-referencing the exchange data with the control structure or applying the control structure to the exchange data. For example, the configuration parameters may be stored in memory of the one or more processing circuits. In the following example, the memory can be accessed to obtain the control structure including a rules dataset which can be cross-referenced with the exchange data. In some implementations, when multiple control structures conflict on which container to receive the exchange, a routing priority can be accessed or determined to determine which control structure is prioritized in routing the exchange to a particular container. In some implementations, determining the configuration parameters with which the exchange is to be modeled is based on inputting the exchange data and the control structure and generating an output prediction of the sub-ledger of the plurality of sub-ledgers to generate the entry in and broadcast the exchange to. Modeling the exchange can include training a model (e.g., artificial intelligence (AI), machine learning, neural network, linear regression, estimator) by the one or more processing circuits using previous exchanges that were routed based on exchange data and configuration parameters. The model can then be configured to receive configuration parameters and/or the exchange data as input and outputting a prediction of the sub-ledger to broadcast the exchange to.

At block 330, the one or more processing circuits can generate an entry in the sub-ledger corresponding to the determined configuration parameters to broadcast the exchange in the sub-ledger of the plurality of sub-ledgers according to the control structures of a corresponding container. A ledger can receive broadcasted exchanges associated with the capacity plan. In particular, a ledger can include a plurality of sub-ledgers each associated with a container of a plurality of containers such that each exchange of the ledger is broadcasted within a sub-ledger of the plurality of sub-ledgers. In some implementations, the one or more processing circuits can generate the ledger according to the plurality of containers, wherein generating includes configuring one or more sub-ledgers associated with the plurality of containers based on the control structures.

In some implementations and with reference to FIG. 2, the one or more processing circuits can determine global configuration parameters and generate, in real-time, one or more global estimates. In some implementations, the one or more processing circuit, in response to broadcasting the exchange in the sub-ledger of the plurality of sub-ledgers, update a second sub-ledger based on the exchange data and according to a second control structure of the control structures of a second corresponding container. In some implementations, the one or more processing circuit can establish, utilizing a first application programming interface (API), a data feed associated with the exchange request. The data feed can be at least one of a credit card network, an exchange acquiring institution, or a merchant.

Figure 4:
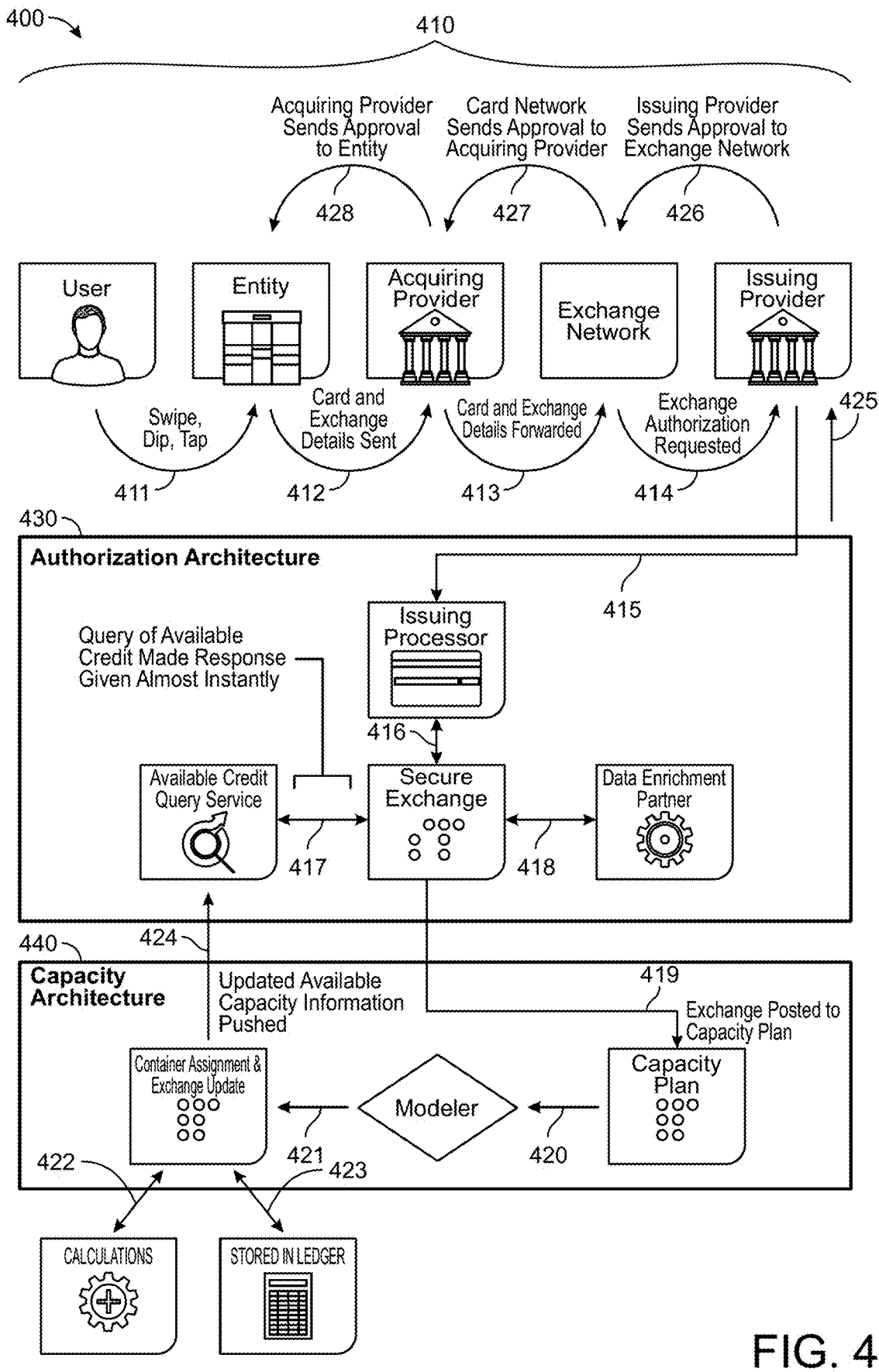
FIG. 4 is a system architecture for implementing a capacity plan, according to some implementations.

FIG. 4 is a capacity plan architecture 400, according to some implementations. In general, the capacity plan architecture 400 depicts the process of a user or customer performing an exchange and the provider system 110 (in particular, exchange modeler 120 and data manager 124) receiving exchange data from a provider for processing the exchange. Computing environment 410 depicts the process of exchanging information between the user, entity, providers and exchange networks. For example, at 411 the user can swipe, dip, tap or otherwise provide a payment form to an entity (e.g., merchant at a POS). At 412, the card and exchange details (or data) can be sent to an acquiring provider (e.g., acquiring FI). At 413, the acquiring provider can forward the card information (or other payment form) and exchange details to an exchange network, and at 414 the exchange network can request an exchange authorization (e.g., authorizing the exchange).

It will be understood that the description of the 415-425 described herein may be executed by provider system 110 and in particular, exchange modeler 120 and/or capacity modeler 122. In general, the authorization architecture 430 includes the pre-processing and post-processing of the exchange before or after the exchange is modeled by exchange modeler 120. Additionally, capacity architecture 440 can be implemented by capacity modeler 122 and received exchanges can be modeled by exchange modeler 120. At 415, the issuing provider can provide to the providing system 110 exchange data of an exchange. In some implementations, at 415, the provider system 110 can query the issuing provider on a periodic basis for new changes. At 416, the exchange and exchange data can be encrypted and/or a secure communication channel (e.g., secure socket layer (SSL), transport layer security (TLS), etc.) can be established between the issuing provider and provider system 110. At 417, the exchange data can be cross-referenced with an available credit query service to determine available credit (or other credit history) of a capacity plan or a particular container. At 418, the exchange data can be sent (e.g., securely) to a data source 160 to scrub and/or clean (e.g., fixing incorrect, incomplete, duplicate or otherwise erroneous data in the data set, detecting and correcting corrupt or inaccurate records from a record set, table, or database and by incomplete, incorrect, inaccurate, or irrelevant parts of the data and then replacing, modifying, or deleting the dirty or coarse data) the exchange data. In some implementations, the provider system 110 such as exchange modeler 120 can scrub or clean the exchange data.

At 419, the exchange can be posted or sent to the capacity plan (e.g., by capacity modeler 122). At 420, one or more control structures can be executed to determine the container to which the exchange is to be assigned (e.g., by exchange modeler 120). At 421, the exchange can be assigned to the container of the capacity plan (e.g., by exchange modeler 120). In some implementations, assignment of the exchange to a container can include updating (at 423) at least one filed of the exchange data and the exchange can be stored on a sub-ledger of ledger 117. In some implementations, assignment of the exchange to a container can additionally include sending one or more calculation requests (at 422) to the analysis system 125. For example, prior to assigning the exchange to a container, the output of the analysis system 125 can be used to model the exchange and broadcast the exchange to a particular sub-ledger. At 423, the assigning of an exchange to a container of a capacity plan can include logging information (e.g., including all updates to the ledger, sub-ledger, container, and any analysis performed) or a report indicating the updates that occurred. In some implementations, at 422, the analysis system 125 can query the ledger 117 for exchanges from one or containers using the identifiers of the containers. The analysis system 125 can apply the configuration parameters from the containers to the exchanges that correspond to the different containers to generate an updated exchange data. At 423, the analysis system 125 can update the ledger 117 by inserting the updated exchange data into the ledger 117 as new entries for each exchange or by replacing the exchanges in the ledger with the updated exchange data. At 424, the logging information or report can be provided to an available credit query service (e.g., third-party) indicating any updates that occurred (e.g., new credit limit, new balance, paid balance, late payment, settlements, etc.).

At 425, the issuing provider can be provided a response by exchange modeler 120. The response can include an indication the exchange was successfully recorded (e.g., an approval) in a ledger. At 426, the issuing provider sends approval to an exchange network. At 427, the card network can send an approval to the acquiring provider. At 428, the acquiring provider can send the approval to the entity (e.g., merchant, store, service provider, product provider).

Figure 5:
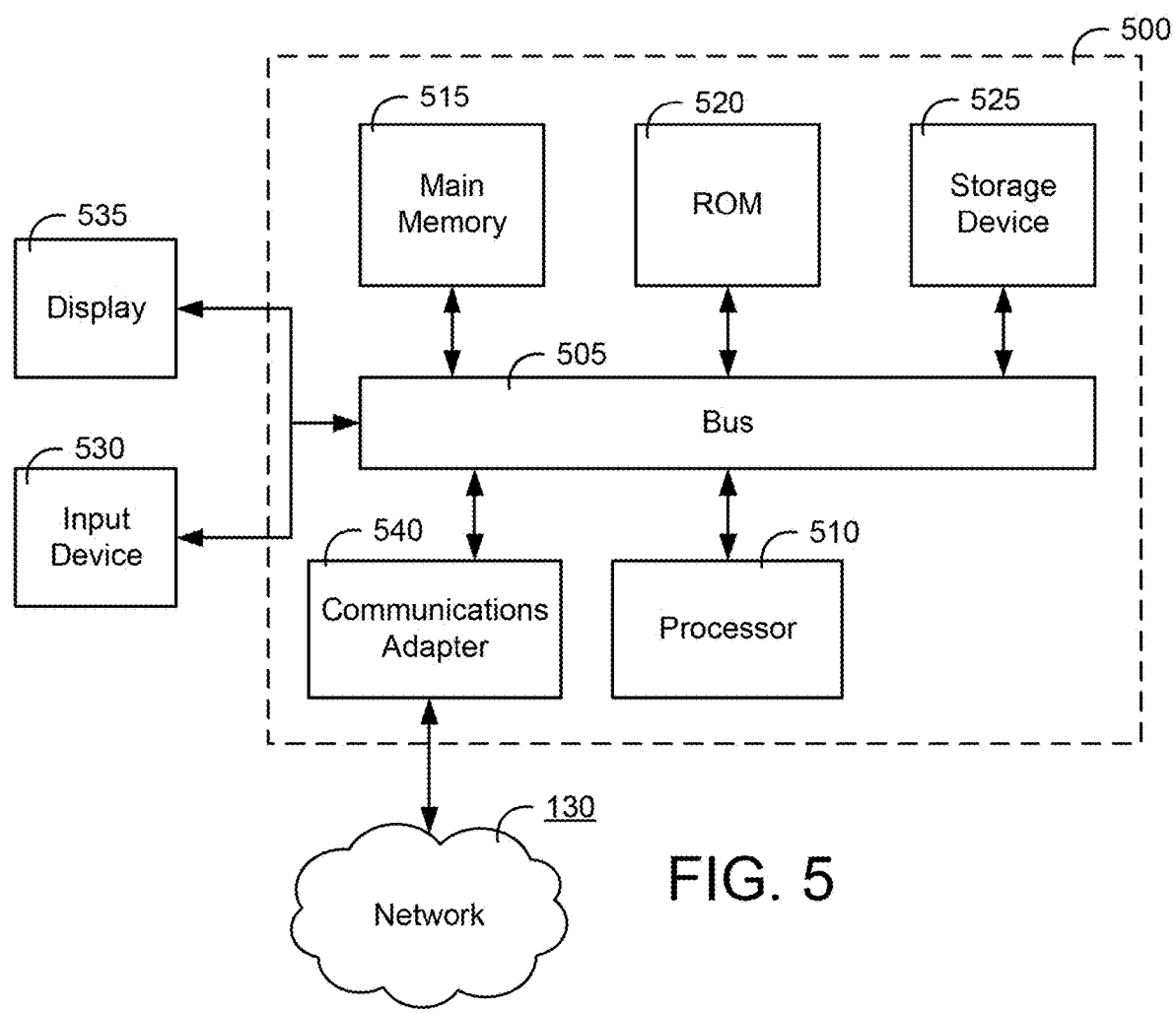
FIG. 5 is a block diagram illustrating an example computing system suitable for use in the various implementations described herein.

Referring now to FIG. 5, a depiction of a computing system 500 is shown. The computing system 500 can be used, for example, to implement a provider system 110, user devices 140, third-party systems 150, data sources 160, content management system 170, and/or various other example systems described in the present disclosure. The computing system 500 includes a bus 505 or other communication component for communicating information and a processor 510 coupled to the bus 505 for processing information. The computing system 500 also includes main memory 515, such as a random-access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid-state device, magnetic disk, or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information, and command selections to the processor 510. In another implementation, the input device 530 has a touch screen display 535. The input device 530 can include any type of biometric sensor, a cursor control, such as a mouse, a trackball, or cursor direction keys, for communicating direction information and command selections to the processor 510 and for controlling cursor movement on the display 535.

In some implementations, the computing system 500 may include a communications adapter 540, such as a networking adapter. In various illustrative implementations, any type of networking configuration may be achieved using communications adapter 540, such as wired (e.g., via Ethernet), wireless (e.g., via Wi-Fi, Bluetooth), satellite (e.g., via GPS) pre-configured, ad-hoc, LAN, WAN.

According to various implementations, the processes that effectuate illustrative implementations that are described herein can be achieved by the computing system 500 in response to the processor 510 executing an implementation of instructions contained in main memory 515. Such instructions can be read into main memory 515 from another computer-readable medium, such as the storage device 525. Execution of the implementation of instructions contained in main memory 515 causes the computing system 500 to perform the illustrative processes described herein. One or more processors in a multi-processing implementation may also be employed to execute the instructions contained in main memory 515. In alternative implementations, hard-wired circuitry may be used in place of or in combination with software instructions to implement illustrative implementations. Thus, implementations are not limited to any specific combination of hardware circuitry and software.

That is, although an example processing system has been described in FIG. 5, implementations of the subject matter and the functional operations described in this specification can be carried out using other types of digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the implementations of FIG. 5 as singular, stand-alone devices, one of ordinary skill in the art will appreciate that, in some implementations, the computing system 500 may include virtualized systems and/or system resources. For example, in some implementations, the computing system 500 may be a virtual switch, virtual router, virtual host, or virtual server. In various implementations, computing system 500 may share physical storage, hardware, and other resources with other virtual machines. In some implementations, virtual resources of the network 130 (e.g., network 130 of FIG. 1A) may include cloud computing resources such that a virtual resource may rely on distributed processing across more than one physical processor, distributed memory, etc.

FIGS. 6A-6T are example illustrations depicting a graphical user interface (GUI) 600, according to some implementations. The GUI 600 enables a user (also referred to herein as a "third-party") to generate capacity plans, modify and update control structures (based on rules), modify and update configuration parameters, review and query subledgers associated with containers, and review and query particular exchanges on the ledger. In various arrangements, the user may have a user account with login credentials associated therewith for the GUI 600 and user data stored in a database (e.g., capacity plan database 118 and/or third-party database 119). The GUI 600 can be generated by interface generator 182 of FIG. 1A.

FIG. 6A illustrates a user device that has navigated to an online webpage (e.g., via a URL) or user application (e.g., mobile application) that presents GUI 600. As shown, the GUI 600 can include a plurality of interactive elements including selectable areas 602, 604, 608, 610, toggles 612A-612D, and a selectable button 614, 616, and 618. As shown, the capacity plan can include a plurality of containers the user can customize. Interactive elements (e.g., input fields, scroll elements, selectable icons, toggles, etc.) can include, but are not limited to, text input, buttons, drop-downs, speech-to-text, and so on. Furthermore, various interactive elements are contemplated in this disclosure. For example, a user may select (e.g., via a touchscreen or pointer) a selectable area 602 to maximize on the viewport. In another example, the user may select toggle 612A to enable or disable the container. In yet another example, the user may edit a container by selecting selectable button 616, delete a container by selecting selectable button 618, or add a container by selecting selectable button 614.

Figure 6B:
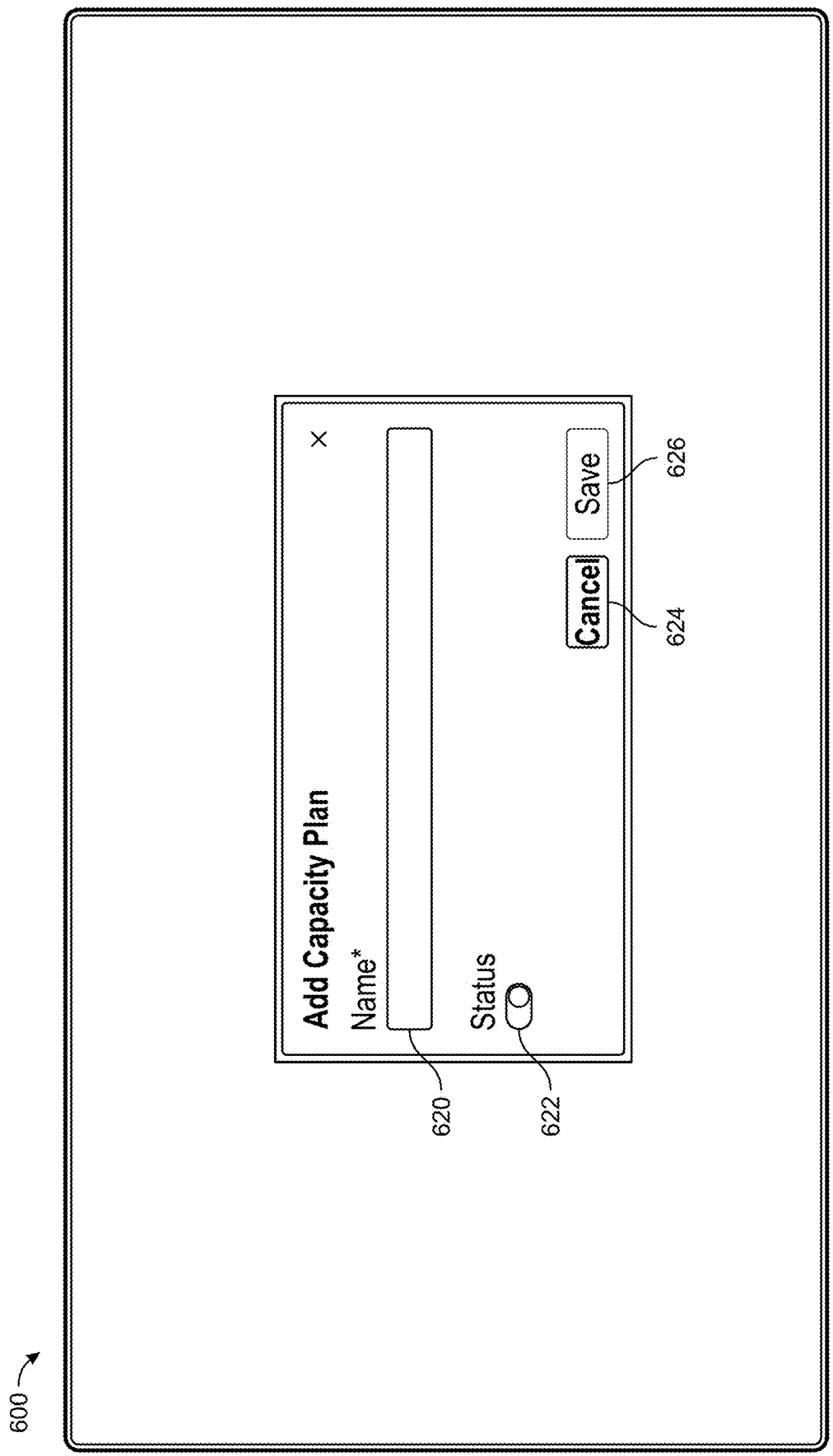
FIGS. 6A-6T are example illustrations depicting a graphical user interface, according to some implementations.
Figure 6C:
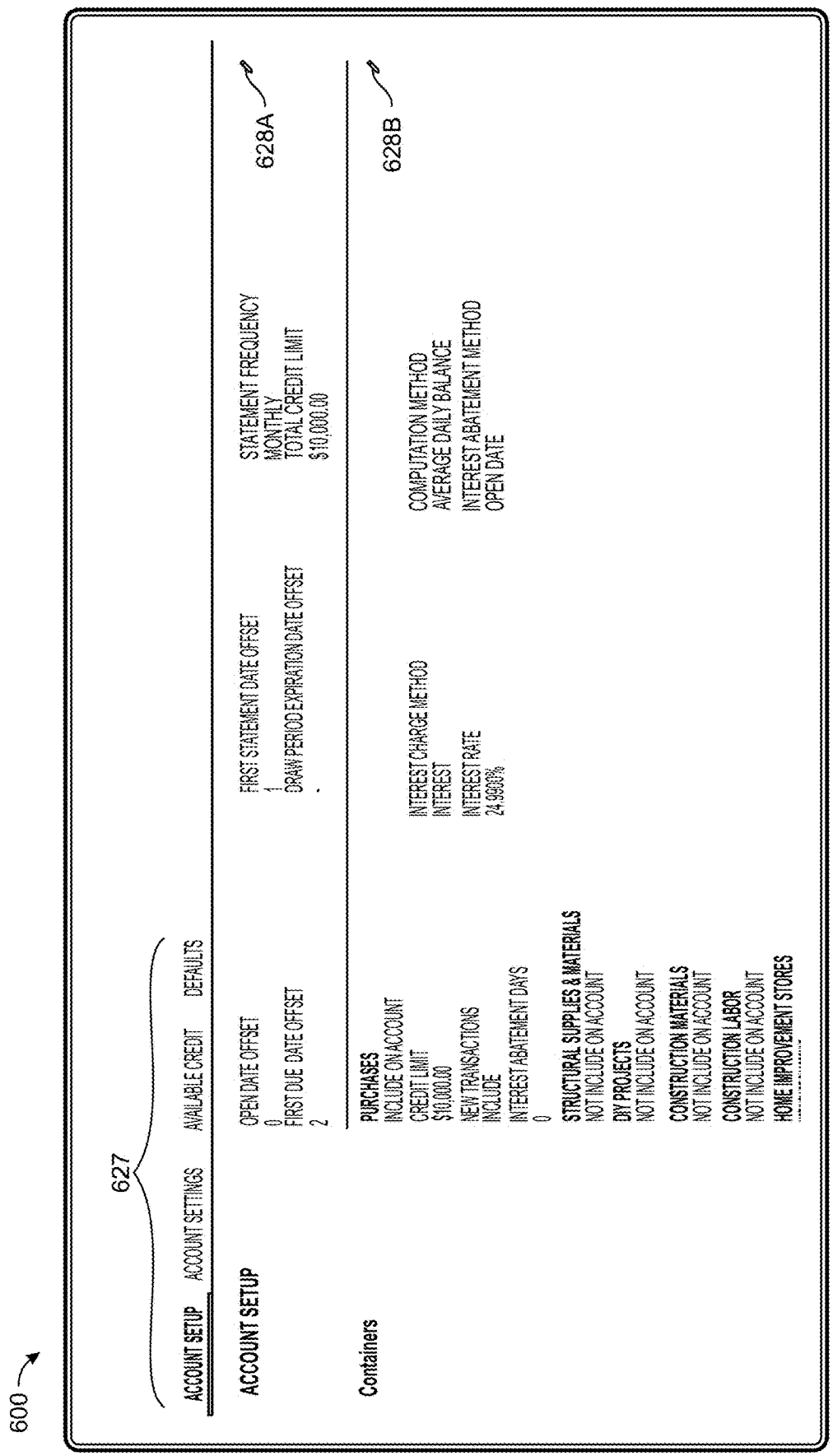
Figure 6D:
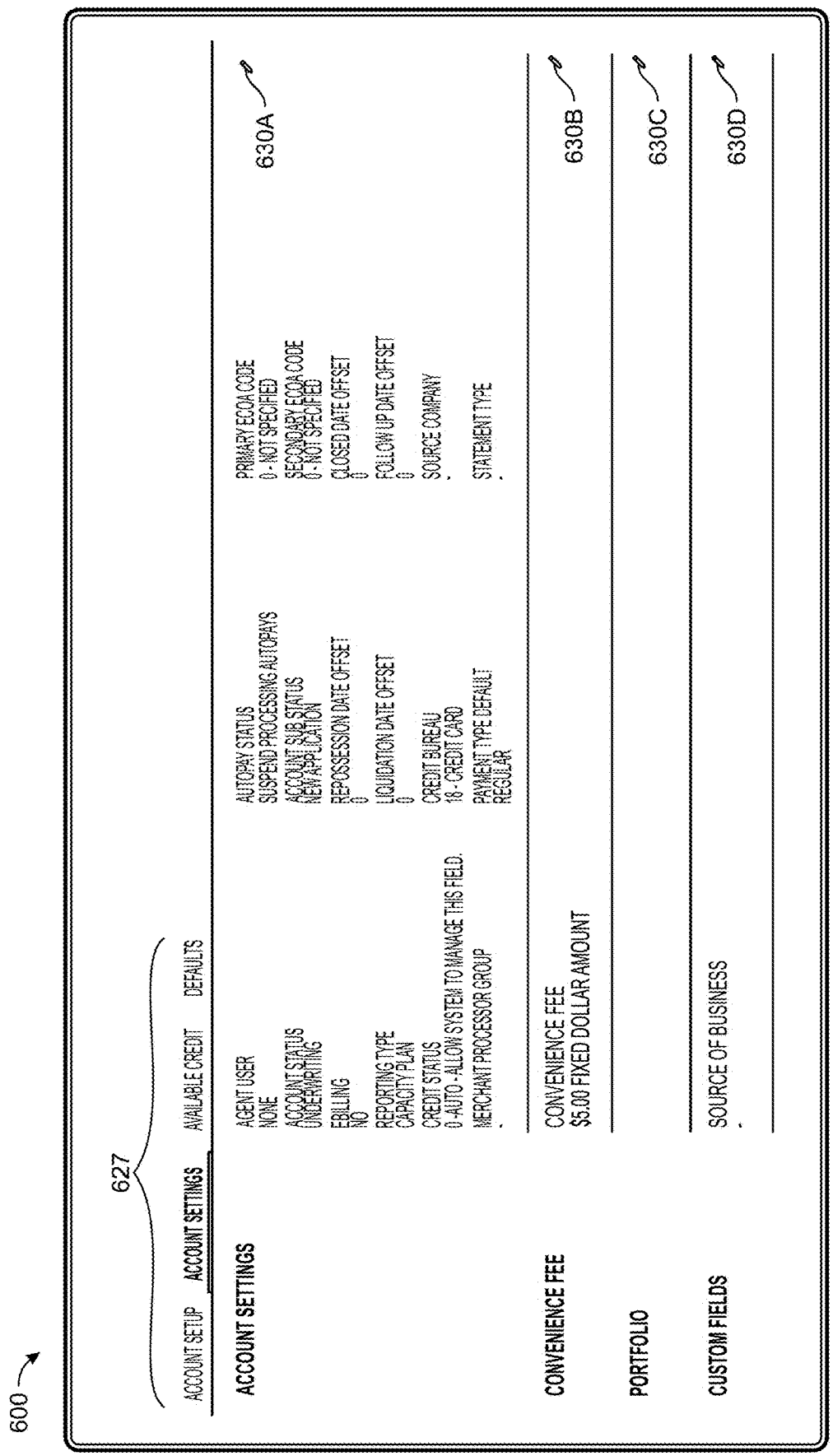
Figure 6E:
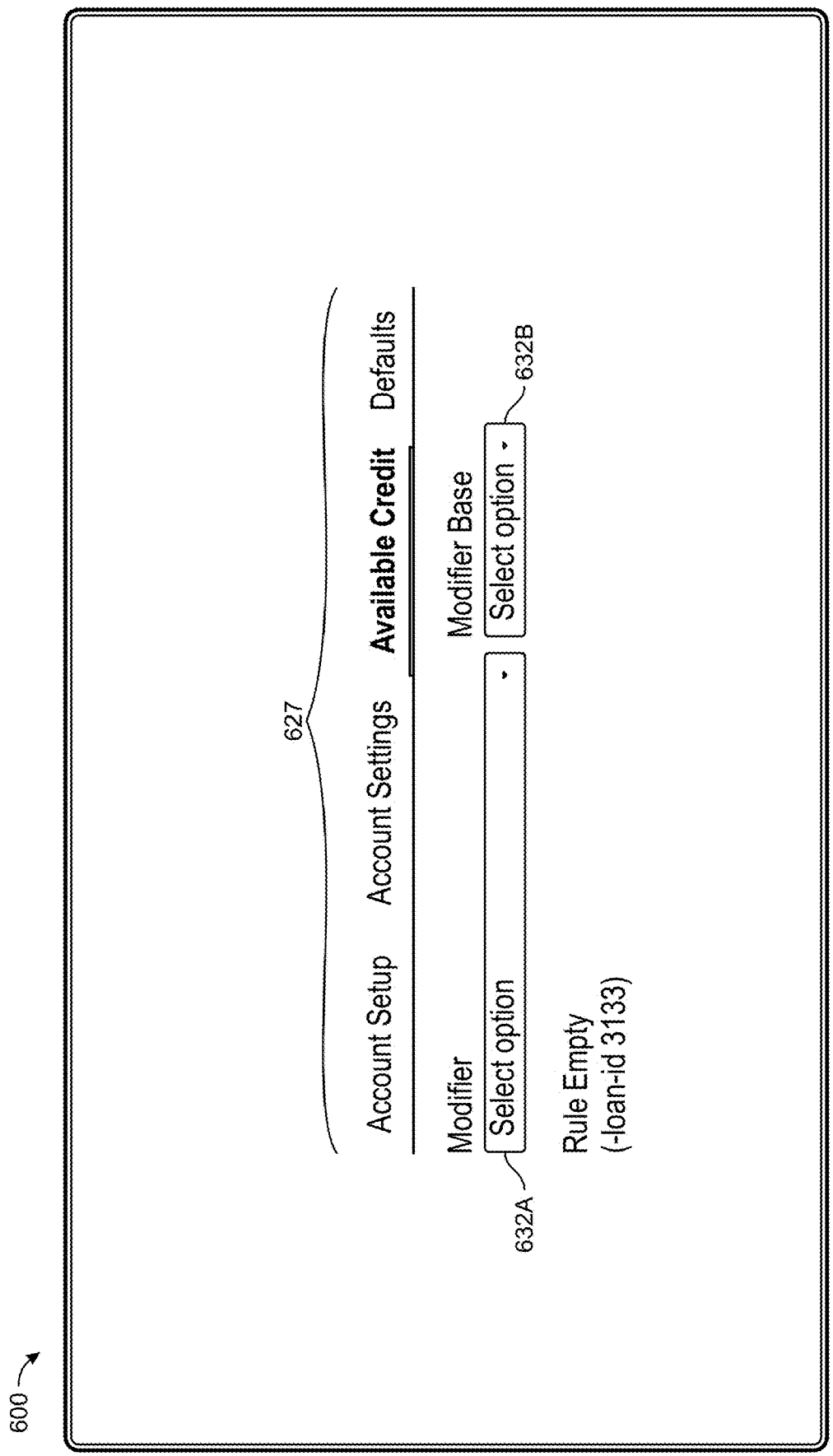

In example illustration FIG. 6B, upon a user selecting selectable button 614, the user device 140 may be presented with the GUI 600 including a plurality of interactive elements such as, but not limited to, text input 620, toggle 622, and selectable buttons 624 and 626. For example, the user may desire to create a new capacity plan upon selecting selectable button 614, and in the GUI 600 the user can name the capacity plan and determine a status, and in turn save or cancel the new capacity plan.

Figure 6F:
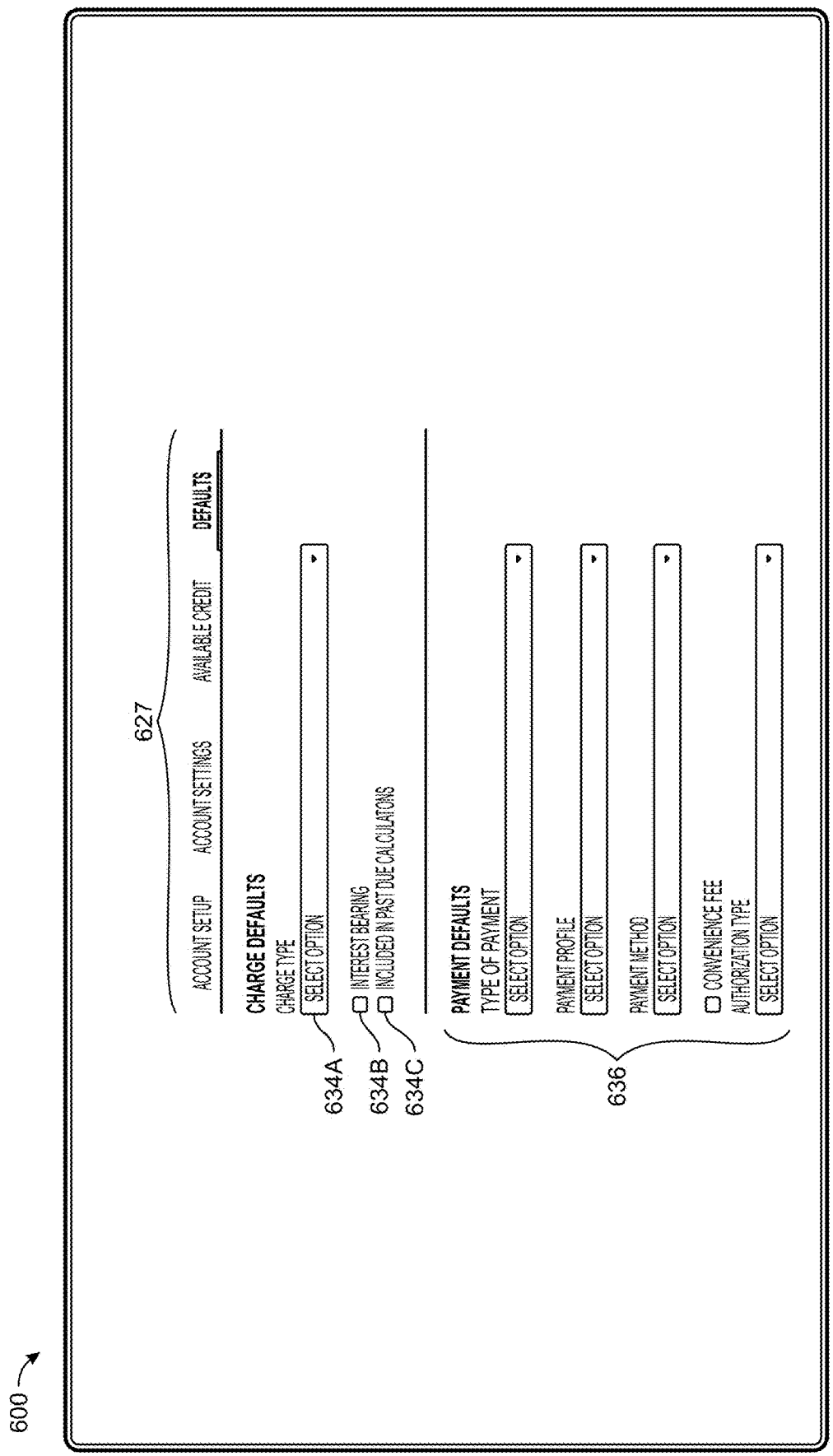
Figure 6G:
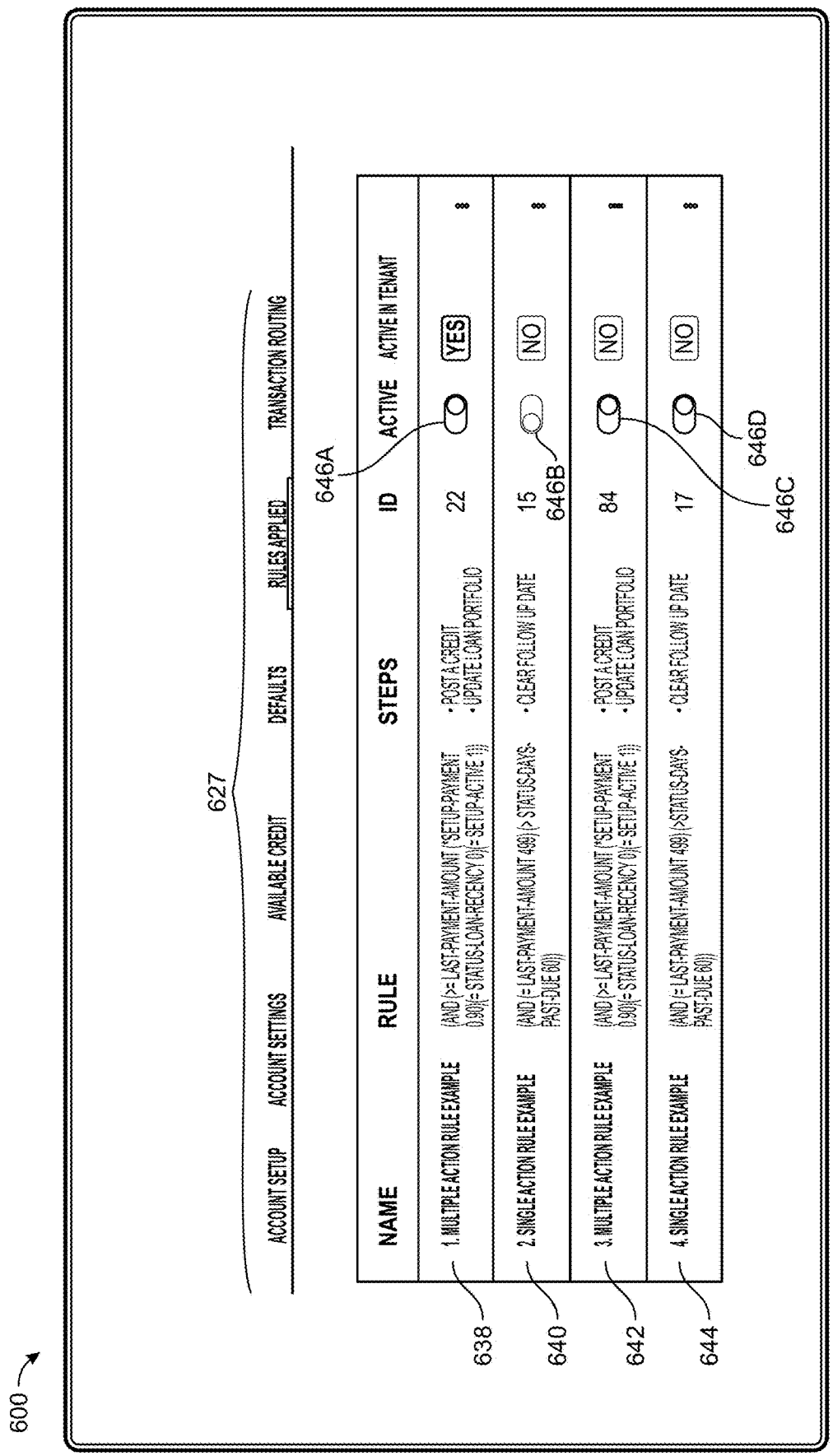
Figure 6H:
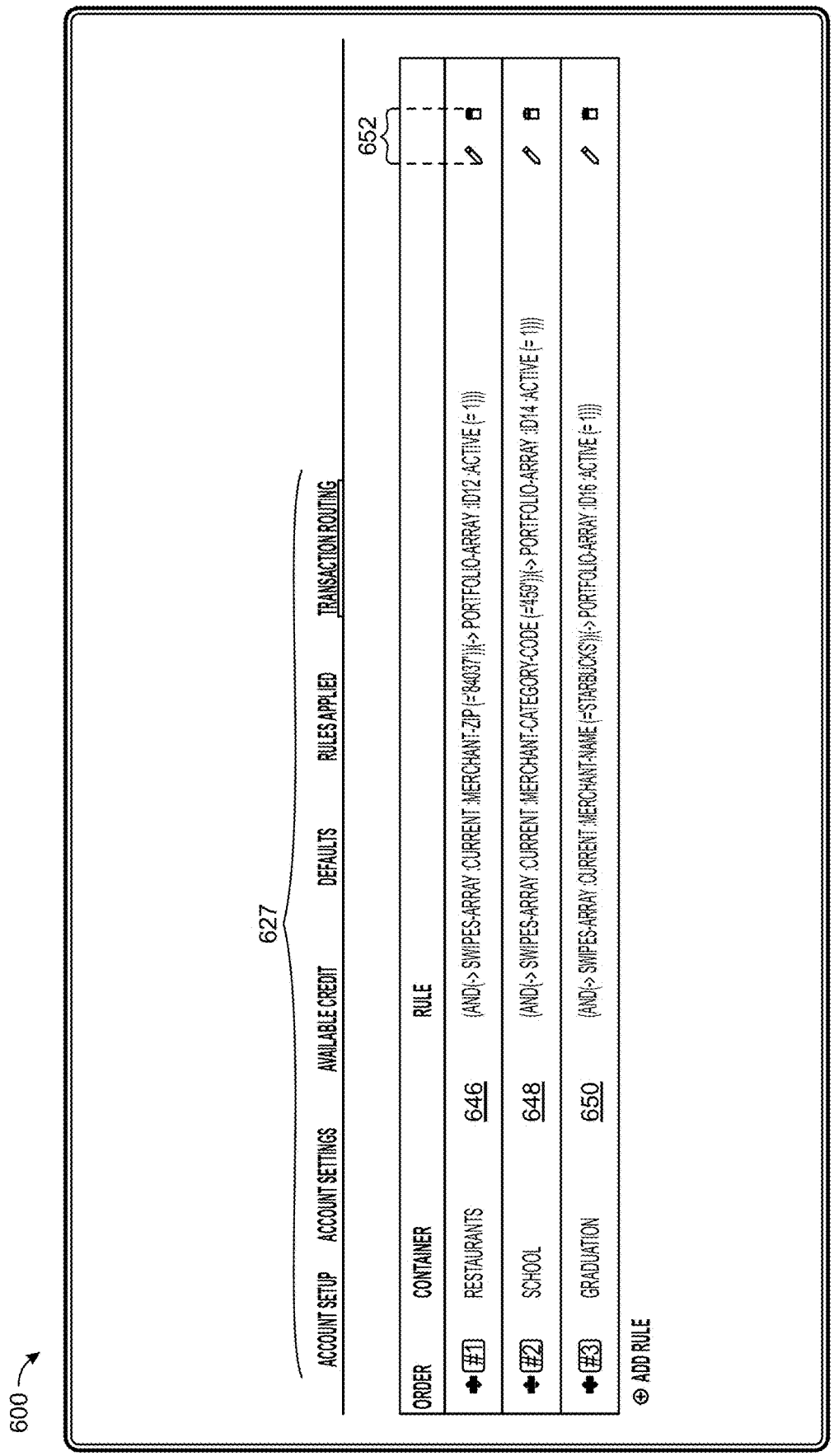
Figure 6I:
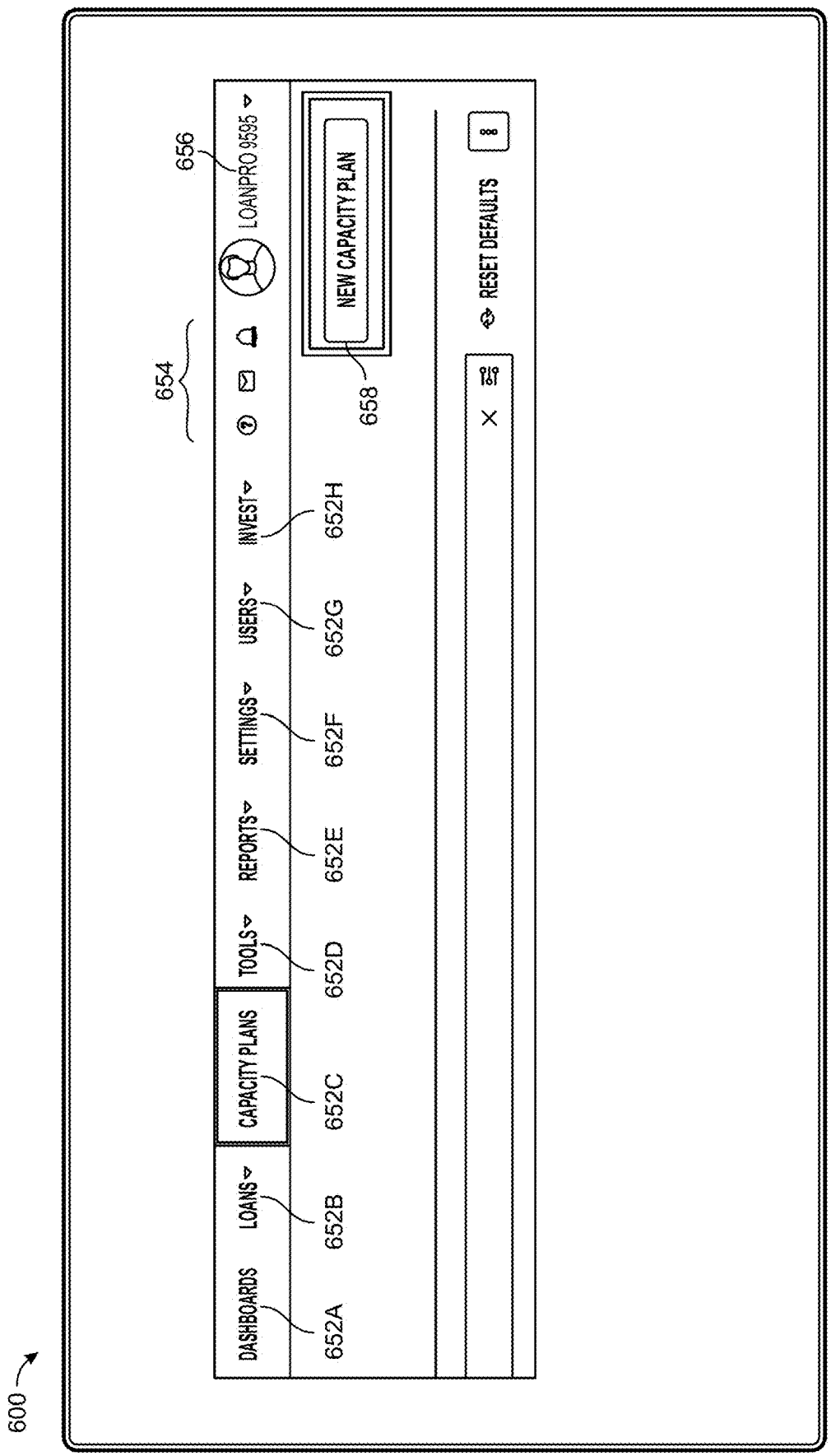
Figure 6J:
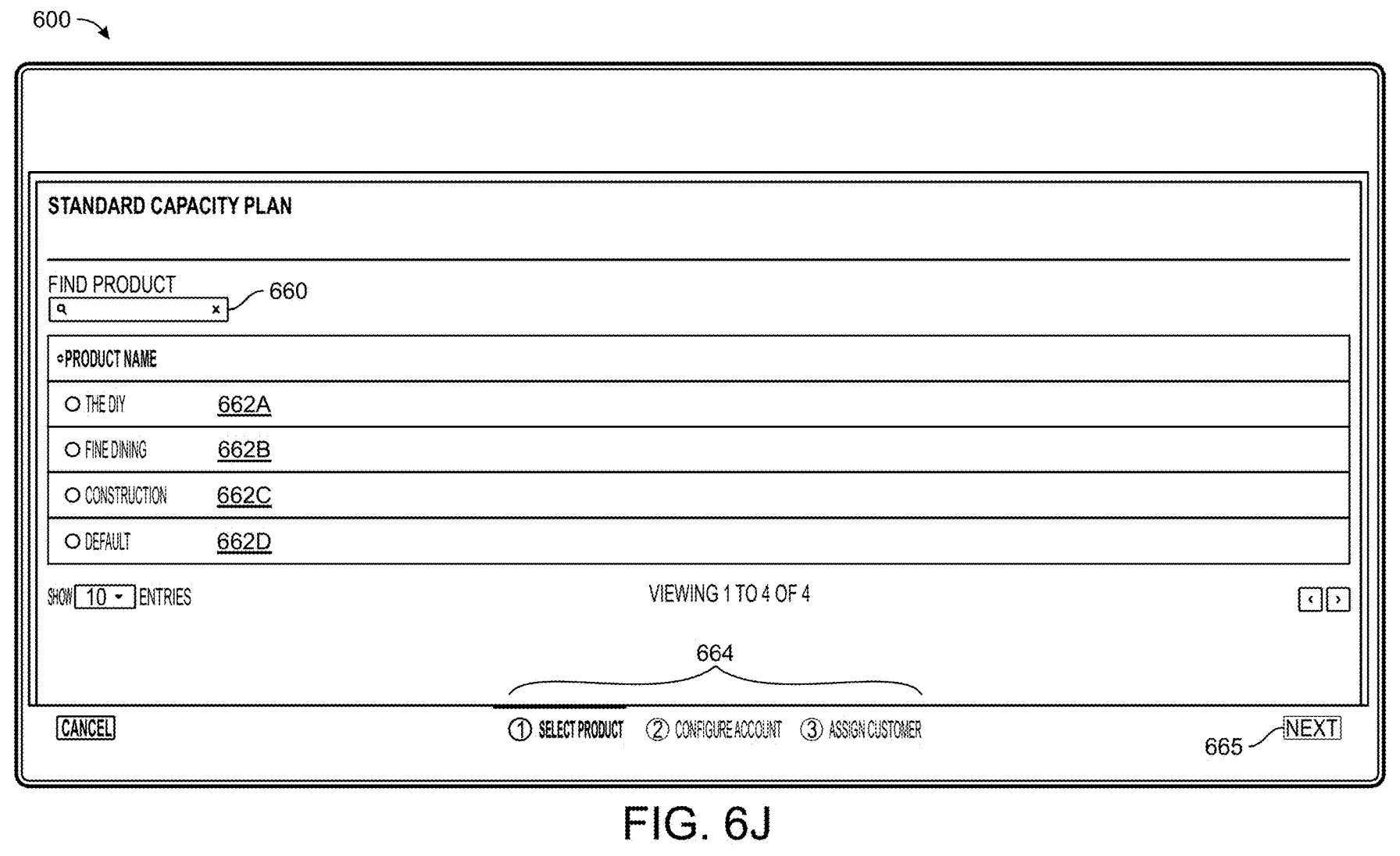

In example illustrations FIGS. 6C-6H, upon a user selecting selectable button 626, the user device 140 may be presented with the GUI 600 including a plurality of interactive elements such as, but not limited to, selectable areas 627, 638, 640, 642, 644, 647, 646, 650, selectable buttons 628A-628B, 630A-630D, 632A-632B, 634A-634C, 636, 652, and toggles 646A-646D. For example, upon a user selecting selectable button 626 the user can setup their new capacity plan. Upon selecting the one or more interactive elements, the user can customize the capacity plan including custom fields and account settings (FIG. 6D), available credit (FIG. 6E), and charge and payment defaults (FIG. 6F). In another example, the user device 140 can interact with the GUI 600 by designating one or more rules (FIG. 6G) to identify a condition on a loan and a corresponding action to be performed based on the condition. In the following example, the user can activate or deactivate the rules based on toggling toggle 646A-646D. In yet another example, the user device 140 can interact with the GUI 600 by designating how exchanges will be applied using control structures (FIG. 6H). In the following example, the user can also edit the control structures of a particular container based on selecting selectable buttons 652.

Figure 6L:
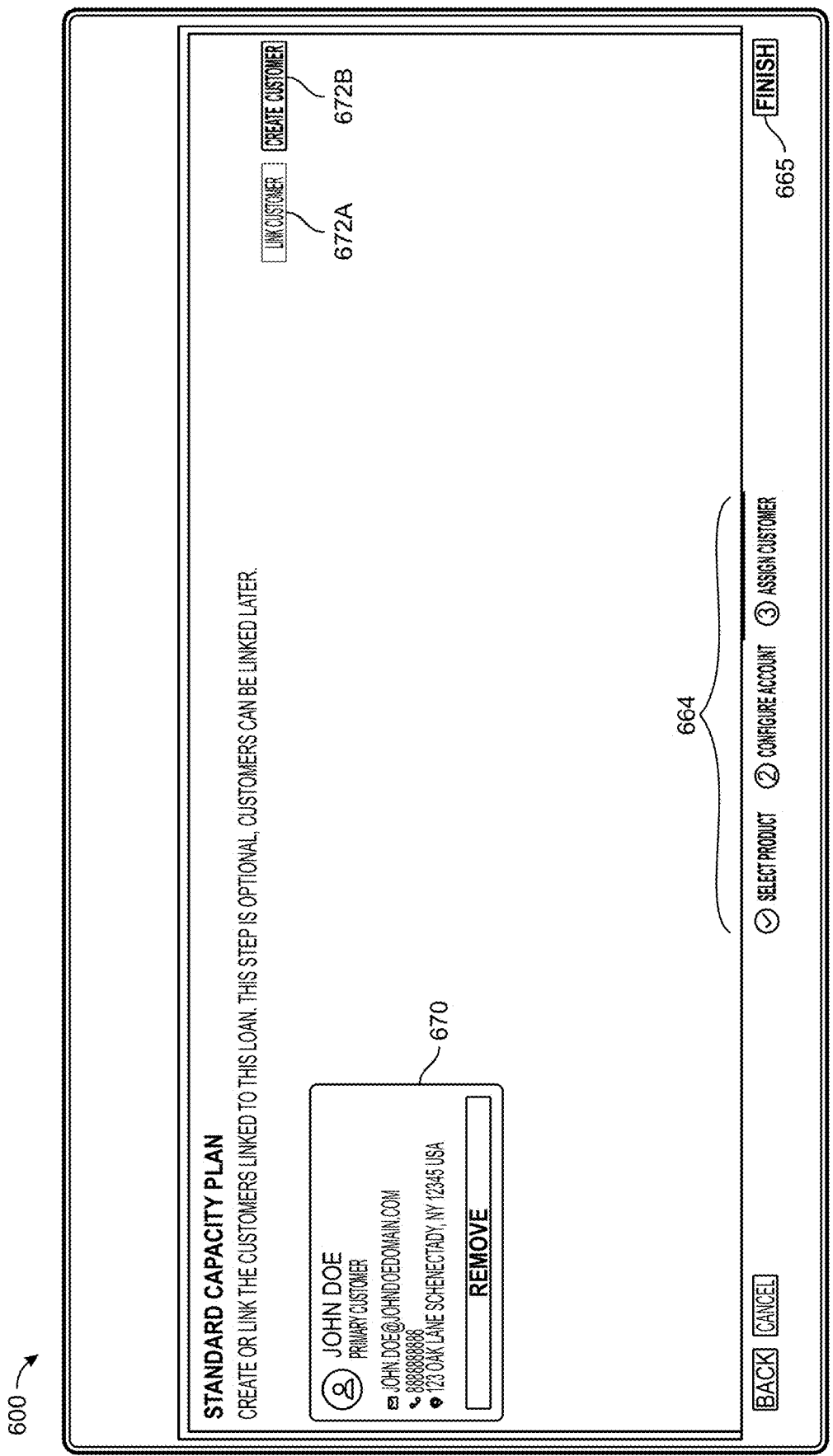
Figure 6P:
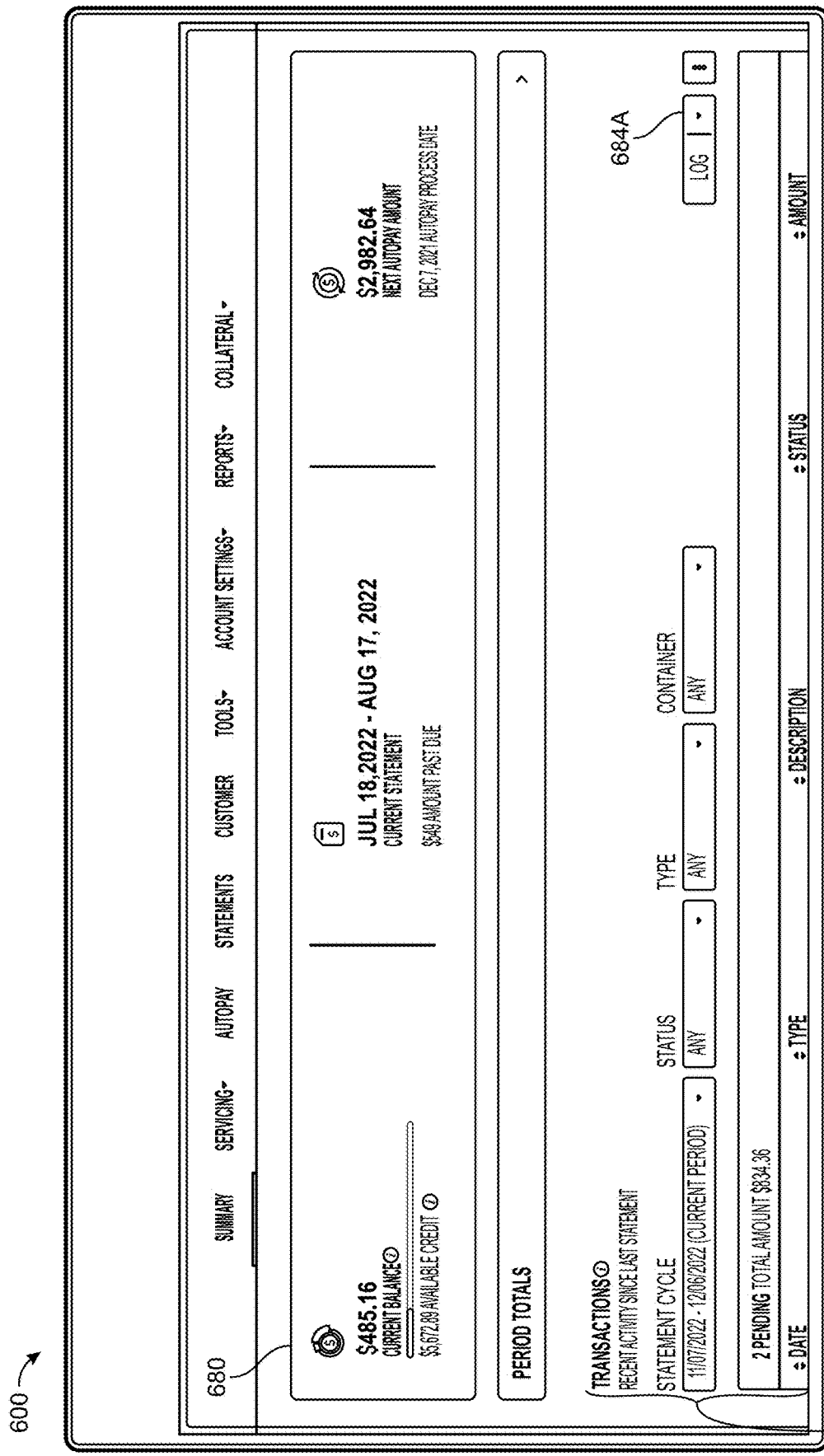
Figure 6T:
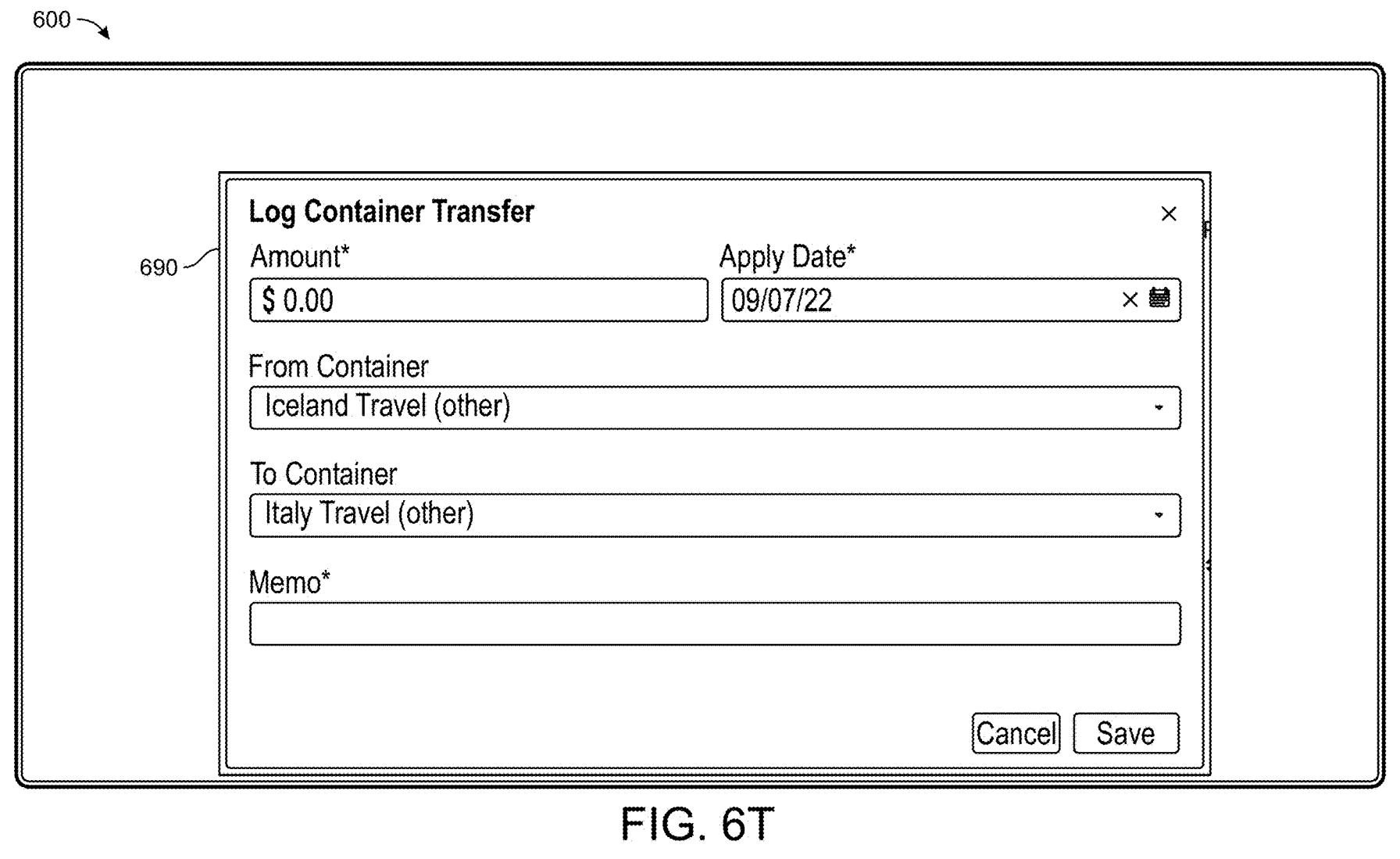

In example illustration FIGS. 6I-6O, the user device 140 may be presented with the GUI 600 including a plurality of interactive elements such as, but not limited to, selectable buttons 652A-652H, 654, 656, 658, 664, 665, 668, 672A-672B, 674B-674C, 678A-678C, look-up field 660, selectable areas 662A-662D, 664, 670, 676, text/drop-down fields 666, and toggle 676A. In general, FIGS. 6I-6O discloses functionality for creating new capacity plans via the GUI 600. For example, in response to selecting selectable button 658, FIGS. 6J-6L depict a process for setting up a new capacity plan including setting a product name (FIG. 6J), configuring account information including providing account information input (FIG. 6K), and linking or associating a customer account with the new capacity plan (FIG. 6L). At FIG. 6M, the user device 140 can be utilized by a user to enable setting and creating configuration parameters (e.g., credit limit, interest rate, etc.). At FIG. 6N, the user device 140 can be utilized by a user to configure individual containers based on setting, adding, or removing configuration parameters. At FIG. 6O, the user device 140 can be utilized by a user to configure individual capacity plan settings (e.g., loan status, portfolios, autopay status), add custom fields (e.g., 678B).

In example illustration FIGS. 6P-6T, the user device 140 may be presented with the GUI 600 including a plurality of interactive elements such as, but not limited to, selectable buttons 684A-684B, and selectable areas 680, 682, 686, 688, 690. In general, FIGS. 6P-6T discloses functionality for monitoring capacity plans and particular information regarding containers of the capacity plan via the GUI 600. For example. FIGS. 6Q-6T depict a process for logging various exchanges (FIG. 6Q), creating or logging a new payment (FIG. 6R), creating or logging a swipe (e.g., credit card or debit card swipe) (FIG. 6S), performing a container transfer (e.g., move money from one container to another container) (FIG. 6T). In various implementations, the fields to the selectable areas can be automatically populated by the interface generator 182 based on information stored in memory 176 and/or memory 116.

Figure 7:
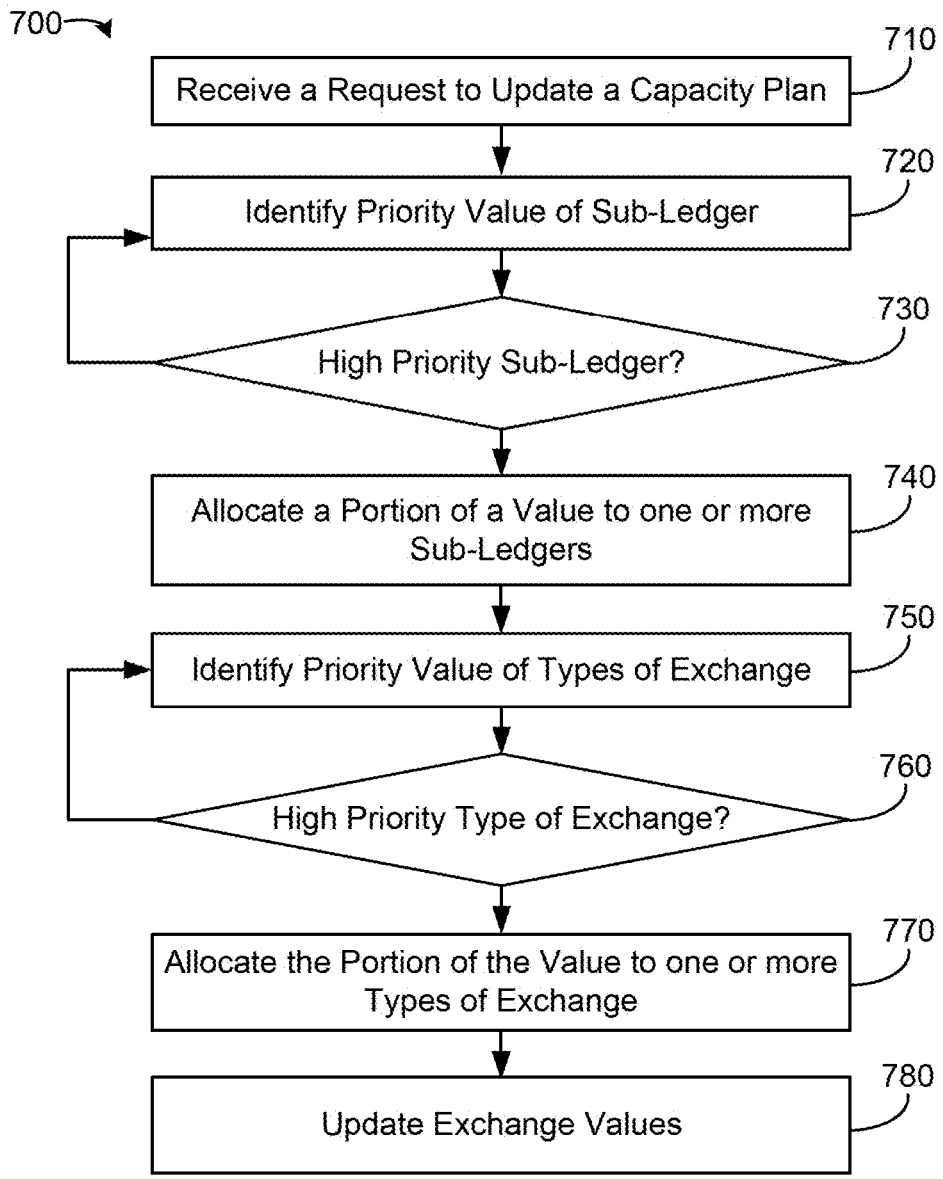
FIG. 7 is a flowchart of a method for allocating a value within a capacity plan among sub-ledgers, according to some implementations.

FIG. 7 is a flowchart of a method 700 for allocating a value within a capacity plan among sub-ledgers, according to some implementations. Various components of the computing environment 100 (e.g., provider system 110, user device 140, data acquisition engine 180, etc.) of FIGS. 1A and/or 1B can perform the method 700. In some cases, at least one circuit or processing unit of the component of the computing environment 100 (e.g., the processing circuit 112, the processor 114, the memory 116 of the provider system 110, etc.) can perform the method 700. Further, any computing device composed of hardware, software, or a combination of hardware and software described herein can be configured to perform method 700.

In broad overview of the method 700, at block 710, a processing circuit can receive a request to update a capacity plan. At block 720, the processing circuit can identify a priority value of each sub-ledger. At block 730, the processing circuit can determine whether the priority value of the sub-ledger is comparatively higher than the priority value of one or more other sub-ledgers. At block 740, the processing circuit can allocate a portion of a value to one or more sub-ledgers. At block 750, the processing circuit can identify the priority values of types of exchange. At block 760, the processing circuit can determine whether the priority value of a type of exchange is comparatively higher than the priority value of one or more other types of exchange. At block 770, the processing circuit can allocate the portion of the value to one or more types of exchange. At block 780, the processing circuit can update the exchange values. Additional, fewer or different operations may be performed depending on the particular arrangement. In some embodiments, some or all operations of method 700 may be performed by one or more processors executing on one or more computing devices, systems or servers. In various embodiments, each operation may be re-ordered, added, removed or repeated. Blocks 710-780 can be described in further detail with reference to at least FIGS. 2-3.

At block 710, the processing circuit (e.g., processing circuit 112, 152, or 172) can communicate with a computing device (e.g., user device 140) via a communication network interface. The communication network interface can be composed of hardware, software, or a combination of hardware and software components interfacing with the processing circuit. Via the communication network interface, the processing circuit can receive a request to update a capacity plan from the computing device. The request can include a value (e.g., payment value for updating the capacity plan). The value can be configured by the user of the computing device.

The capacity plan can be associated with a ledger stored in a memory (e.g., memory 116 or database) of the processing circuit 112. The ledger can include various sub-ledgers and priority values for the sub-ledgers. The ledger can broadcast (or include) exchanges within one or more sub-ledgers responsive to the processing circuit receiving the data of the exchange from a device processing the exchange, such as at least one of an exchange value, the time of the exchange, data related to the device processing the exchange, network-related data, etc.

In various implementations, the exchanges can be associated with the capacity plan. For example, the configuration parameters of the capacity plan (e.g., set of terms) can apply to the recorded exchanges broadcasted within the sub-ledgers. Further, individual sub-ledgers can include configuration parameters (e.g., terms or rules) that apply to the exchanges broadcasted in the respective sub-ledger. The processing circuit can store each of the exchanges in association with the type of exchange and the exchange value. The type of exchange can represent a category or status of the recorded exchange, for instance, according to the configuration parameter(s) of the capacity plan, such as the billing cycle, billing date, frequency of balance interest computation (e.g., daily-balance interest, weekly-balance interest, etc.), or duration from the billing date, to name a few. For example, the type of exchange can include but is not limited to, at least one of "other-interest-bearing", "swipe", interest-bearing-past-fee", "interest-bearing-fee", "interest charges", "abated-swipe", or "interest-free-fee", among others. The exchange value can represent the amount incurred on the exchange.

In some implementations, the capacity plan (e.g., line of credit) can correspond to a remaining balance or an amount allowed for performing exchanges. For example, the capacity plan can be associated with a maximum capacity value (e.g., credit limit) and/or a current capacity value (e.g., remaining credit or the total amount of the sub-ledgers). The current capacity of the capacity plan can be computed based on a difference between the maximum capacity value associated with the capacity plan and a total sub-ledger value. The total sub-ledger value can correspond to an aggregate of the exchange values associated with the recorded exchanges. In some implementations, the current capacity can correspond to the total sub-ledger value.

In some implementations, the processing circuit can assign priority values to individual sub-ledgers. The priority values can indicate an order in which the processing circuit can prioritize allocating at least a portion of the value to individual sub-ledgers. For example, the processing circuit can assign priority values (e.g., priority order) to the sub-ledgers based on the configuration parameters of the sub-ledgers. The configuration parameters of each sub-ledger can include at least one of but are not limited to, an aggregate value of exchange values of exchanges broadcasted in a sub-ledger (e.g., a balance of the sub-ledger), a percentage update rate (e.g., an interest rate associated with the sub-ledger), a charge method, a credit limit, an identifier, and/or a primary account Boolean. In some cases, the processing circuit can assign the priority values to the sub-ledgers based on one or multiple configuration parameters, such as the balance, the interest rate, the balance and interest rate, the balance and credit limit associated with each sub-ledger, or other combinations of configuration parameters.

In various aspects, the one or more configuration parameters used for assigning the priority values can be pre-configured in the memory of the processing circuit. In some cases, the processing circuit can receive instructions to update the assigned priority values. The instructions may be from the computing device of the user, a third party (e.g., third party system 150), the provider (e.g., provider system 110), among other authorized entities.

In various implementations, the memory of the processing circuit can store a different priority value for each type of exchange associated with each sub-ledger. The priority values of the types of exchange can correspond to a priority order to update exchanges broadcasted in the sub-ledger, e.g., allocating a portion of the value (e.g., payment) allocated to the sub-ledger to the one or more exchanges in the sub-ledger. The priority values for the types of exchange can be configured by an authorized entity, such as the computing device, the provider, or other authorized third-party systems. In some cases, the priority values of the types of exchanges can be a part of the configuration parameters associated with each sub-ledger.

In one example, the highest-to-lowest priority for the types of exchange may be "other-interest-bearing", "swipe", "interest-bearing-past-fee", "interest-bearing-fee," "interest-charges", "abated-swipe", and "interest-free-fee". In another example, the priority values may be assigned to the types of exchanges based on whether a daily-balance interest computation applies to the sub-ledger and/or whether the new/additional exchanges are excluded (e.g., new exchange excluded from interest accrual computation). In the case of new exchanges being excluded from incurring an interest fee, the processing circuit can assign (or re-assign) the priority values for the types of exchanges as "other-interest-bearing", "interest-charges", "swipe", "interest-bearing-past-fee", "interest-bearing-fee," "abated-swipe", and "interest-free-fee", for example. In some cases, the priority values of the types of exchange may be similar between different sub-ledgers. In some other cases, the priority values of the types of exchange may be different between certain sub-ledgers.

At block 720, the processing circuit can identify a priority value of each sub-ledger. The processing circuit can perform a look-up or a search in the memory (e.g., data structure) to identify the priority value associated with each sub-ledger. For simplicity and for purposes of providing examples herein, the processing circuit can identify the priority values of sub-ledgers with at least one exchange broadcasted to the sub-ledger, such that sub-ledger(s) without any exchange can be removed from consideration. For example, within the data structure, a link (e.g., first link) can be established between the ledger and each of the sub-ledgers associated with a sub-ledger identifier. A link (e.g., second link) can be established between the sub-ledger identifier and an assigned priority value of the sub-ledger. By performing the look-up in the data structure, the processing circuit can identify the priority values associated with the sub-ledgers in the ledger.

At block 730, the processing circuit can determine whether the priority value of the sub-ledger is comparatively higher than the priority value of one or more other sub-ledgers. The priority value of each sub-ledger can indicate the amount or proportion of the value to allocate for the sub-ledger. For example, responsive to identifying the priority value of each sub-ledger, the processing circuit can sort a list of sub-ledgers according to their priority values. In some cases, the processing circuit can include or maintain an existing listing of sub-ledgers sorted according to the priority values. In certain cases, the processing circuit may identify the priority values of the sub-ledgers one by one (e.g., iterate block 720) to determine one or more sub-ledgers with the highest priority values compared to other sub-ledgers. After identifying the one or more sub-ledgers with relatively higher priority values than other sub-ledgers, the processing circuit can proceed to allocate a portion of the value to the one or more sub-ledgers (at block 740).

In some implementations, the processing circuit may select a subset of the sub-ledgers to allocate portions of the value. For example, the processing circuit can be configured with a predetermined maximum number of sub-ledgers allowed for each request. If the maximum number is 3 and there are 7 sub-ledgers, the processing circuit can identify three sub-ledgers with the highest priority values. In some implementations, the processing circuit may be configured to allocate portions of the value to all sub-ledgers according to the priority values of the sub-ledgers. For example, according to the amount associated with each sub-ledger, the processing circuit may allocate the portions of the value to multiple sub-ledgers (e.g., when the value is greater than the amount of the highest priority sub-ledger) or to a single sub-ledger (e.g., when the value is less than or equal to the amount of the highest priority sub-ledger). Hence, the processing circuit can progressively allocate at least a portion of the value to each sub-ledger from the highest priority to the lowest priority.

In some implementations, according to the configuration of the processing circuit, the processing circuit can allocate or apply a predetermined portion (e.g., amount or percentage of the value) to each of the sub-ledgers. If the portion is greater than the amount associated with the sub-ledger, the processing circuit can allocate the portion to another sub-ledger having a higher priority or a lower priority if other higher-priority sub-ledgers does not have any remaining amount. In some other implementations, the processing circuit can allocate portions of the value to the sub-ledgers according to the principal balance of the sub-ledgers. In some other implementations, the processing circuit can allocate an equal portion to each sub-ledger or defined sub-ledgers and allocate any excess of the value to a particular sub-ledger (e.g., a sub-ledger of the same sub-ledgers or a sub-ledger to which the processing circuit has not yet allocated any portion of the value). The configuration of the processing circuit for allocating among the sub-ledgers can be modified, adjusted, or set by the user.

At block 740, the processing circuit can allocate a portion of a value (e.g., payment) to one or more sub-ledgers. The processing circuit can allocate portions of the value to update one or more exchange values of exchanges broadcasted in the one or more sub-ledgers. The one or more sub-ledgers can be a subset of the various sub-ledgers within the ledger. In some cases, the one or more sub-ledgers can represent all sub-ledgers in the ledger with at least one broadcasted exchange. The processing circuit can allocate at least one portion of the value by allocating at least one of a predetermined percentage of the value, a predetermined amount of the value, or a combination of the percentage and the predetermined amount to each of the one or more sub-ledgers.

The processing circuit can compute a portion of the value for each of the one or more sub-ledger according to the priority value and/or the number of selected sub-ledgers. For example, when two sub-ledgers are selected for the allocation, the processing circuit can compute a relatively higher portion of the value for allocation to a first sub-ledger with a first priority value higher than a second priority value of a second sub-ledger. The processing circuit can allocate the remaining portion to the second sub-ledger. In another example, the processing circuit can select three sub-ledgers for allocation, including the first sub-ledger, the second sub-ledger, and a third sub-ledger. The first sub-ledger can be associated with a relatively higher priority value compared to the second sub-ledger, and the second sub-ledger can be associated with a relatively higher priority value compared to the third sub-ledger. Accordingly, the processing circuit can allocate a first portion, a second portion, and a third portion (e.g., from highest to lowest proportion) of the value to the first to third sub-ledgers, respectively.

In some implementations, multiple sub-ledgers can be assigned with the same proportion of the value. For example, the processing circuit can allocate portions of the value relatively evenly between the sub-ledgers. In another example, the processing circuit can allocate a first portion to at least one sub-ledger and allocate the remaining portions relatively evenly between other sub-ledgers. In certain implementations, if one sub-ledger is identified for allocation, the processing circuit can allocate the entire value to the sub-ledger. In allocating the portion of the value to the one or more sub-ledgers, the processing circuit can store a link (e.g., third link) between the computed portion of the value to a respective sub-ledger identifier of each of the one or more sub-ledgers.

In some arrangements, the processing circuit can be configured to allocate the entire value to the sub-ledger associated with the highest priority value. In some implementations, the processing circuit can compute the portion of the value corresponding to the remaining exchange values of exchanges associated with the sub-ledger.

At block 750, the processing circuit can identify the priority values of types of exchange (e.g., a set of the types of exchange) in each sub-ledger allocated with at least a portion of the value. The processing circuit can identify the priority values of the types of exchange similarly to identifying the priority values associated with the sub-ledgers. For example, each type of exchange can include an identifier (e.g., type identifier). The processing circuit can store a link (e.g. fourth link) between the type identifier and a priority value of the type of exchange. Responsive to identifying the priority values, the processing circuit can determine or select one or more types of exchange to allocate the portion of the value allocated for the sub-ledger. For simplicity and for purposes of providing examples herein, the processing circuit may identify the priority values of the type(s) of exchange that is/are associated with recorded exchanges (e.g., include exchange values). Other types of exchange of each sub-ledger without an association with a certain exchange value may not be considered for allocation.

At block 760, the processing circuit can determine whether the priority value of a type of exchange is comparatively higher than the priority value of one or more other types of exchange. The determination of the highest priority value(s) of one or more types of exchange can be similar to block 730, for example. For example, based on the identified priority values of the types of exchange, the processing circuit can determine or select one or more types of exchanges with the highest priority values (e.g., iterate block 750) to allocate the portion of the value for updating exchanges. In some cases, the processing circuit can be configured with a maximum number of types of exchange for allocation. In this case, the processing circuit can select the types of exchange for allocation based on the priority values (e.g., a number of types associated with the highest priority values). In some other cases, the processing circuit can select all types of exchange including at least one exchange for allocating the portion of the value. In some implementations, the processing circuit can receive an input setting from the user via the computing device of the user. The input setting can indicate the types of exchange to prioritize. In some cases, the processing circuit may not receive any input setting from the user regarding the type of exchange to prioritize. In this case, the processing circuit can prioritize the type of exchange with having the highest amount (e.g., most expensive capital) in consideration of at least one of the interest rate of each sub-ledger, interest calculation base method, and/or abated interest transactions (e.g., in compliance with the CARD Act or other regulation or policy).

At block 770, the processing circuit can allocate the portion of the value to one or more types of exchange responsive to the selection of the types at block 760. In the case of a single type of exchange to allocate, the processing circuit can allocate the entire portion of the value to the type of exchange for updating the exchange values of exchanges associated with the type of exchange. With multiple types of exchange to consider, the processing circuit can allocate the portion of the value by computing a subset portion of the portion to allocate each type of exchange. The allocation process for the subset portions to the types of exchange can be similar to the allocation process for the portions of the value to the sub-ledgers.

For example, the processing circuit can compute a subset portion of the value for allocating each type of exchange according to the priority values of the types of exchange. The processing circuit can be configured to allocate a relatively higher proportion of the portion of the value to each type of exchange according to the priority order of the types of exchange. In some implementations, the processing circuit can be configured to allocate similar proportions of the portion of the value to the types of exchange. In some other implementations, the processing circuit can be configured to allocate a first subset portion to a first type of exchange having the highest priority value and allocate the remaining subset portions of the portion (e.g., evenly or in different proportions) to other types of exchange. In some arrangements, the processing circuit can be configured to allocate the entire portion of the value allocated to the sub-ledger to the type of exchange associated with the highest priority value. In some implementations, the processing circuit can compute the subset portion of the value corresponding to the remaining exchange values of exchanges associated with each type of exchange.

At block 780, the processing circuit can update the exchange values of the exchanges broadcasted in the sub-ledger for each sub-ledger allocated with the portion of the value. The processing circuit can update the exchange values based on the one or more types of exchange (e.g., with the subset portion computed at block 770) of the exchanges broadcasted in the sub-ledger. For example, the processing circuit can identify the exchanges broadcasted or included in a first sub-ledger allocated with the portion of the value via the first link (e.g., between the sub-ledger and the ledger) and the second link (e.g., between the sub-ledger identifier of the sub-ledger and the priority value). The second link can indicate that the sub-ledger is to be prioritized for updating the exchange values. The processing circuit can update the identified exchanges broadcasted in the sub-ledger according to the computed portion of the value. In some cases, the processing circuit can update the identified exchanges of at least one type of exchange according to the computed subset portion of the value.

In various implementations, the processing circuit can update the exchange value of the exchanges broadcasted in the sub-ledger by reducing the portion of the value allocated for the sub-ledger by the exchange value. In some cases, the processing circuit can update the exchange value of the exchanges broadcasted in the sub-ledger by reducing the exchange value of the exchange associated with the sub-ledger by the portion of the value. In some other cases, the processing circuit can update the exchange value of exchanges associated with each type of exchange by the subset portion of the value.

In some implementations, the sub-ledger may include one type or category of exchange. In this case, responsive to allocating the portion of the value to the sub-ledger, the processing circuit can update the exchange values of the exchanges in the sub-ledger with the allocated portion of the value (e.g., performed subsequent to the features of block 740).

Responsive to updating the exchange values, the processing circuit can update a total sub-ledger value stored in the data structure (or memory) of the processing circuit. The processing circuit can update the total sub-ledger value for each sub-ledger allocated with a respective portion of the value. The total sub-ledger value can correspond to an aggregate of the exchange values associated with the sub-ledger of the various sub-ledgers. The processing circuit can update the total sub-ledger value based on the update to the exchange values broadcasted in the sub-ledger (e.g., updated exchange values). In some cases, the processing circuit can update the total sub-ledger value by reducing the current total sub-ledger value with the allocated portion of the value.

In various implementations, each exchange broadcasted to the sub-ledgers can be associated with a minimum update value. The minimum update value can refer to the minimum amount to be updated (e.g., minimum payment to be paid) by a predetermined date (e.g., subsequent billing date or due date). The data structure of the processing circuit can store a link between the exchange and its minimum update value. In some implementations, the data structure can store another link between the exchange and its future minimum update value, such as when the minimum update value is less than the exchange value of the exchange.

The processing circuit can update the exchange values of the exchanges broadcasted in the sub-ledger by identifying the minimum update value of one or more exchanges. In this case, the processing circuit can update the exchange value of each exchange by reducing the exchange value by the minimum update value. In some cases, the processing circuit can prioritize updating the exchange value of an exchange having the highest minimum update value. In some implementations, if the allocated portion of the value is less than the minimum update value, the processing circuit may update another exchange value of an exchange with the next highest minimum update value. In some other cases, the processing circuit can prioritize updating the exchange value of an exchange having the lowest minimum update value.

In some implementations, the processing circuit can store an association between the sub-ledgers and the total minimum update values. The processing circuit may assign a priority value to a sub-ledger based on the total minimum update value of each sub-ledger (e.g., from highest to lowest or lowest to highest). In some implementations, the processing circuit can store an association between the type of exchange and the total minimum update value associated with the exchanges broadcasted to the type of exchange. In such cases, the processing circuit may assign a priority value to a type of exchange based on the total minimum update value of each exchange broadcasted to the type of exchange.

In various implementations, the processing circuit can update the capacity plan (e.g., line of credit) responsive to receiving the request. For example, the processing circuit can update the capacity plan based on a difference between a maximum capacity value (e.g., credit limit) associated with the capacity plan and the updated total sub-ledger value(s) of the sub-ledger(s). In another example, the processing circuit can update the capacity plan based on a sum between a current capacity value (e.g., remaining credit) associated with the capacity plan and the value of the request to update the capacity plan.

In some implementations, the processing circuit can receive, via the communication network interface from another computing device (e.g., second computing device), an exchange request to update the capacity plan. The exchange request can include an exchange value of an exchange initiated by a user. Responsive to receiving the exchange request, the processing circuit can allocate the exchange value of the exchange to one of the sub-ledgers according to configuration parameters associated with the plurality of sub-ledgers. For example, as described hereinabove, the processing circuit can identify the terms or rules associated with the exchange participated by the user. Based on the identified terms or rules, the processing circuit can determine a sub-ledger to broadcast the exchange and/or the type of exchange associated with the exchange.

Responsive to identifying the sub-ledger to broadcast the exchange, the processing circuit can generate an entry in the sub-ledger corresponding to the determined configuration parameters to broadcast the exchange in the sub-ledger of the sub-ledgers. Accordingly, the processing circuit can update the sub-ledger to include, in the generated entry, the exchange value of the exchange and an identifier of the type of exchange associated with the exchange value. The processing circuit can update the total sub-ledger value and the capacity plan based on the new exchange value. The processing circuit can update the total sub-ledger value by adding the new exchange value to the current sub-ledger value. The processing circuit can update the capacity plan by reducing the current capacity value by the new exchange value, for example.

Figure 8:
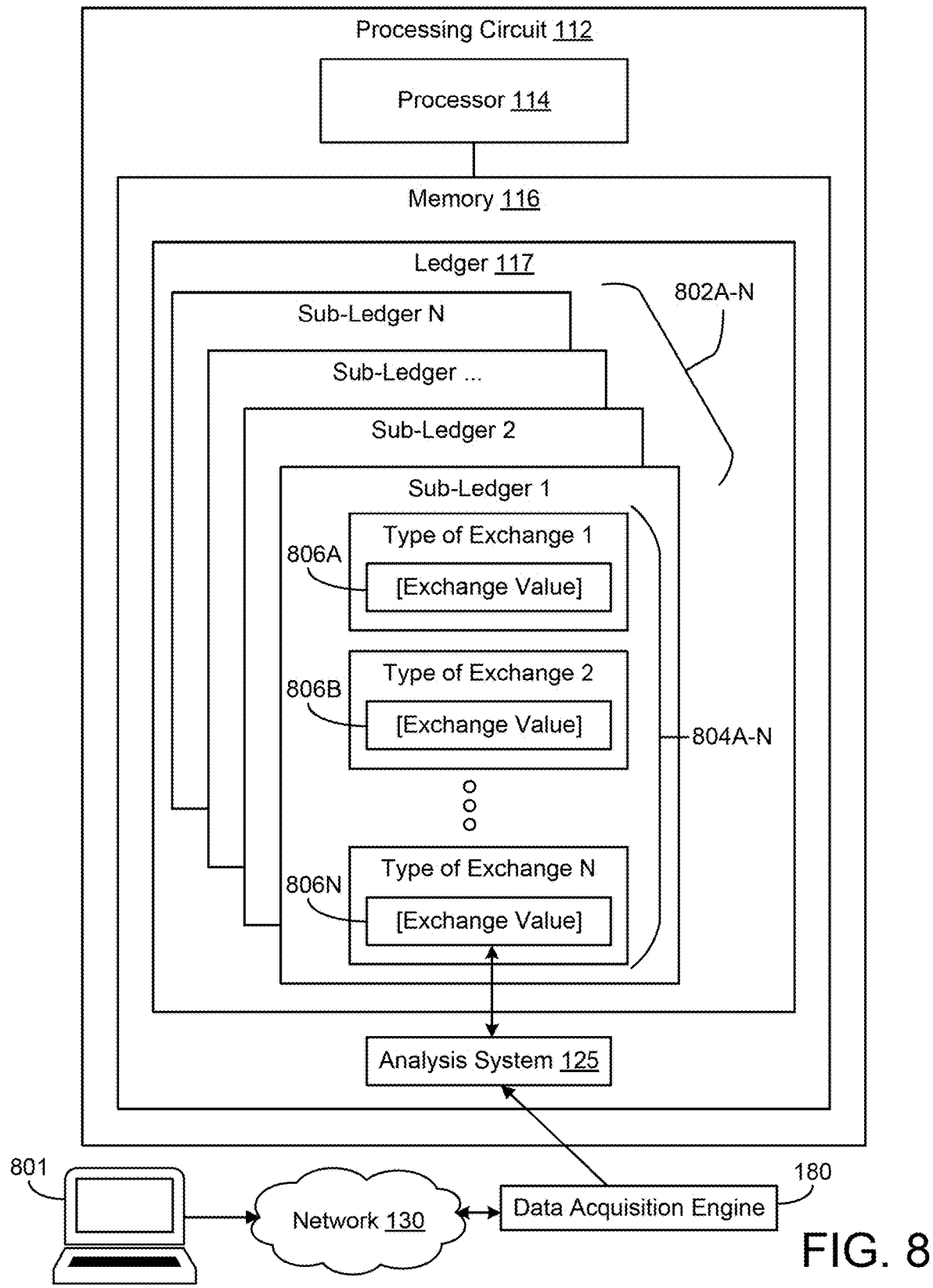
FIG. 8 is a block diagram depicting an implementation of a system for allocating a value within a capacity plan among sub-ledgers, according to some implementations.

Referring now to FIG. 8, a block diagram depicting an implementation of a processing circuit 112 of a system in communication with the computing environment (e.g., computing environment 100) is shown, according to some implementations. The processing circuit 112 can be a part of the provider system 110, capable of performing the features or functionalities of the provider system components thereof described in conjunction with at least FIGS. 1A and/or 1B. Although the processing circuit 112 of the provider system 110 is used for the example implementations discussed herein, additional or alternatively, the processing circuit 112 may correspond to or perform the features of the processing circuit 152 or 172 of the third-party system 150 or the content management system 170, for example.

The components of the processing circuit 112 discussed herein can include or be composed of hardware, software, or a combination of hardware and software components. The processing circuit 112 can include at least one processor 114 and at least one memory 116. The processing circuit 112 can be in electrical communication with a communication network interface to enable communication with other devices within the network 130. For example, the processing circuit 112 can communicate with the data acquisition engine 180, a computing device 801, or other devices connected to the network 130 via the communication network interface.

The data acquisition engine 180 can obtain or retrieve data from the computing device 801 or the data sources 160 (e.g., specific user data). The computing device 801 may be composed of hardware, software, or a combination of hardware and software components. The computing device 801 can be similar to the user device 140. For example, the computing device 801 may be configured to perform features or functionalities similar to the user device 140. The processing circuit 112 can establish a communication channel to exchange information with the computing device 801, such as receiving a request for updating the capacity plan.

The analysis system 125 can receive calculation requests from other systems described herein (e.g., exchange modeler 120, capacity modeler 122, data manager 124, third-party systems 150, etc., as described in conjunction with FIGS. 1A and/or 1B) to execute one or more calculation functions on the capacity plan or the exchange values of the sub-ledgers. The analysis system 125 can communicate with the data acquisition engine 180 to receive requests or data from the computing device 801 (among other devices) in the network 130. In some cases, the analysis system 125 can receive instructions from the processor 114. In various implementations discussed herein, the analysis system 125 of the processing circuit 112 can perform various calculations to update values within the ledger, such as the capacity value, the exchange value, the total sub-ledger value, etc. In some implementations, the features of the analysis system 125 can be executed by the processor 114 configured to, for instance, perform various computations discussed herein.

The one or more components (e.g., processor 114, memory 116, etc.) of the processing circuit 112 can execute, perform, or carry out features described herein in conjunction with at least FIG. 7. For example, the components of the processing circuit 112 can perform the features or operations of method 700 described in conjunction with FIG. 7 to update the capacity plan associated with the ledger 117.

The memory 116 of the processing circuit 112 can include, store, or maintain a ledger 117 configured to broadcast individual exchanges associated with the capacity plan (e.g., account or line of credit). The memory 116 can correspond to or be referred to as a data structure of the processing circuit 112. The ledger 117 can include various sub-ledgers 802A-N (e.g., sometimes referred to as sub-ledger(s) 802) and priority values for the sub-ledgers 802. Each exchange (e.g., one of the exchange values 806A-N) of the ledger 117 can be broadcasted within a sub-ledger 802 of the plurality of sub-ledgers 802. Each exchange stored in the sub-ledger 802 can include a stored association with one of the types of exchange 804A-N (e.g., sometimes referred to as type(s) of exchange 804) and an exchange value 806. For instance, individual sub-ledgers 802 can include a set of types of exchange 804 (e.g., category of exchanges). The type of exchange 804 can be associated with an exchange value 806, such as the recorded amount of the exchange(s) belonging to the respective type of exchange 804.

The memory 116 can store various links between the elements or components associated with the ledger 117. For example, the memory 116 can include a link (e.g., the first link) between the ledger 117 and the various sub-ledgers 802. The sub-ledger 802 can be identified based on its sub-ledger identifier, which can be stored in association with or as part of the sub-ledger 802. Via the first link, the processing circuit 112 can traverse the ledger 117 to identify the various sub-ledgers 802 included in the ledger 117. The memory 116 can include a link (e.g., the second link) between the sub-ledger identifier of the sub-ledger 802 to the associated priority value assigned to the sub-ledger. Hence, by identifying the sub-ledger 802, the processing circuit 112 can determine the priority value associated with the sub-ledger 802 via the second link. The memory 116 can include various other links (e.g., linkages) between data elements, such as the sub-ledger identifier of the sub-ledger 802 and the types of exchange 804, the type of exchange 804 and the exchange value 806, the type of exchange 804 and the priority value of the type of exchange, etc.

In some implementations, the memory 116 can generate links responsive to receiving or determining new information to be associated with the elements of the ledger 117 (e.g., the sub-ledger 802, type of exchange 804, etc.). For example, responsive to receiving a request to update the capacity plan, the memory 116 can store a link (e.g., the third link) between a computed portion of a value from the request allocated for a certain sub-ledger 802 and the sub-ledger identifier of the sub-ledger 802. In another example, responsive to receiving a request to update an exchange value (e.g., adding an exchange), the memory 116 can generate a link between the new exchange or exchange value and the sub-ledger identifier of the sub-ledger 802 according to the configuration parameters of the sub-ledger 802.

The processor 114 (or the analysis system 125) can traverse the memory 116 via the association links between elements, such as to identify at least one of the capacity plan, the total sub-ledger values of the sub-ledgers 802, the exchange values 806 of the types of exchange 804 in each sub-ledger 802, or the configuration parameters associated with each sub-ledger 802, among other. For example, the processor 114 can identify various sub-ledgers 802 within the ledger 117 via the first link. Within each sub-ledger 802, the processor 114 can identify the types of exchanges included in the sub-ledger 802 via another link associating these elements. Further, the processor 114 can identify the exchange value 806 of a particular type of exchange 804 via a link associating the exchange value 806 and the type of exchange 804. In various implementations, the processor 114 can identify information associated with the ledger 117 (e.g., capacity plan, an aggregate of the total sub-ledger values, etc.), the sub-ledger 802 (e.g., priority values, total sub-ledger value, configuration parameters of the sub-ledger 802, etc.), and/or the type of exchange 804 (e.g., priority values, configuration parameters of the type of exchange 804, etc.) via other association links.

The memory 116 can store a set of priority values for the sub-ledgers 802. The memory 116 can store a different set of priority values for the types of exchange 804 in each sub-ledger 802. In some cases, the priority values of the types of exchange 804 in a sub-ledger 802 can be different from the priority values of the types of exchange 804 in another sub-ledger 802. The priority value of the sub-ledgers 802 can indicate an order (e.g., priority order) in which to allocate at least a portion of a value to the sub-ledger 802. A relatively higher priority value of the sub-ledger 802 can indicate a higher proportion of the value to allocate for updating the exchange values.

The priority value of the types of exchange 804 can indicate an order to update the exchanges broadcasted in the sub-ledger. For example, the analysis system 125 (e.g., executed by the processor 114) can sequentially update the exchange values 806 in each type of exchange 804 within the sub-ledger 802 in the order of the priority values of the types of exchange 804. In some cases, the priority value of the types of exchange 804 can indicate the proportion (e.g., subset portion) of the portion of the value to update certain types of exchange 804, such as a relatively higher proportion for a relatively higher priority value and a relatively lower proportion for a relatively lower priority value.

In various implementations, the processing circuit 112 can receive a request from the computing device 801 to update the capacity plan associated with the exchanges broadcasted in the ledger 117. The request can include the value (e.g., payment) for updating the capacity plan and/or the exchange values of the exchanges broadcasted to one or more sub-ledgers 802. The processor 114 can determine which exchange values to update by traversing the data structure of the ledger 117. For example, based on the configurations for allocating the payment, the processor 114 can select or identify one or more sub-ledgers 802 with the highest priority values to allocate the payment. The processor 114, using the analysis system 125, can compute the proportion of the value to allocate each of the one or more sub-ledgers 802 according to the priority value of the one or more sub-ledgers 802. For simplicity and for purposes of providing examples herein, a relatively higher priority value can be associated with a higher proportion (e.g., percentage or predetermined value) of the value for allocating the associated sub-ledger 802. Within each sub-ledger 802 allocated with a portion of the value, the processor 114 can identify exchanges broadcasted in the sub-ledger 802. The processor 114 can update the exchange or exchange value 806 of the exchange identified by the processor 114 according to the computed portion of the value. In some cases, the processor 114 can update one or more exchanges according to the types of exchange 804 and the priority values of the types of exchange 804. In this case, the processor 114 can update the exchanges associated with a type of exchange 804 having a relatively higher priority value than other types of exchange 804.

In some implementations, each exchange may be associated with a priority value. For example, the processor 114 can assign each exchange within the sub-ledger 802 with a priority value. The processor 114 may assign the priority value to each exchange based on the date the exchange was initiated, whether there is a pending minimum update value (e.g., payment value), whether the minimum update value of the exchange exceeds a predetermined threshold, etc. Therefore, the processor 114 can be configured to update the exchange values 806 of the exchanges broadcasted in the sub-ledger 802 in specific priority order according to at least one of the types of exchange 804 of the exchanges and/or the priority values of the exchanges, for example.

In some implementations, the processor 114 (e.g., using the analysis system 125) can compute or update the total sub-ledger value based on an aggregate of the exchange values 806 within the sub-ledger 802. In some implementations, the processor 114 can update the capacity plan by, for example, adding the current capacity value with the value from the request (e.g., increasing the available credit for the line of credit). In some other implementations, the processor 114 can update the capacity plan, for example, based on a difference between a maximum capacity value and the total sub-ledger values of the sub-ledgers 802. In some implementations, the processor 114 can update the exchange values 806 of the exchanges 804 broadcasted in the sub-ledger 802 by identifying a minimum update value for an exchange 804, such that the exchange value 806 of the exchange 804 can be reduced by at least the minimum update value. In this case, the processor 114 can compute the portion of the value to allocate certain sub-ledgers 802 according to the minimum update values of all the exchanges in the sub-ledger 802 (and the priority value of the sub-ledger 802).

In various implementations, the processor 114 can access the data structure to add or update the exchange value of one of the sub-ledgers 802. For example, the processor 114, via the communication network interface, can receive a request to update the capacity plan including an additional exchange value. The processor 114 can update the capacity plan by reducing the current capacity value with the received additional exchange value. Additionally or alternatively, responsive to receiving the request, the processor 114 can allocate the additional exchange value to one of the sub-ledgers 802 according to the configuration parameters of each sub-ledger 802, such that the recorded exchange can be stored in its appropriate place (e.g., in a sub-ledger 802 associated with a certain interest rate or fees). Responsive to identifying the sub-ledger 802 to add the additional exchange value, the processor 114 can update the sub-ledger 802 to include the additional exchange value and an identifier of the type of exchange 804 associated with the exchange. The processor 114 can increase the exchange value 806 associated with the type of exchange 804 by the additional exchange value, thereby updating the sub-ledger 802 with the additional exchange value. As described herein, the types of exchange can differentiate the exchanges within a sub-ledger from each other (e.g., differentiate the exchanges based on how the exchanges originated). The containers can differentiate the exchanges of one sub-ledger from exchanges of another sub-ledger (e.g., based on the configuration parameters that are to be applied to and/or for handling the exchanges of the respective sub-ledgers).

Figure 9:
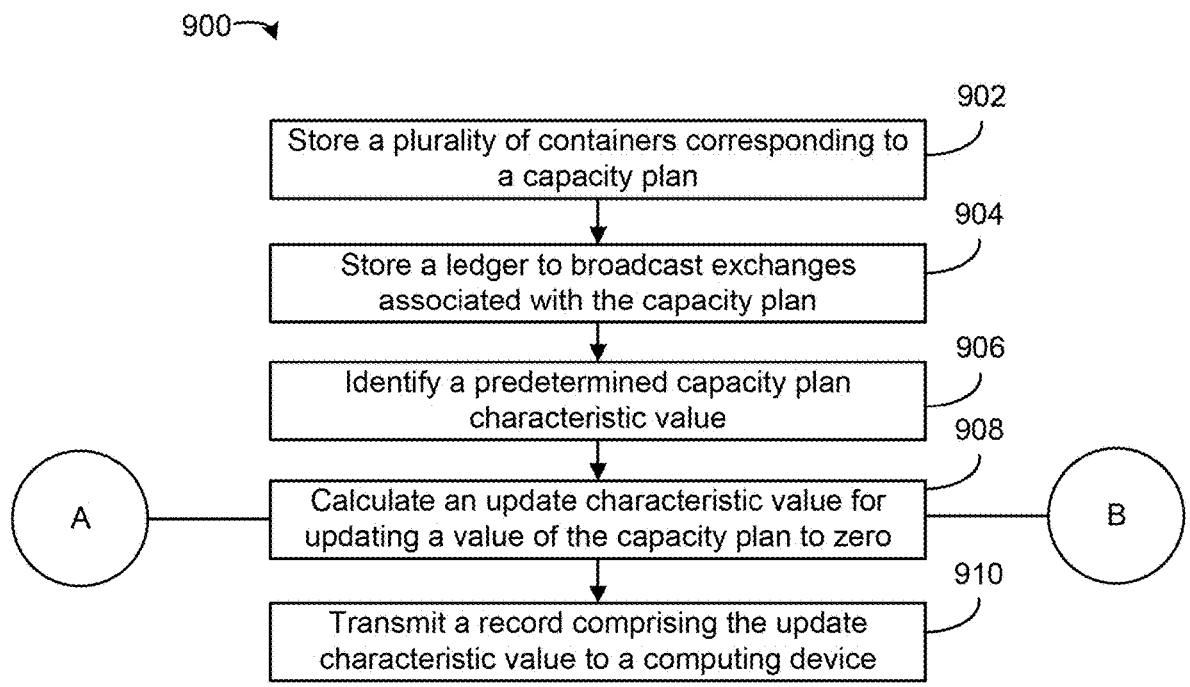
FIG. 9 is a flowchart of a method for generating an update characteristic value for a capacity plan having multiple sub-ledgers, according to some implementations.

FIG. 9 is a flowchart of a method 900 for generating an update characteristic value for a capacity plan having multiple sub-ledgers, according to some implementations. Various components of the computing environment 100 (e.g., provider system 110, user device 140, data acquisition engine 180, etc.) of FIGS. 1A and/or 1B can perform the method 900. In some cases, at least one circuit or processing unit of the component of the computing environment 100 (e.g., the processing circuit 112, the processor 114, the memory 116 of the provider system 110, etc.) can perform the method 900. Further, any computing device composed of hardware, software, or a combination of hardware and software described herein can be configured to perform method 900.

In broad overview of the method 900, at block 902, memory can store a plurality of containers corresponding to a capacity plan. At block 904, the memory can store a ledger to broadcast exchanges associated with the capacity plan. At block 906, a processor can identify a predetermined capacity plan characteristic. At block 908, the processor can calculate an update characteristic value for updating a value of the capacity plan to zero. At block 910, the processor can transmit a record including the update characteristic value to a computing device. Additional, fewer or different operations may be performed depending on the particular arrangement. In some embodiments, some or all operations of method 900 may be performed by one or more processors executing on one or more computing devices, systems or servers. In various embodiments, each operation may be re-ordered, added, removed or repeated. Blocks 902-910 can be described in further detail with reference to at least FIGS. 2-3 and/or 7.

At block 902, a processor (e.g., a processor of the processing circuit 112, the processor 114, etc.) can store a plurality of containers. The processor can store the plurality of containers in a memory (e.g., the memory 116). As described herein, the containers can include configuration parameters that specify one or more aspects of handling exchanges in a capacity plan. For example, exchanges can be routed to different containers based on attributes or characteristics of the exchanges. Each exchange can be stored in a database with a label indicating the container to which the exchange has been routed and an exchange value indicating the value of the exchange. The container can correspond to different configuration parameters (e.g., update rate percentage, balance, credit limit, etc.) that indicate how to update the exchange values (e.g., how to increase or otherwise decrease the value of the exchange values). The processor can receive exchanges over time and route the exchanges to different containers. Accordingly, the processor can group the exchanges for the capacity plan based on the configuration parameters that correspond to the exchanges.

At block 904, the processor can store a ledger. The processor can store the ledger in memory. The ledger can broadcast exchanges associated with the capacity plan. The ledger can include the data for the different exchanges, such as timestamps and exchange values for the different exchanges. The processor can aggregate the exchange values of each exchange that is associated with the ledger to generate a value of the capacity plan. The processor can store the generated value of the capacity plan in memory.

The exchanges can be divided within the ledger into different sub-ledgers. The sub-ledgers can each correspond to a different container that the processor stores in the memory. The processor can write the exchanges into the different sub-ledgers, for example, by assigning or otherwise labeling the exchanges with a label (e.g., a numerical or alphanumerical value, such as "container001"). The label can indicate the container with which the individual exchanges correspond. The processor can route the exchanges to the different containers and corresponding sub-ledgers by assigning the exchanges to containers that correspond to the exchanges.

The processor can calculate sub-ledger values for the different sub-ledgers. For example, the processor can query the ledger and the exchange values for each of the exchanges broadcast on the ledger. The processor can identify the labels for the different exchanges that indicate the containers and/or sub-ledgers to which the exchanges have been routed. For each sub-ledger, the processor can identify the exchanges that have been labeled with the label for the sub-ledger and the exchange values that correspond with the identified exchanges. The processor can aggregate the exchange values of the identified exchanges for the sub-ledger to generate or obtain a sub-ledger value for the sub-ledger. The processor can similarly generate sub-ledger values for each sub-ledger of the ledger and/or capacity plan. The processor can aggregate the sub-ledger values of the ledger or capacity plan to generate or obtain a value for the capacity plan.

In some implementations, exchanges can be routed into sub-ledgers that are divided into different data structures (e.g., tables). Each different data structure can correspond with a different container (e.g., a different set of configuration parameters). In such implementations, the processor can identify the exchange values of each exchange within a particular data structure and aggregate the exchange values to generate or obtain a sub-ledger value for the sub-ledger. Accordingly, the processor can calculate a value indicating the total value of a particular sub-ledger and/or container.

At block 906, the processor can identify a predetermined capacity plan characteristic value. The predetermined capacity plan characteristic value can be or indicate a minimum update per cycle value or a time period for completion of an update of the value of the capacity plan to zero. The processor can identify the predetermined capacity plan characteristic in response to receiving a request to do so from a client device or automatically upon determining a condition has been satisfied (e.g., a time interval has passed since the last identification of a predetermined capacity plan characteristic value). The processor can identify the predetermined capacity plan characteristic value from memory or from a request that the processor receives from a client device.

A predetermined capacity plan characteristic value can be a minimum update per cycle value. Alternatively, a predetermined capacity plan characteristic value can be a time period for completion of an update of the value of the capacity plan to zero. The processor can identify the minimum update per cycle value or the time period for completion of an update of the value of the capacity plan to zero depending on the update characteristic value that the processor is calculating. To calculate the number of update cycles it would take to reduce the value of the capacity plan to zero, the processor can identify the minimum update per cycle predetermined capacity plan characteristic value. To calculate the minimum update value for updating the value of the capacity plan to zero, the processor can identify the time period for completion of an update of the value of the capacity plan to zero. In some implementations, the processor can determine which predetermined capacity plan characteristic value to identify based on an indicator in the request indicating the updating characteristic value to calculate.

At block 908, the processor can calculate an update characteristic value. The update characteristic value can be a value for updating the value of the capacity plan to zero. For example, the update characteristic value can indicate a number of cycles (e.g., updates that occur at set time intervals) that would be required to update the value of the capacity plan to zero given a minimum update per cycle. In another example, the update characteristic value can indicate the minimum update value to cause the value of the capacity plan to reduce to zero within a defined time period. The processor can calculate one or both of such update characteristic values at set time intervals and/or upon receipt of a request from a client device.

The processor can calculate the update characteristic values using different models. For example, the processor can execute a first model (e.g., a first set of executable code) to calculate a number of cycles to update the value of the capacity plan to zero. The processor can execute a second model (e.g., a second set of executable code) to calculate a minimum update per cycle for updating the value of the capacity plan to zero. The processor can select the first model to calculate the number of cycles to update the value of the capacity plan to zero using a minimum update per cycle value as input into the first model. The processor can select the second model to calculate the minimum update per cycle for updating the value of the capacity plan to zero using the time period for completion of an update of the value of the capacity plan to zero as input into the second model. The processor can select the first model or the second model based on whether the processor is calculating the minimum update per cycle for the capacity plan or the time period for completion of an update of the value of the capacity plan to zero for the capacity plan. The processor can execute the selected first or second model to calculate or generate the update characteristic value that the model is configured to calculate.

Figure 10:
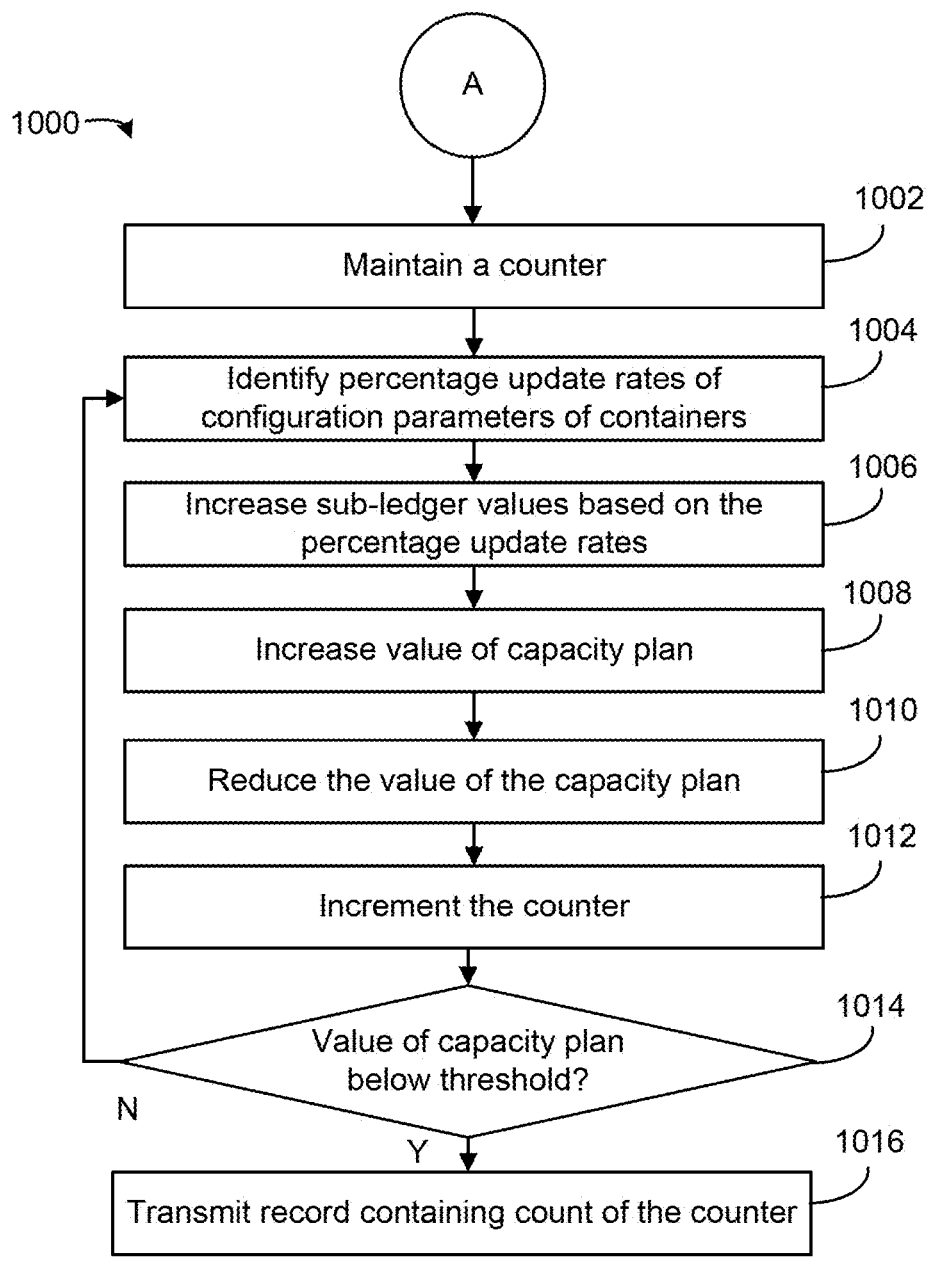
FIG. 10 is a flowchart of a method for generating an update characteristic value for a capacity plan having multiple sub-ledgers, according to some implementations.

Responsive to executing the first model to calculate the number of cycles to update the value of the capacity plan to zero, the processor can perform a method 1000, depicted in FIG. 10. The method 1000 can be a part of the method 900. In one example, the method 1000 can be or include operation of the processor in the block 908. In various embodiments, each operation of the method 1000 may be re-ordered, added, removed or repeated. By performing the method 1000 the processor can calculate or generate an update characteristic value indicating a number of cycles to update the value of the capacity plan to zero based on a minimum update per cycle value.

At block 1002, the processor can maintain a counter. The counter can include a count (e.g., a value) that indicates the number of cycles to update the value of the capacity plan to zero. The processor can maintain the counter by storing the counter in memory.

At block 1004, the processor can identify percentage update rates of configuration parameters of containers. The processor can identify the percentage update rates of the sub-ledgers of which the different exchanges are a part by identifying the percentage update rates from the containers that correspond to the sub-ledgers. The percentage update rates can indicate a percentage increase for an exchange value over the course of one cycle. In one example, the processor can identify the container from the label of each exchange on the ledger. The processor can identify the containers that correspond to the labels. The processor can identify the percentage update rate of each container. The processor can then store associations between the percentage update rates and the exchanges that correspond to the containers of the percentage update rates. Accordingly, the processor can identify a percentage increase for each exchange broadcasted on the ledger.

At block 1006, the processor can increase the sub-ledger values based on percentage update rates. The processor can multiply the percentage update rates by the exchange values of the exchanges that have stored associations with the respective percentage update rates to generate or calculate update increases for the exchange values. The processor can increase the exchange value for each exchange by the update increase for the exchange. The processor can aggregate the increased values of exchanges that belong to the same sub-ledger (e.g., have a common label to a container and/or that are stored in the same data structure) for each sub-ledger of the ledger to calculate or generate sub-ledger values.

In some implementations, instead of updating sub-ledger values by updating the individual exchange values, the processor can increase the sub-ledger values directly based on the percentage update rates for the sub-ledgers. For example, the processor can identify the percentage update rates of the containers that correspond to the individual sub-ledgers. The processor can identify the sub-ledger value for each sub-ledger. The processor can multiply the percentage update rate for each of the containers by the sub-ledger values of the sub-ledgers that correspond to the individual containers to obtain sub-ledger value increases. The processor can then increase the sub-ledger values by the sub-ledger value increases for the respective sub-ledgers.

At block 1008, the processor can increase the value of the capacity plan. The processor can increase the value of the capacity plan by aggregating the increased values of the sub-ledgers together. In doing so, the processor can calculate an increased value of the capacity plan. In some implementations, the processor can increase the value of the capacity plan by aggregating the increase in the sub-ledger values or by aggregating the increase in the exchange values of the ledger to generate or calculate an increase in value of the capacity plan. In such implementations, the processor can aggregate the increase in value of the capacity plan with the value of the capacity plan to generate or calculate an increase in value of the capacity plan.

At block 1010, the processor can reduce the value of the capacity plan. The processor can reduce the value of the capacity plan subsequent or prior to increasing the value of the capacity plan at the block 1008. The processor can reduce the value of the capacity plan by subtracting the minimum update per cycle value from the value of the capacity plan. Accordingly, the processor can update the value of the capacity plan based on the rate increases according to the configuration parameters of the containers and the reduction of the minimum update per cycle value.

When reducing the value of the capacity plan, the processor can update the sub-ledger and/or exchange values. The processor can update the sub-ledger and/or exchange values using the systems and methods described above with respect to FIGS. 7 and 8. For example, each sub-ledger of the ledger can correspond to a priority value and include exchanges of different types of exchange. The processor can allocate portions of the minimum update value to the different sub-ledgers of the ledger according to the priority values of the sub-ledgers. In some implementations, the processor can then update (e.g., reduce) exchange values of the exchanges within the sub-ledgers with the allocated portions of the minimum update value and according to a priority order of the types of exchange within the sub-ledgers. In some implementations, the processor can only update (e.g., reduce) the sub-ledger values of the sub-ledgers according to portions of the minimum update value allocated to the respective sub-ledgers.

At block 1012, the processor can increment the counter. The processor can increment a count of the counter. The processor can increment the counter by a value of one or another integer. By doing so, the processor can indicate that a single cycle of updating the value of the capacity plan has been completed.

At block 1014, the processor can determine whether the value (e.g., the updated value) of the capacity plan is below a threshold. The threshold can be a predetermined threshold. In some implementations, such a determination can be a determination as to whether the value of the capacity plan is below 0.5 cents or is at zero. The processor can compare the value of the capacity plan to the threshold to determine if the value of the capacity plan is below the threshold. Responsive to determining the value of the capacity is not below the threshold, the processor can return to the block 1004. The processor can repeat the blocks 1004-1014 until determining the value of the capacity plan is below the threshold.

Responsive to determining the value of the capacity plan is below the threshold, at block 1016, the processor can transmit a record containing the count of the counter. A record can be or include a file, document, table, listing, message, notification, etc. The count of the counter can indicate the number of cycles to update the value of the capacity plan to zero given the minimum update per cycle value. The processor can transmit the record to a computing device (e.g., a computing device that transmitted a request to initiate the performance of the method 900 and/or the method 1000). The computing device can receive the record and display the count on a user interface on a display (e.g., a display of the computing device). Thus, the processor can generate or calculate a number of cycles to update the value of the capacity plan to zero given the minimum update per cycle value and provide such a calculated value to a computing device.

In some implementations, the processor can determine whether it is possible to reduce the value of the capacity plan to zero based on the minimum update per cycle value. For example, the processor can identify percentage update rates of the configuration parameters of the plurality of containers. The processor can increase the sub-ledger values corresponding to the plurality of containers based on the identified percentage update rates. The processor can increase the value of the capacity plan based on the increase to the sub-ledger values. The processor can reduce the value of the capacity plan by the minimum update per cycle. The processor can calculate a difference between the increase in the value of the capacity plan and the reduction in the value of the capacity plan. The processor can compare the difference to a threshold (e.g., a defined threshold). Responsive to determining the difference exceeds the threshold, the processor can generate a record that includes an error alert. In some implementations, the processor can generate an alert responsive to determining the minimum update per cycle value is less than the increase to the sub-ledger values or the increase to the value of the capacity plan.

The processor can generate the record with the error alert to indicate the minimum update per cycle value does not enable the value of the capacity plan to reduce to zero based on the configuration parameters of the exchanges on the ledger. The processor can transmit the record to the computing device that transmitted the request to initiate the performance of the method 900 and/or the method 1000. The computing device can receive the record and present the error alert on a user interface on a display of the computing device.

Figure 11:
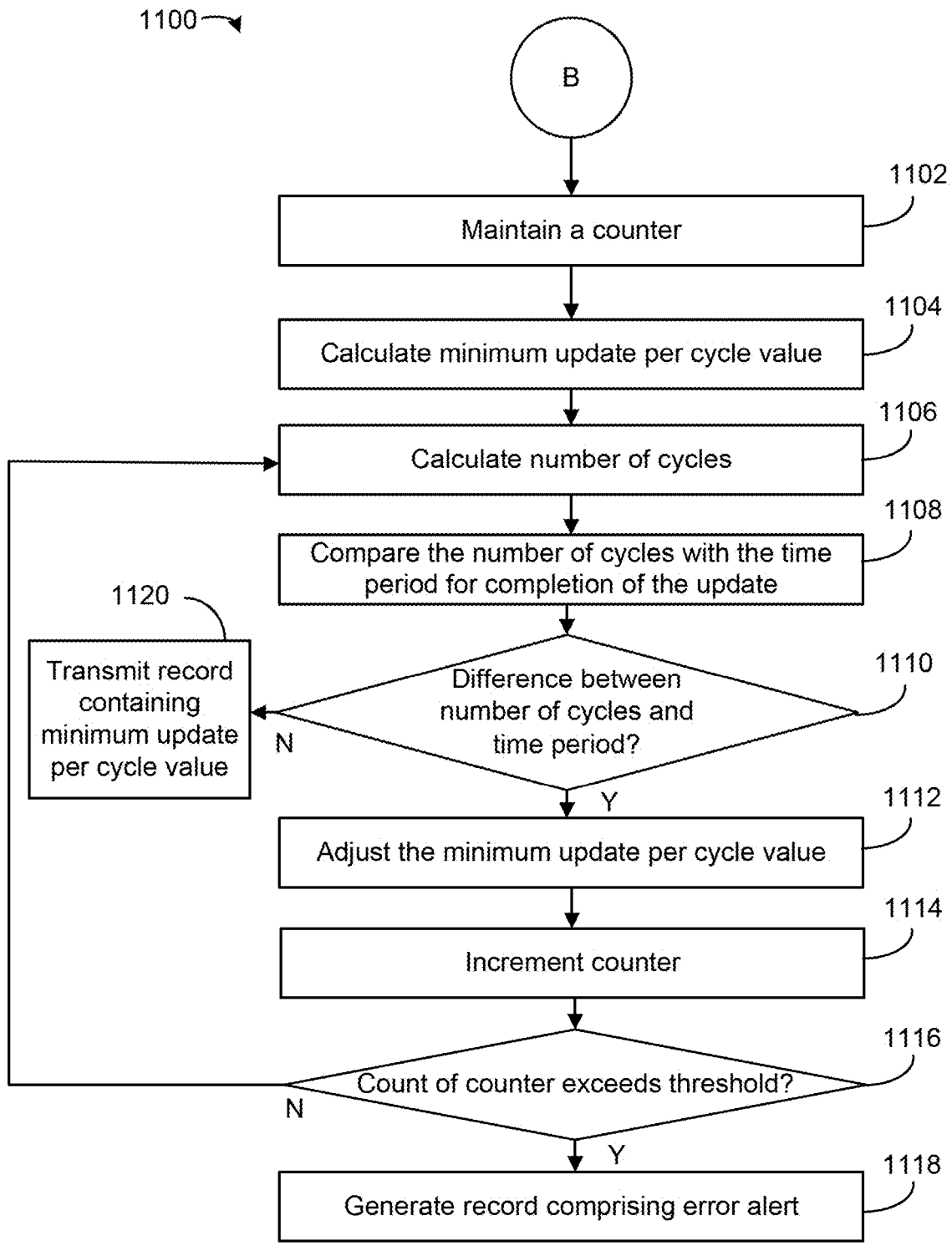
FIG. 11 is a flowchart of a method for generating an update characteristic value for a capacity plan having multiple sub-ledgers, according to some implementations.

Referring back to FIG. 9, at the block 908, the processor can execute the second model to calculate a minimum update per cycle value given a time period to update the value of the capacity plan to zero. To do so, the processor can perform a method 1100, depicted in FIG. 11. The method 1100 can be a part of the method 900. In one example, the method 1100 can be or include operation of the processor in the block 908. The processor can perform the method 1100 in parallel (e.g., using twin cores or multiple threads), before, or after performing the method 1000. In various embodiments, each operation of the method 1100 may be re-ordered, added, removed or repeated. By performing the method 1100 the processor can calculate or generate an update characteristic value indicating a minimum update value to reduce the value of the capacity plan to zero based on a time period (e.g., defined time period or length).

At block 1102, the processor can maintain a counter. The processor can maintain the counter by storing the counter in memory. The counter can be or include a value that indicates the number of iterations that the processor performs operations (operations of blocks 1104-1116) of the method 1100. The value of the counter can be or include the count of the counter. The counter can be or include an error counter. The processor can use the counter to determine whether it is possible or if it would require too much processing power to calculate or generate an update characteristic value indicating a minimum update value to reduce the value of the capacity plan to zero based on a time period (e.g., a time period for completion of an update to the value of the capacity plan to zero).

At block 1104, the processor can calculate a minimum update per cycle value (e.g., calculate $m_1$). The processor can calculate the minimum update per cycle value based on the value of the capacity plan. To do so, for example, the processor can identify the value of the capacity plan. The processor can divide the value of the capacity plan by two or perform another operation on the value of the capacity plan to calculate the minimum update per cycle value (e.g., the initial minimum update per cycle value). The processor can use any function to calculate the minimum update per cycle value.

At block 1106, the processor can calculate a number of cycles. The number of cycles can be the number of cycles to update the value of the capacity plan to zero. The processor can calculate the number of cycles by performing the method 1000 using the minimum update per cycle value calculated in the block 1104 as the minimum update per cycle value to calculate the number of cycles to update the value of the capacity plan to zero. In one example, the processor can execute the first model using the calculated minimum update per cycle value as input (e.g., executing the second model can cause the processor to execute the first model using the calculated minimum updater cycle value as input). The processor can identify the output of the first model as the number of cycles to update the value of the capacity plan to zero based on the calculated minimum update per cycle value.

At block 1108, the processor can compare the number of cycles to update the value of the capacity plan to zero with the time period to update the value of the capacity plan to zero. For example, each cycle can correspond to a time interval (e.g., a day, week, month, year, etc.). The time to update the value of the capacity plan to zero can be a fixed time period, such as one year, two years, three years, four years, etc. The processor can multiply the calculated number of cycles by the length of the time interval to obtain a length of time to update the value of the capacity plan to zero. The processor can compare the length of time with the time period to update the value of the capacity plan to zero.

At block 1110, the processor can determine whether there is a difference between the number of cycles to update the value of the capacity plan to zero and the time period to update the value of the capacity plan to zero. The processor can do so based on the comparison of block 1108. For example, the processor can determine a difference between the length of time and the time period to update the value of the capacity plan to zero. Responsive to determining there is a difference or the difference exceeds a threshold (e.g., an absolute value of the difference exceeds a threshold), the processor can determine there is a difference between the number of cycles to update the value of the capacity plan to zero and the time period to update the value of the capacity plan to zero. However, responsive to determining there is not a difference or the difference is less than the threshold (e.g., an absolute value of the difference is less than the threshold), the processor can determine there is not a difference between the number of cycles to update the value of the capacity plan to zero and the time period to update the value of the capacity plan to zero.

Responsive to determining there is a difference, at the block 1112, the processor can adjust the minimum update per cycle value. The processor can adjust the minimum update per cycle value by increasing or decreasing the minimum update per cycle value. The processor can increase the minimum update per cycle value responsive to determining the length of time to update the value of the capacity plan to zero is less than the time period to update the value of the capacity plan to zero (e.g., determining the difference is negative and the absolute value of the difference exceeds the threshold). The processor can decrease the minimum update per cycle value responsive to determining the length of time to update the value of the capacity plan to zero is greater than the time period to update the value of the capacity plan to zero (e.g., determining the difference is positive and the value or absolute value of the difference exceeds the threshold).

The processor can increase or decrease the minimum update per cycle value by performing a function on the minimum update per cycle value. The function can be the same or similar to the function that the processor used to calculate the minimum update per cycle value at the block 1104. For example, to increase the minimum update per cycle value, the processor can calculate the average of the minimum update per cycle value and the value of the capacity plan or perform any other function to increase the minimum update per cycle value. To decrease the minimum update per cycle value, the processor can divide the minimum update per cycle value in half or perform any other function to decrease or reduce the minimum update per cycle value. In this way, the processor can calculate or generate an updated minimum update per cycle value.

At the block 1114, the processor can increment the counter (e.g., the error counter). The processor can increment a count of the counter. The processor can increment the counter by a value of one or another integer.

At the block 1116, the processor can determine whether the count of the counter exceeds a threshold (e.g., a defined threshold). The threshold can be any value. In one example, the threshold can be 200, which enables the processor to avoid using excess processing resources to calculate the minimum update per cycle value while still giving enough iterations to accurately calculate the minimum update per cycle value. The processor can determine whether the count of the counter exceeds the threshold by comparing the count of the counter to the threshold.

Responsive to determining the count exceeds or otherwise satisfies the threshold, at block 1118, the processor can generate a record that includes an error alert. The record can include a string indicating the time period for updating the value to zero and an indication that the processor could not or did not calculate a minimum update per cycle value that reduces the value of the capacity plan to zero within the time period. The processor can transmit the record to a computing device (e.g., a computing device that transmitted a request to initiate the performance of the method 900 and/or the method 1100). The computing device can receive the record and display the error alert on a user interface in a display.

Responsive to determining the count of the counter does not exceed the threshold, the processor can return to the block 1106. The processor can repeat the operations of 1110-1116. The processor can do so by adjusting the minimum update per cycle value for each iteration (e.g., the minimum update per cycle based on the most recently calculated minimum update per cycle value). The processor can repeat the operations 1110-1116 until determining the count of the counter exceeds the threshold at the block 1116 or the difference between the number of cycles and the time period is zero or below a threshold at the block 1110.

Responsive to determining the difference between the number of cycles and the time period is zero or below a threshold at the block 1110, at the block 1120 the processor can transmit a record containing the minimum update per cycle value (e.g., the most recently generated or calculated minimum update per cycle value). The processor can identify the minimum update per cycle value as the minimum update per cycle value that would reduce the value of the capacity plan to zero for the time period for completion of an update of the value of the capacity plan to zero. The processor can generate the record by including the identified minimum update per cycle value in the record. The processor can transmit the record to the computing device that transmitted a request to initiate the performance of the method 900 and/or the method 1100. The computing device can receive the record and display the minimum update per cycle value on a user interface on a display.

Referring back to FIG. 9, at block 910, the processor can transmit a record to a computing device. The record can include the update characteristic value of the number of cycles for updating the value of the capacity plan to zero or a minimum update per cycle for the value of the capacity plan to zero over a defined time period. The processor can perform the operations of the block 910 as the operations described with respect to the blocks 1016 and/or 1118. The processor can transmit one or both of the number of cycles for updating the value of the capacity plan to zero or a minimum update per cycle for the value of the capacity plan to reduce to zero over a defined time period to the computing device.

Figure 12:
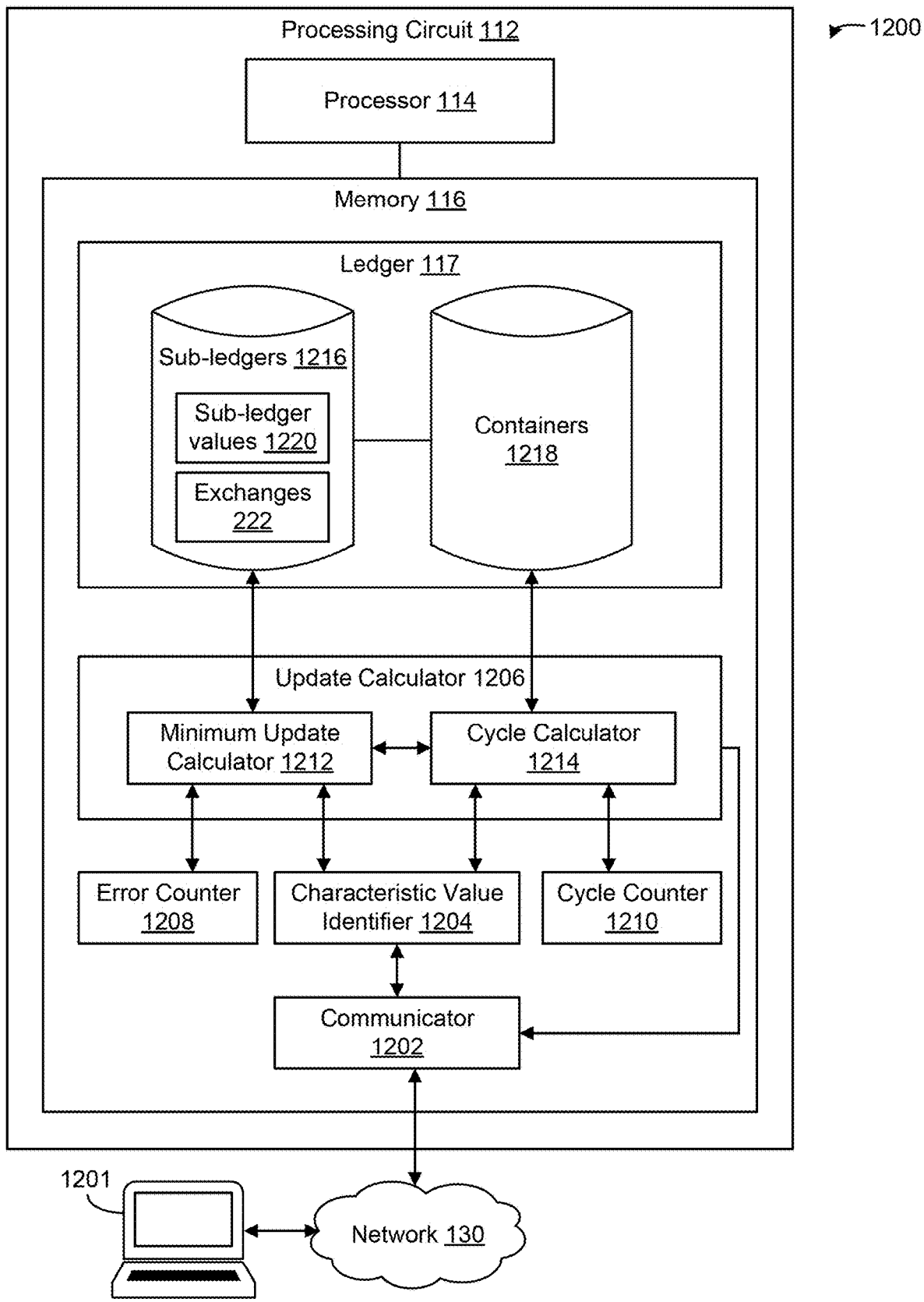
FIG. 12 is a block diagram depicting an implementation of a system for generating an update characteristic value for a capacity plan having multiple sub-ledgers, according to some implementations.

Referring now to FIG. 12, a block diagram depicting an implementation of a system 1200 for generating an update characteristic value for a capacity plan having multiple sub-ledgers, according to some implementations. The processing circuit 112 can be a part of the provider system 110, capable of performing the features or functionalities of the provider system components thereof described in conjunction with at least FIGS. 1A and/or 1B. Although the processing circuit 112 of the provider system 110 is used for the example implementations discussed herein, additionally or alternatively, the processing circuit 112 may correspond to or perform the features of the processing circuit 152 or 172 of the third-party system 150 or the content management system 170, for example.

The components of the processing circuit 112 discussed herein can include or be composed of hardware, software, or a combination of hardware and software components. The processing circuit 112 can include at least one processor 114 and at least one memory 116. The processing circuit 112 can be in electrical communication with a communication network interface (e.g., the network interface 128) to enable communication with other devices within the network 130. For example, the processing circuit 112 can communicate with a computing device 1201, or other devices connected to the network 130 via the communication network interface.

The computing device 1201 may be any computing device comprising a processor and non-transitory, machine-readable storage capable of executing the various tasks and processes described herein. The computing device may employ various processors such as a central processing unit (CPU) and graphics processing unit (GPU), among others. Non-limiting examples of such computing devices may include workstation computers, laptop computers, server computers, and the like.

The memory 116 may include a communicator 1202, a characteristic value identifier 1204, an update calculator 1206, an error counter 1208, a cycle counter 1210, and the ledger 117, in some implementations. In brief overview, the components 117 and 1202-1210 may cooperate to calculate update characteristic values for updating a value of a capacity plan to zero.

The computing device 1201 can transmit a request for an update characteristic value to the processing circuit 112. The request can include an identification of one or more types of update characteristic values (e.g., a number of update cycles for updating the value of the capacity plan to zero, a minimum update per cycle, over a time period (e.g., a defined time period), for updating the value of the capacity plan to zero, or both). In some implementations, the request can include an identifier of a capacity plan or of a user or account associated with such a capacity plan for which to calculate the update characteristic value.

The communicator 1202 may include programmable instructions that, upon execution, cause the processing circuit (e.g., via the processor 114) to communicate with computing devices (e.g., the computing device 1201). The communicator 1202 may be or include an application programming interface (API) that facilitates communication between the processing circuit 112 and other computing devices. The communicator 1202 may communicate with computing devices across the network 130. In some implementations, the communicator 1202 may communicate with computing devices through the data acquisition engine 180.

The communicator 1202 can receive the request from the computing device 1201. The communicator 1202 can receive the request from the computing device 1201 over the network 130. The computing device 1201 may access a platform that the communicator 1202 provides to the computing device 1201 over the network 130. The client device 102 may transmit the request in a network packet or message to the communicator 1202 via the platform. For example, via the computing device 1201, a user may access the user's account on the platform that the communicator 1202 provides. The user may select (e.g., input or select from a user interface) an account or user that has a capacity plan with the platform or the processing circuit 112 and/or one or more update characteristic values for updating a value of the capacity plan of the user or account to zero. The computing device 1201 may receive the selection, encapsulate the selection into one or more network packets, and transmit the one or more network packets to the communicator 1202.

The characteristic value identifier 1204 may include programmable instructions that, upon execution, cause the processing circuit 112 (e.g., via the processor 114) to identify a predetermined capacity plan characteristic value. The predetermined capacity plan characteristic value can be or indicate a minimum update per cycle value for a capacity plan or a time period for completion of an update of a value of a capacity plan to zero. The characteristic value identifier 1204 can identify the predetermined capacity plan characteristic value (or values) from the request from the computing device 1201 or from a stored value in memory. The characteristic value identifier 1204 can identify the predetermined capacity plan characteristic value in response to the request or automatically (e.g., upon completion of a set time interval).

In some implementations, the characteristic value identifier 1204 can identify the predetermined capacity plan characteristic value based on the requested update characteristic value and the capacity plan for which the update characteristic value is requested. For example, the request can include a request for a number of update cycles to update the value of the capacity plan to zero for a first capacity plan. Responsive to receiving the request, the characteristic value identifier 1204 can identify the profile or account of the first capacity plan. The characteristic value identifier 1204 can identify the minimum update per cycle value based on the request for the number of update cycles to update the value of the capacity plan to zero. In another example, the request can include a request for a minimum update per cycle value for updating the value of the capacity plan to zero for the first capacity plan. Responsive to receiving the request, the characteristic value identifier 1204 can identify the profile or account of the first capacity plan. The characteristic value identifier 1204 can identify the time period for completion of an update of the value of the capacity plan to zero based on the request for minimum update per cycle value for updating the value of the capacity plan to zero. In some implementations, the characteristic value identifier 1204 can identify the same predetermined capacity plan characteristic values for each capacity plan.

The update calculator 1206 may include programmable instructions that, upon execution, cause the processing circuit 112 (e.g., via the processor 114) to calculate an update characteristic value. The update calculator 1206 can calculate an update characteristic value based on the predetermined capacity plan characteristic value or values that the characteristic value identifier 1204 identifies. The update calculator 1206 can calculate a number of cycles to update the value of the capacity plan to zero using (e.g., by executing) a minimum update calculator 1212 (e.g., a second model). The update calculator 1206 can calculate a minimum update per cycle for updating the value of the capacity plan to zero using (e.g., by executing) a cycle calculator 1214 (e.g., a first model).

For example, the cycle calculator 1214 may include programmable instructions that, upon execution, cause the processing circuit 112 (e.g., via the processor 114) to calculate an update characteristic value. The cycle calculator 1214 can calculate a number of cycles to update the value of the capacity plan to zero. The cycle calculator 1214 can do so based on the minimum update per cycle value that the characteristic value identifier 1204 identifies (e.g., identifies in response to the request or automatically). The cycle calculator 1214 can calculate the number of cycles to update the value of the capacity plant to zero based on data in the sub-ledgers 1216 and/or containers 1218 of the ledger 117.

The ledger 117 can include the sub-ledgers 1216 and the containers 1218. The sub-ledgers 1216 can include one or more sub-ledgers. Each sub-ledger can include a sub-ledger value 1220 and one or more exchanges 1222. Each of the one or more exchanges 1222 can include or be associated with an exchange value of the exchange. The sub-ledger values 1220 can each be the sum of the exchange values of the exchanges within the respective sub-ledgers.

The individual sub-ledgers of the sub-ledgers 1216 can be identified from labels of the exchanges 1222 or be stored as separate data structures (e.g., tables). For example, each of the exchanges 1222 can be stored as individual records in the ledger 117. The data for each of the exchanges 1222 can be stored within the ledger 117, including exchange values of the exchanges and/or labels indicating the containers 1218 to which the exchanges have been linked or routed, as described herein. The individual sub-ledgers can correspond to a common label (e.g., each exchange that has been labeled with the same container can correspond to or be a part of the same sub-ledger). Accordingly, the exchanges 1222 can be divided or assigned into individual sub-ledgers while being maintained in the same ledger 117.

In another example, the exchanges 1222 can be stored (e.g., broadcasted) in separate data structures. For example, upon routing the exchanges to the different containers, the exchanges can be stored in data structures that only include exchanges that have been routed to the same containers. The individual data structures may be labeled with a label linking the data structures with the containers to which the exchanges of the data structures have been routed.

The containers 1218 can include one or more containers that the ledger 117 maintains for a capacity plan. Each of the containers can include different configuration parameters that indicate how to handle the exchanges of the sub-ledgers linked to the respective containers. The containers can be stored in separate tables that each include a different set of configuration parameters and/or an identifier of the respective container. The identifiers of the containers can be used to label the exchanges 1222 of the ledger 117 to indicate the containers to which the exchanges 1222 have been routed and therefore the sub-ledgers 1216 of which the exchanges 1222 are a part.

The cycle calculator 1214 can update the value of the capacity plan. The cycle calculator 1214 can retrieve the exchange values from the ledger 117 as well as the configuration parameters of the containers 1218. The cycle calculator 1214 can determine percentage update increases for each of the exchange values of the exchanges from the configuration parameters of the containers 1218 that are linked with the exchanges. The cycle calculator 1214 can increase the exchange values of each of the exchanges 1222 based on the percentage update increases for the respective exchange values. The cycle calculator 1214 can update the sub-ledger values 1220 based on the increase to the exchange values in the individual sub-ledgers. The cycle calculator 1214 can update the value for the capacity plan by increasing the value of the capacity plan by the aggregate amount of the increase in sub-ledgers value 1220 or the aggregate amount of the increase in exchange values. The cycle calculator 1214 can then reduce the value of the capacity plan by the minimum update per cycle value.

The cycle calculator 1214 can determine if the value of the capacity plan is zero or below a threshold (e.g., a defined threshold). For example, the cycle calculator 1214 can compare the value of the capacity plan to the threshold after the update (e.g., the increase according to the update percentage increase and the decrease according to the minimum update per cycle value). The cycle calculator 1214 can repeatedly update the exchange values, the sub-ledger values 1220, and/or the value of the capacity plan according to the configuration parameters in the containers 1218 and/or the minimum update per cycle value until determining the value of the capacity plan is zero or below a threshold.

The cycle calculator 1214 can calculate the number of cycles it will take to update the value of the capacity plan to zero based on the minimum update per cycle value using the cycle counter 1210. The cycle counter 1210 can be a value or count that corresponds to the number of cycles (e.g., time periods or time intervals) it will take to update the value of the capacity plan to zero based on a minimum update per cycle value. In one example, the cycle calculator 1214 can increment the count of the cycle counter 1210 for each update to the capacity plan that the cycle calculator 1214 makes until determining the value of the capacity plan is zero or below the threshold. The final count of the counter can indicate the number of cycles that are required to update the value of the capacity plan to zero or to a value below the threshold. The communicator 1202 can transmit the count of the counter to the computing device 1201 upon determining the value of the capacity plan is zero or below the threshold.

The minimum update calculator 1212 may include programmable instructions that, upon execution, cause the processing circuit 112 (e.g., via the processor 114) to calculate an update characteristic value. The minimum update calculator 1212 can calculate the minimum update per cycle for a capacity plan to bring the value of the capacity plan to zero within a defined time period. The minimum update calculator 1212 can do so based on the time period for completion of an update of the value of the capacity plan to zero that the characteristic value identifier 1204 identifies (e.g., identifies in response to the request or automatically). The cycle calculator 1214 can calculate the minimum update per cycle to update the value of the capacity plant to zero based on data in the sub-ledgers 1216 and/or the containers 1218 of the ledger 117.

For example, the minimum update calculator 1212 can calculate an initial minimum update per cycle value, $m_1$. The minimum update calculator 1212 can calculate the initial minimum update per cycle as a function of the value of the value of the capacity plan. For example, the minimum update calculator 1212 can divide the value of the capacity plan in half to calculate the initial minimum update per cycle value. The minimum update calculator 1212 can then input the initial minimum update per cycle value into the cycle calculator 1214. The minimum update calculator 1212 can execute the cycle calculator 1214 to calculate the number of cycles that would be required to update the value of the capacity plan to zero based on the initial minimum update per cycle value.

The minimum update calculator 1212 can determine whether there is a difference between the calculated number of cycles and the time period for completion of the update of the value of the capacity plan to zero. To do so, the minimum update calculator 1212 can calculate a length of the number of cycles. The minimum update calculator 1212 identify the length or interval of each cycle (e.g., a day, week, month, year, etc.) and multiply the identified length or interval by the number of cycles the cycle calculator 1214 calculated to determine a length of the cycles. The minimum update calculator 1212 can compare the length of the cycles with the time period for completion of the update of the value of the capacity plan to zero to calculate or determine a difference. The minimum update calculator can compare the difference to a threshold or determine if the difference is a non-zero value.

Responsive to determining the difference exceeds the threshold or is a non-zero value, the minimum update calculator 1212 can adjust the initial minimum update per cycle value to an updated minimum update per cycle value. Responsive to the length of the cycles exceeding the time period for completion of the update of the value of the capacity plan to zero, the minimum update calculator 1212 can determine to increase the initial minimum update per cycle value. Responsive to the length of the cycles being less than the time period for completion of the update of the value of the capacity plan to zero, the minimum update calculator 1212 can determine to reduce or decrease the initial minimum update per cycle value.

The minimum update calculator 1212 can increase or reduce the initial minimum update per cycle value. To increase the initial minimum update per cycle value, the minimum update calculator 1212 can perform a function on the initial minimum update per cycle value. For example, the minimum update calculator 121 can calculate an average between the initial minimum update per cycle value and the value of the capacity plan. The average can be the updated minimum updated minimum update per cycle value. To reduce the initial minimum update per cycle value, the minimum update calculator 1212 can divide the initial minimum update per cycle value in half. The result can be the updated minimum update per cycle value.

Upon adjusting the initial minimum update per cycle value to the adjusted minimum update per cycle value, the minimum update calculator 1212 can execute the cycle calculator 1214 using the adjusted minimum update per cycle value. The minimum update calculator 1212 can iteratively repeat the process of adjusting the minimum update per cycle value, determining a number cycles that would be required to reduce the value of the capacity plan to zero based on the adjusted minimum update per cycle value, and then determining if there is a difference between the number of cycles and the time period for completion of the update of the value of the capacity plan to zero. The minimum update calculator 1212 can repeat the process until determining the difference is zero or determining the difference is below a threshold. Upon determining the difference is zero or below the threshold, the minimum update calculator 1212 can identify the minimum update per cycle value that caused the difference to be zero or below the threshold as the minimum update per cycle value that will cause the value of the capacity plan to reduce to zero within the time period for completion of the update of the value of the capacity plan to zero. The communicator 1202 can transmit the minimum update per cycle value to the computing device 1201 in a record, in some cases in the same record as the record containing the number of cycles to reduce the value of the capacity plan to zero calculated by the cycle calculator 1214.

The minimum update calculator 1212 can determine if the calculation to calculate the minimum update per cycle is taking too long or requiring too many resources to continue. The minimum update calculator 1212 can do so using the error counter 1208. The error counter 1208 can be a value or count that corresponds to the instances in which the minimum update calculator 1212 calculates or adjusts the minimum update per cycle value. In one example, the minimum update calculator 1212 can increment the count of the error counter 1208 for each calculation or adjustment of the minimum update per cycle value that the minimum update calculator 1212 performed. After each increment, the minimum update calculator 1212 can compare the count of the error counter 1208 to a threshold (e.g., a defined threshold, such as 200). Responsive to determining the count of the error counter exceeds the threshold, the minimum update calculator 1212 can determine there is an error in the processing. The minimum update calculator 1212 can generate and transmit a record to the computing device 1201 indicating the error, in some cases stopping processing the process.

Figure 13:
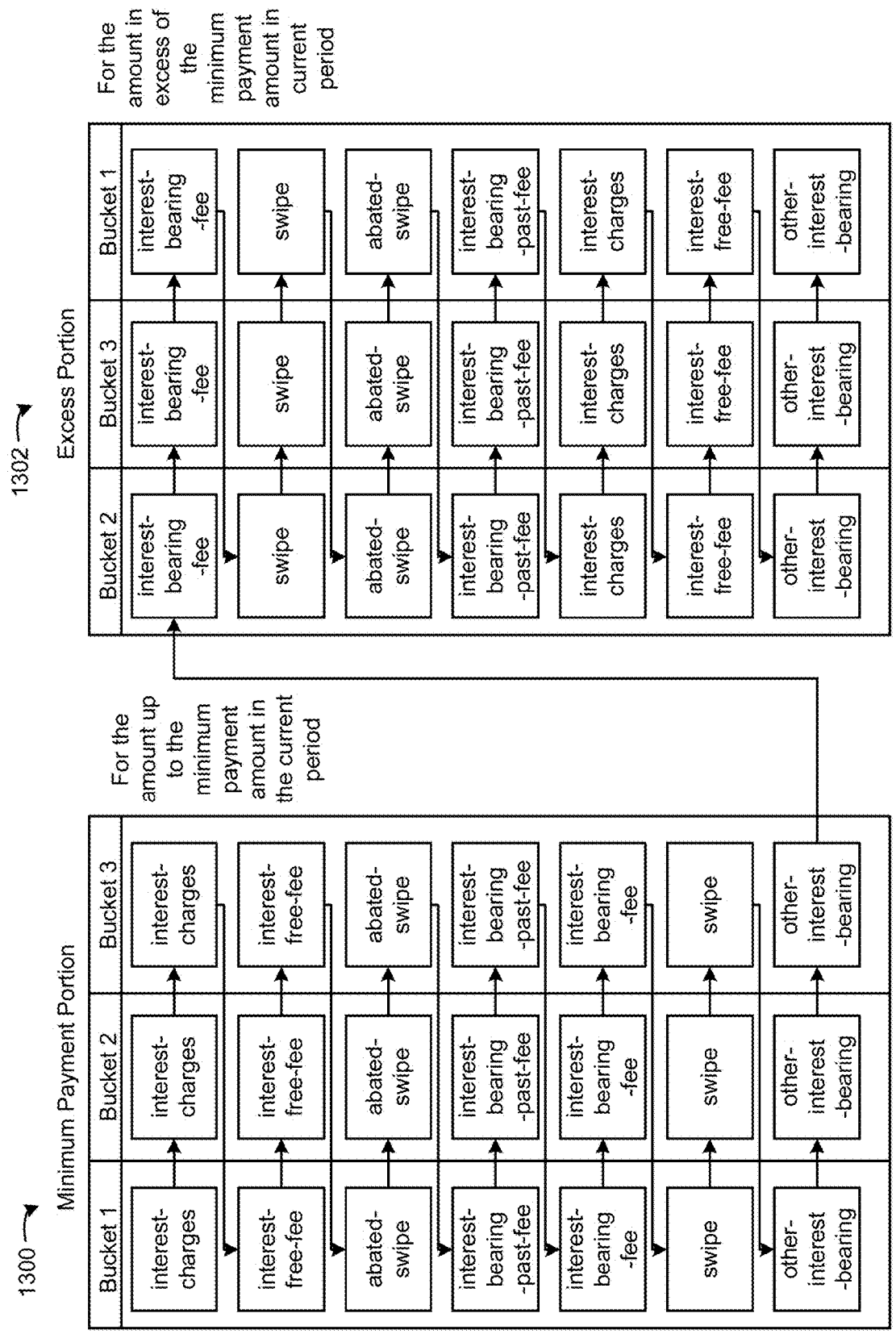
FIG. 13 is an illustration depicting an example order for allocating the payment, according to some implementations.

Referring to FIG. 13, depicted is an illustration of an example order (e.g., sequence) for allocating the payment, according to some implementations. For example, the user can define a setting (e.g., a flag, grid, configuration, etc.) regarding how to apply or allocate the value (e.g., payment) received from the user. If the user does not configure the setting, a default setting can be used to allocate the payment, such as prioritization of the sub-ledgers and/or prioritization of the types of exchange in each sub-ledger.

For example, the processing circuit (e.g., processing circuit 112) can receive a value for allocation. According to the setting configured or otherwise provided by the user, the processing circuit can determine to allocate portions of the payment according to the types of exchange across the various sub-ledgers by prioritizing the types of payment (e.g., components) before the sub-ledgers. As shown in a first sequence 1300, the processing circuit can allocate portions of the value according to an order of the types of exchange and/or the sub-ledgers. The processing circuit can allocate the payment using the first sequence 1300 for up to a minimum payment amount (e.g., in a current period or pay cycle). In this case, the ordering of the types of exchange in the first sequence 1300 can be interest-charges, interest-free-fee, abated-swipe, interest-bearing-past-fee, interest-bearing-fee, swipe, and other-interest-bearing. The ordering of the sub-ledgers can be sub-ledger 1, sub-ledger 2, and sub-ledger 3. The ordering of the types of exchange and/or the sub-ledgers can be configured by the user via a setting. According to the ordering of the first sequence 1300, the processing circuit can allocate at least a portion of the value to each respective type of exchange across all the sub-ledgers (e.g., in the indicated order) prior to proceeding to another type of exchange, for example.

In some implementations, the processing circuit can complete the allocation of the value using the first sequence 1300 if the value is less than or equal to the minimum payment amount. Otherwise, if the value is greater than the minimum payment amount (e.g., there is an excess portion of the value), the processing circuit can allocate the excess portion of the value according to a second sequence 1302.

In further example, the second sequence 1302 can be configured by the user. In some cases, the second sequence 1302 can include similar types of exchange ordering and/or the sub-ledger ordering as the first sequence 1300. In some other cases (e.g., in this example), the ordering of the types of exchange and/or the sub-ledger ordering for the second sequence 1302 can be different from the first sequence 1300 according to the setting. In this case, the ordering of the types of exchange in the second sequence 1302 can be interest-bearing-fee, swipe, abated-swipe, interest-bearing-past-fee, interest-charges, interest-free-fee, and other-interest-bearing. The ordering of the sub-ledgers can be sub-ledger 2, sub-ledger 3, and sub-ledger 1. According to the ordering of the second sequence 1302, the processing circuit can allocate the excess portion of the value to each respective type of exchange across all sub-ledgers (e.g., in the respective order) before proceeding to allocate a subsequent type of exchange.

Figure 14:
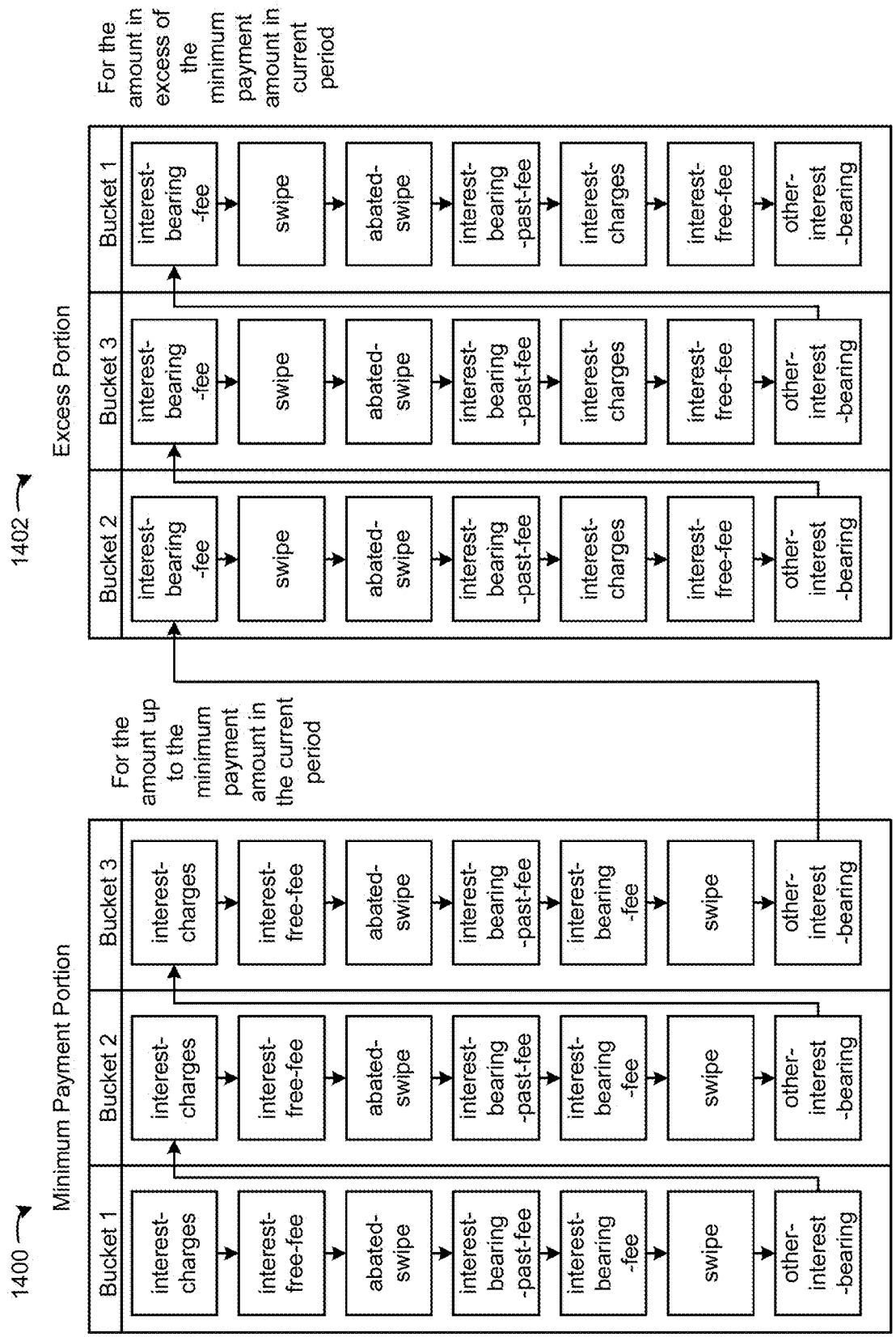
FIG. 14 is an illustration depicting another example order for allocating the payment, according to some implementations.

Referring to FIG. 14, depicted is another illustration of an example order for allocating the payment, according to some implementations. In this case, the user can configure the setting of the processing circuit to prioritize or allocate payment according to the sub-ledgers (e.g., buckets). Prioritizing the payments according to the sub-ledgers may be a part of a default setting. As shown, for example, the processing circuit can traverse each respective sub-ledger to satisfy the minimum payment amount for the ledger. If the value is greater than the minimum payment amount, the processing circuit can follow a similar (or different) sequence to allocate the excess portions of the value to various types of exchanges within each sub-ledger.

For example, the processing circuit can receive a value for allocation. According to the setting by the user, the processing circuit can determine to allocate portions of the payment according to the types of exchange across the various sub-ledgers by prioritizing the sub-ledgers (e.g., allocate portions of the payment to the types of exchange in each sub-ledger before proceeding to the next sub-ledger). As shown in a first sequence 1400, the processing circuit can allocate portions of the value according to an order of the sub-ledgers and the types of exchange. The processing circuit can allocate the payment using the first sequence 1400 for up to a minimum payment amount. In this case, the ordering of the sub-ledgers can be sub-ledger 1, sub-ledger 2, and sub-ledger 3. The ordering of the types of exchange in the first sequence 1400 can be interest-charges, interest-free-fee, abated-swipe, interest-bearing-past-fee, interest-bearing-fee, swipe, and other-interest-bearing. The ordering of the types of exchange and/or the sub-ledgers can be configured by the user via a setting. According to the ordering of the first sequence 1400, the processing circuit can allocate at least a portion of the value to the various types of exchange in a respective sub-ledger prior to proceeding to another sub-ledger, for example.

In some implementations, the processing circuit can complete the allocation of the value using the first sequence 1400 if the value is less than or equal to the minimum payment amount. Otherwise, if the value is greater than the minimum payment amount (e.g., there is an excess portion of the value), the processing circuit can allocate the excess portion of the value according to a second sequence 1402.

In further example, the second sequence 1402 can be configured by the user. In some cases, the second sequence 1402 can include similar types of exchange ordering and/or the sub-ledger ordering as the first sequence 1400. In some other cases (e.g., in this example), the ordering of the types of exchange and/or the sub-ledger ordering for the second sequence 1402 can be different from the first sequence 1400 according to the setting. In this case, the ordering of the sub-ledgers can be sub-ledger 2, sub-ledger 3, and sub-ledger 1. The ordering of the types of exchange in the second sequence 1402 can be interest-bearing-fee, swipe, abated-swipe, interest-bearing-past-fee, interest-charges, interestfree-fee, and other-interest-bearing. According to the ordering of the second sequence 1402, the processing circuit can allocate the excess portion of the value to the various types of exchange in each respective sub-ledgers before proceeding to allocate the excess portion in another sub-ledger.

In some implementations, the processing circuit can receive a setting from the user to have payments be applied in the opposite order, such as from the least expensive sub-ledger to the most expensive sub-ledger. In this case, the processing circuit can allocate portions of the value starting at the least prioritized sub-ledger (e.g., 0% interest loan sub-ledger) before starting to allocate in the relatively higher prioritized sub-ledger (e.g., X % interest loan sub-ledger), for example.

Figure 15A:
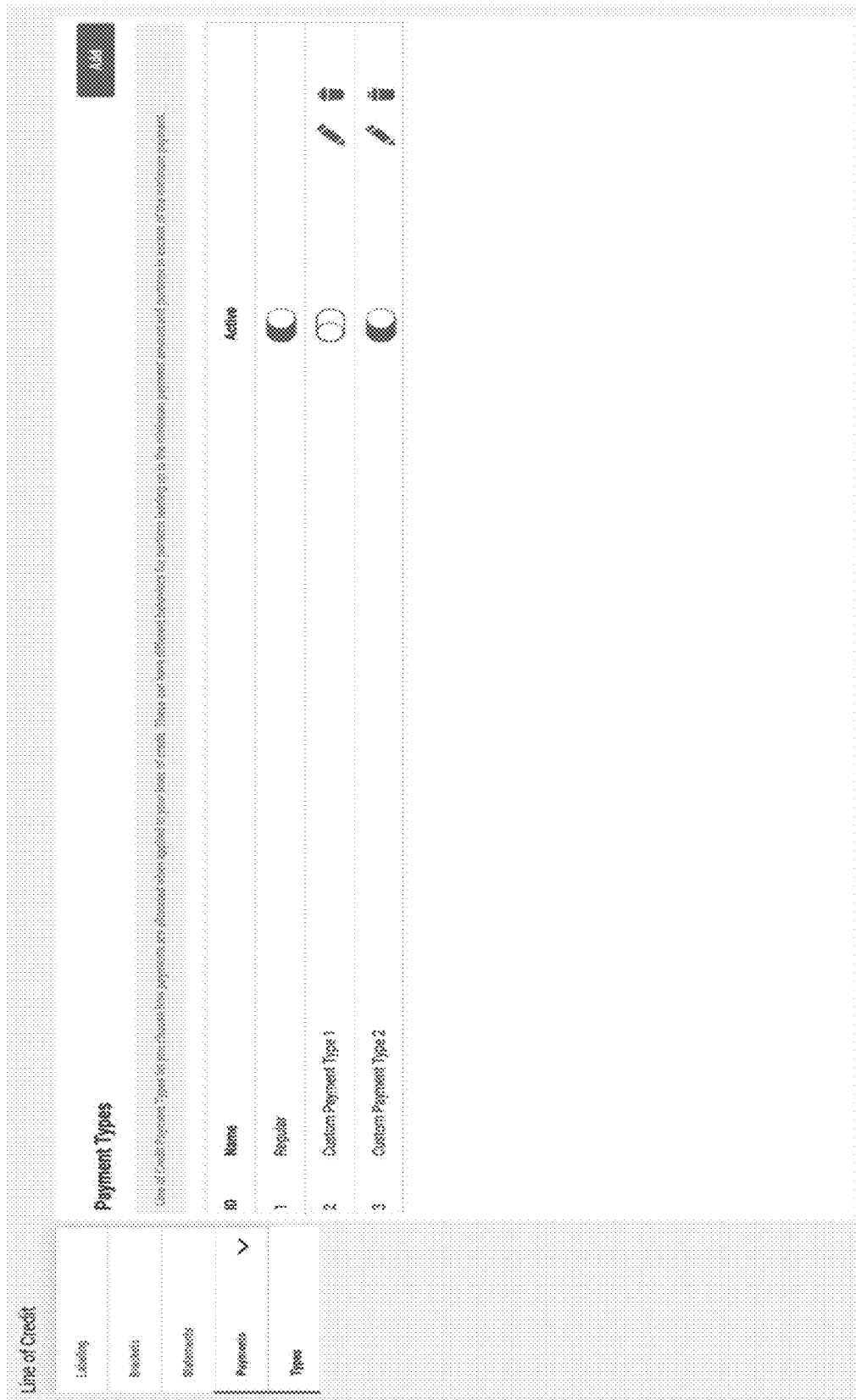

Referring to FIGS. 15A-D, depicted are example user interfaces 1502-1512 of a computing device for adjusting the payment allocation sequence, according to some implementations. FIG. 15A can include a user interface 1500 for setting the payment types. FIG. 15B can include a user interface 1502 for adding or editing the payment type, and how to allocate the payment. As shown, the sequence for allocating the payment can be different between allocating for a minimum payment amount (e.g., how a payment is allocated to meet a minimum payment amount) and an excess amount (e.g., how a payment is allocated after meeting a minimum payment amount).

Figure 15C:
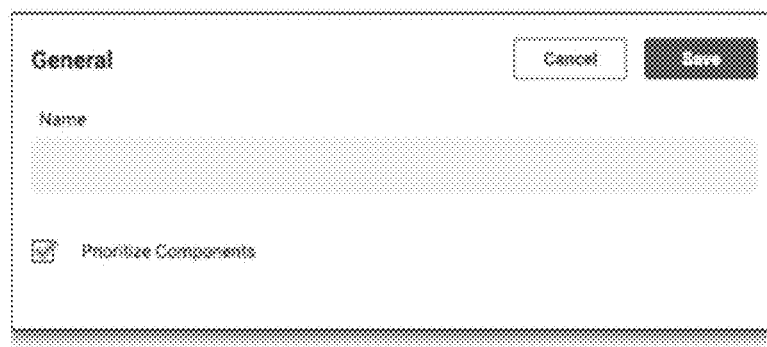
Figure 15C:
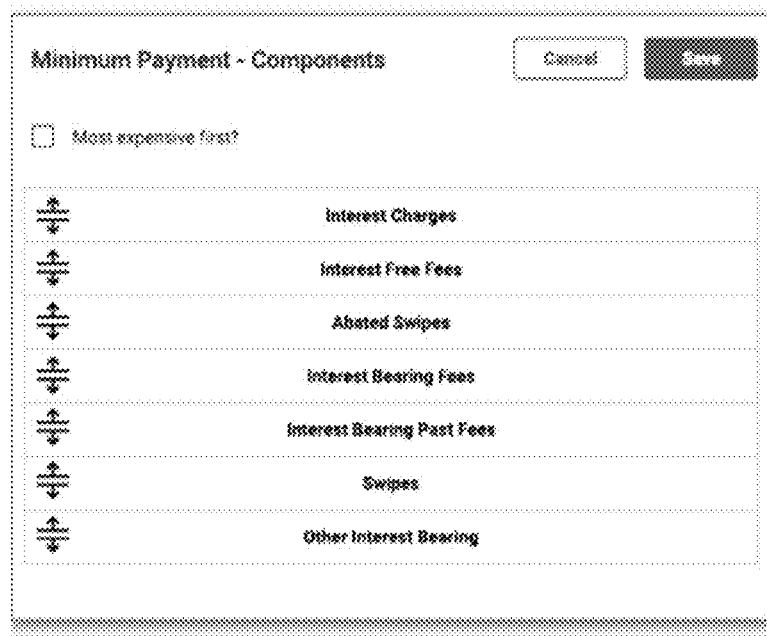
Figure 15C:
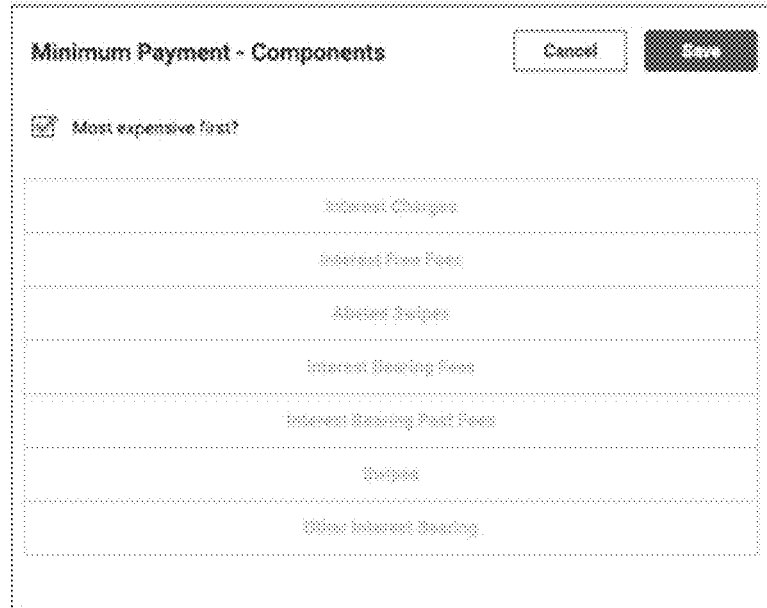

FIG. 15C can include user interfaces 1504-1508 for configuring the order of allocating the payment (e.g., when allocating for the minimum payment amount). For example, the user interface 1504 indicates that the user prioritizes components (e.g., allocating according to the types of exchange). In this example, the processing circuit can prioritize each respective type of exchange across the sub-ledgers before allocating a portion of the value to another type of exchange across the sub-ledgers. The user interface 1506 can include an order for prioritization of the types of exchange. The user interface 1508 can indicate a selection of "most expensive first", indicative of prioritizing the types of exchange according to the highest amount due for each respective type of exchange.

FIG. 15D can include user interfaces 1510-1512 for configuring the order of allocating the payment without prioritizing the components (e.g., prioritize the sub-ledgers instead when allocating for the minimum payment amount). In this example, the processing circuit can prioritize each respective sub-ledger by allocating portions of the value across different types of exchange in a particular sub-ledger before allocating remaining portions to other sub-ledgers. Similarly, to the user interface 1506, the user interface 1510 can include an order for prioritization of the types of exchange. Similar, to the user interface 1508, the user interface 1512 can include a selection of "most expensive first", indicative of prioritizing the types of exchange according to the highest amount due for each respective type of exchange.

Some example implementations, according to the present disclosure, are now described.

Some implementations relate to a system to update sub-ledgers of a capacity plan based on exchange types. The system can include a communication network interface to interface with a communication network, a memory, and one or more processors. The memory can store a ledger to broadcast exchanges associated with the capacity plan. The ledger can include a plurality of sub-ledgers and priority values for the plurality of sub-ledgers. Each exchange of the ledger can be broadcasted within a sub-ledger of the plurality of sub-ledgers and can include a stored association with a type of exchange and an exchange value. The one or more processors can receive, via the communication network interface from a computing device, a request to update the capacity plan, the request comprising a value. Responsive to receiving the request, the one or more processors can allocate a portion of the value to each of one or more of the plurality of sub-ledgers according to the priority values of the plurality of sub-ledgers. For each sub-ledger allocated the portion of the value, the one or more processors can update the exchange values of the exchanges broadcasted in the sub-ledger with the portion of the value based on the types of exchange of the exchanges broadcasted in the sub-ledger.

In some implementations, the one or more processors can allocate the portions of the value to the one or more sub-ledgers by allocating at least one of a predetermined percentage of the value or a predetermined amount of the value to each of the one or more sub-ledgers. In some implementations, the memory can store a different priority value for each type of exchange associated with the sub-ledger of the one or more sub-ledgers, the different priority values indicating an order to update the exchanges broadcasted in the sub-ledger.

In some implementations, the memory can store a first link between the plurality of sub-ledgers and the ledger, and a second link between a sub-ledger identifier of a first sub-ledger of the one or more sub-ledgers and a priority value. The one or more processors can identify a first priority value of the first sub-ledger. The one or more processors can compute the portion of the value for the first sub-ledger according to the first priority value. The one or more processors can identify the exchanges broadcasted in the first sub-ledger based on the first link and the second link. The one or more processors can update the identified exchanges broadcasted in the sub-ledger according to the computed portion of the value.

In some implementations, the memory can store a third link between the computed portion of the value for the first sub-ledger and the sub-ledger identifier of the first sub-ledger. In some implementations, the one or more processors can update the exchange value of the exchange broadcasted in the sub-ledger by reducing the portion of the value for the sub-ledger by the exchange value.

In some implementations, the memory can store a plurality of types of exchange for each of the plurality of sub-ledgers, each type of exchange associated with a different second priority value. The one or more processors can, for a first sub-ledger of the one or more sub-ledgers, update first exchange values of first exchanges broadcasted in the first sub-ledger in a priority order according to the types of exchange of the first exchanges and the second priority values of the first exchanges.

In some implementations, the memory can store a total sub-ledger value corresponding to an aggregate of a plurality of exchange values associated with a sub-ledger of the one or more sub-ledgers. The one or more processors can update, responsive to receiving the request, the total sub-ledger value based on the update to the exchange values of the exchanges broadcasted in the sub-ledger. In some implementations, the one or more processors can update the capacity plan based on a difference between a maximum capacity value associated with the capacity plan and the updated total sub-ledger value.

In some implementations, the one or more processors can assign the priority values to the plurality of sub-ledgers based on one or more configuration parameters associated with each of the plurality of sub-ledgers. In some implementations, the one or more configuration parameters can include at least one of an aggregate value of the exchange values of the exchanges broadcasted in a sub-ledger or a percentage update rate. In some implementations, the one or more processors can update the exchange values of the exchanges broadcasted in a sub-ledger of the one or more sub-ledgers by identifying a minimum update value for an exchange of the exchanges and reducing the exchange value of the exchange by the minimum update value.

In some implementations, the one or more processors can receive, via the communication network interface from a second computing device, an exchange request to update the capacity plan, the exchange request comprising a second exchange value. Responsive to receiving the exchange request, the one or more processors can allocate the second exchange value to one of the plurality of sub-ledgers according to parameters associated with the plurality of sub-ledgers. In some implementations, for the sub-ledger allocated with the second exchange value, the one or more processors can update the sub-ledger to include the second exchange value and an identifier of a type of exchange of the second exchange value.

Some implementations relate to a computer-implemented method for updating sub-ledgers of a capacity plan based on exchange types, the computer-implemented method can include receiving, by one or more processors via a communication network interface from a computing device, a request to update the capacity plan, the request comprising a value; responsive to receiving the request, allocating, by the one or more processors, a portion of the value to each of one or more of a plurality of sub-ledgers according to priority values of the plurality of sub-ledgers, wherein a ledger to broadcast exchanges associated with the capacity plan, the ledger comprising the plurality of sub-ledgers and the priority values, and wherein each exchange of the ledger is broadcasted within a sub-ledger of the plurality of sub-ledgers and has a stored association with a type of exchange and an exchange value; for each sub-ledger allocated the portion of the value, updating, by the one or more processors, the exchange values of the exchanges broadcasted in the sub-ledger with the portion of the value based on the types of exchange of the exchanges broadcasted in the sub-ledger.

In some implementations, the computer-implemented method can include allocating, by the one or more processors, the portions of the value to the one or more sub-ledgers by allocating at least one of a predetermined percentage of the value or a predetermined amount of the value to each of the one or more sub-ledgers.

In some implementations, the computer-implemented method can include identifying, by the one or more processors, a first priority value of a first sub-ledger; computing, by the one or more processors, the portion of the value for the first sub-ledger according to the first priority value; identifying, by the one or more processors, the exchanges broadcasted in the first sub-ledger based on a first link and a second link, the first link between the plurality of sub-ledgers and the ledger, and a second link between a sub-ledger identifier of the first sub-ledger of the one or more sub-ledgers and the first priority value; and updating, by the one or more processors, the identified exchanges broadcasted in the sub-ledger according to the computed portion of the value.

In some implementations, the computer-implemented method can include updating, by the one or more processors, the exchange value of the exchange broadcasted in the sub-ledger by reducing the portion of the value for the sub-ledger by the exchange value.

Some implementations relate to a system to update sub-ledgers of a capacity plan based on exchange types, including a communication network interface to interface with a communication network; a ledger to broadcast exchanges associated with the capacity plan, the ledger comprising a plurality of sub-ledgers and priority values for the plurality of sub-ledgers, wherein each exchange of the ledger is broadcasted within a sub-ledger of the plurality of sub-ledgers and has a stored association with an exchange value; and a processing circuit. The processing circuit can receive, via the communication network interface from a computing device, a request to update the capacity plan, the request comprising a value; responsive to receiving the request, allocate a portion of the value to each of one or more of the plurality of sub-ledgers according to the priority values of the plurality of sub-ledgers; and for each sub-ledger allocated the portion of the value, update the exchange values of the exchanges broadcasted in the sub-ledger with the portion of the value.

In some implementations, the processing circuit can allocate the portions of the value to the one or more sub-ledgers by allocating at least one of a predetermined percentage of the value or a predetermined amount of the value to each of the one or more sub-ledgers.

Some implementations relate to a system for managing a capacity plan. The system can include a communication network interface to interface with a communication network. The system can include a memory to store a plurality of containers corresponding to the capacity plan, each container of the plurality of containers comprising configuration parameters specifying one or more aspects of handling an exchange included in the capacity plan; and a ledger to broadcast exchanges associated with the capacity plan, the ledger comprising a plurality of sub-ledgers and sub-ledger values for the plurality of sub-ledgers, wherein each sub-ledger is associated with a container of the plurality of containers, and wherein each exchange of the ledger is broadcasted within a sub-ledger of the plurality of sub-ledgers. The system can include one or more processors to identify a predetermined capacity plan characteristic value indicating a minimum update per cycle value for the capacity plan or a time period for completion of an update of a value of the capacity plan to zero; calculate an update characteristic value for updating the value of the capacity plan to zero based on the identified predetermined capacity plan characteristic value, the sub-ledger values, and the configuration parameters that correspond with each of the sub-ledgers; and transmit, via the communication network interface, a record comprising the update characteristic value to a computing device.

In some implementations, the one or more processors are to calculate the update characteristic value by calculating a number of update cycles for updating the value of the capacity plan to zero or by calculating a minimum update per cycle, over the time period, for updating the value of the capacity plan to zero.

In some implementations, the predetermined capacity plan characteristic value indicates the minimum update per cycle value. The memory can maintain a counter indicating a number of cycles to update the value of the capacity plan to zero. The one or more processors can iteratively, until determining the value of the capacity plan is zero or below a threshold: identify percentage update rates of the configuration parameters of the plurality of containers; increase the sub-ledger values corresponding to the plurality of containers based on the identified percentage update rates; increase the value of the capacity plan based on the increase to the sub-ledger values; reduce the value of the capacity plan by the minimum update per cycle value; and increment a count of the counter.

In some implementations, the one or more processors can subsequent to determining the value of the capacity plan is zero or below the threshold, transmit, via the communication network interface, the record comprising the incremented count of the counter as the update characteristic value for updating the value of the capacity plan to zero to the computing device.

In some implementations, the one or more processors can increase the sub-ledger values corresponding to the plurality of containers based on the identified percentage update rates by, for each sub-ledger: identifying a percentage update for the sub-ledger; and increasing the sub-ledger value for the sub-ledger based on the identified percentage update for the sub-ledger.

In some implementations, the predetermined capacity plan characteristic value indicates the minimum update per cycle. The one or more processors can identify percentage update rates of the configuration parameters of the plurality of containers; increase the sub-ledger values corresponding to the plurality of containers based on the identified percentage update rates; increase the value of the capacity plan based on the increase to the sub-ledger values; reduce the value of the capacity plan by the minimum update per cycle; calculate a difference between the increase in the value of the capacity plan and the reduction in the value of the capacity plan; compare the difference to a threshold; and responsive to the difference exceeding the threshold, generate a record comprising an error alert.

In some implementations, the predetermined capacity plan characteristic value indicates the time period for completion of an update of the value of the capacity plan to zero. The one or more processors can calculate a minimum update per cycle value based on the value of the capacity plan; calculate, based on the minimum update per cycle value, the sub-ledger values, and the configuration parameters that correspond with each of the sub-ledgers, a number of cycles to update the value of the capacity plan to zero; compare the number of cycles with the time period for completion of the update of the value of the capacity plan to zero; and adjust the minimum update per cycle value responsive to a difference between the number of cycles and the time period for completion of the update of the value of the capacity plan to zero.

In some implementations, the one or more processors can adjust the minimum update per cycle value by increasing the minimum update per cycle responsive to the difference between the number of cycles and the time period for completion of the update of the value of the capacity plan to zero exceeding a threshold.

In some implementations, the memory can maintain a counter indicating a number of cycles to update the value of the capacity plan to zero. The one or more processors can calculate the number of cycles to update the value of the capacity plan to zero by, until determining the value of the capacity plan is zero or below a threshold, identifying percentage update rates of the configuration parameters of the plurality of containers; increasing the sub-ledger values corresponding to the plurality of containers based on the identified percentage update rates; increasing the value of the capacity plan based on the increase to the sub-ledger values; reducing the value of the capacity plan by the predetermined capacity plan characteristic value; and incrementing the counter.

In some implementations, the predetermined capacity plan characteristic value indicates the time period for completion of the update of the value of the capacity plan to zero. The memory can maintain an error counter. The one or more processors can, iteratively, calculate a minimum update per cycle value based on the value of the capacity plan; calculate, based on the minimum update per cycle value, the sub-ledger values, and the configuration parameters that correspond with each of the sub-ledgers, a number of cycles to update the value of the capacity plan to zero; compare the number of cycles with the time period for completion of the update of the value of the capacity plan to zero; adjust the minimum update per cycle value responsive to a difference between the number of cycles and the time period for completion of the update of the value of the capacity plan to zero; increment a count of the error counter; and compare the count of the error counter to a threshold. Responsive to determining the count of the counter exceeds the threshold, The one or more processors can generate a record comprising an indication of an error.

In some implementations, the memory can store a first model configured to calculate a number of cycles to update the value of the capacity plan to zero; and store a second model configured to calculate a minimum update per cycle for updating the value of the capacity plan to zero. The one or more processors can select one of the first model or the second model; and execute the selected first model or second model to calculate the number of cycles to update the value of the capacity plan to zero or to calculate the minimum update per cycle.

In some implementations, the one or more processors are to execute the second model by iteratively executing the first model.

Some aspects relate to a computer-implemented method for managing a capacity plan. The method can include storing, by one or more processors in memory, a plurality of containers corresponding to the capacity plan, each container of the plurality of containers comprising configuration parameters specifying one or more aspects of handling an exchange included in the capacity plan; storing, by the one or more processors in the memory, a ledger to broadcast exchanges associated with the capacity plan, the ledger comprising a plurality of sub-ledgers and sub-ledger values for the plurality of sub-ledgers, wherein each sub-ledger is associated with a container of the plurality of containers, and wherein each exchange of the ledger is broadcasted within a sub-ledger of the plurality of sub-ledgers; identifying, by the one or more processors, a predetermined capacity plan characteristic value indicating a minimum update per cycle value for the capacity plan or a time period for completion of an update of a value of the capacity plan to zero; calculating, by the one or more processors, an update characteristic value for updating the value of the capacity plan to zero based on the identified predetermined capacity plan characteristic value, the sub-ledger values, and the configuration parameters that correspond with each of the sub-ledgers; and transmitting, by the one or more processors, a record comprising the update characteristic value to a computing device.

In some implementations, calculating the update characteristic value includes calculating, by the one or more processors, a number of update cycles for updating the value of the capacity plan to zero; or calculating, by the one or more processors, a minimum update per cycle, over the time period, for updating the value of the capacity plan to zero.

In some implementations, the predetermined capacity plan characteristic value indicates the minimum update per cycle value, the method can include maintaining, by the one or more processors, a counter indicating a number of cycles to update the value of the capacity plan to zero; and iteratively, by the one or more processors until determining the value of the capacity plan is zero or below a threshold: identifying, by the one or more processors, percentage update rates of the configuration parameters of the plurality of containers; increasing, by the one or more processors, the sub-ledger values corresponding to the plurality of containers based on the identified percentage update rates; increasing, by the one or more processors, the value of the capacity plan based on the increase to the sub-ledger values; reducing, by the one or more processors, the value of the capacity plan by the minimum update per cycle value; and incrementing, by the one or more processors, a count of the counter.

In some implementations, the method includes subsequent to determining the value of the capacity plan is zero or below the threshold, transmitting, by the one or more processors, the record comprising the incremented count of the counter as the update characteristic value for updating the value of the capacity plan to zero to the computing device.

In some implementations, increasing the sub-ledger values corresponding to the plurality of containers based on the identified percentage update rates includes, for each sub-ledger: identifying, by the one or more processors, a percentage update for the sub-ledger; and increasing, by the one or more processors, the sub-ledger value for the sub-ledger based on the identified percentage update for the sub-ledger.

In some implementations, the predetermined capacity plan characteristic value indicates the minimum update per cycle. The method can include identifying, by the one or more processors, percentage update rates of the configuration parameters of the plurality of containers; increasing, by the one or more processors, the sub-ledger values corresponding to the plurality of containers based on the identified percentage update rates; increasing, by the one or more processors, the value of the capacity plan based on the increase to the sub-ledger values; reducing, by the one or more processors, the value of the capacity plan by the minimum update per cycle; calculating, by the one or more processors, a difference between the increase in the value of the capacity plan and the reduction in the value of the capacity plan; comparing, by the one or more processors, the difference to a threshold; and responsive to the difference exceeding the threshold, generating, by the one or more processors, a record comprising an error alert.

Some aspects relate to one or more non-transitory computer-readable storage media having instructions stored thereon that, when executed by at least one processing circuit, cause the at least one processing circuit to store, in memory, a plurality of containers corresponding to the capacity plan, each container of the plurality of containers comprising configuration parameters specifying one or more aspects of handling an exchange included in the capacity plan; store, in the memory, a ledger to broadcast exchanges associated with the capacity plan, the ledger comprising a plurality of sub-ledgers and sub-ledger values for the plurality of sub-ledgers, wherein each sub-ledger is associated with a container of the plurality of containers, and wherein each exchange of the ledger is broadcasted within a sub-ledger of the plurality of sub-ledgers; identify a predetermined capacity plan characteristic value indicating a minimum update per cycle value for the capacity plan or a time period for completion of an update of a value of the capacity plan to zero; calculate an update characteristic value for updating the value of the capacity plan to zero based on the identified predetermined capacity plan characteristic value, the sub-ledger values, and the configuration parameters that correspond with each of the sub-ledgers; and transmit a record comprising the update characteristic value to a computing device.

In some implementations, the instructions cause the at least one processing circuit to calculate a number of update cycles for updating the value of the capacity plan to zero; or calculate a minimum update per cycle, over the time period, for updating the value of the capacity plan to zero.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented and/or arranged in combination in a single implementation. Conversely, various features that are described in the context of a single implementation can also be implemented and arranged in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative implementations described under other headings; headings, where provided, are included solely for the purpose of readability, and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations, implementations, illustrative embodiments, and embodiments, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, arrangements, elements, or acts of the systems and methods herein referred to in the singular may also embrace implementations including a plurality of these elements, and any references in plural to any implementation, arrangement, element, or act herein may also embrace implementations including only a single element. References in the singular or plural form are not intended to limit the presently disclosed systems or methods, or their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

It should be understood that no claim element herein is to be construed under the provisions of 35 U.S.C. § 112(f) unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components, including, but not limited to, processing circuitry, network interfaces, peripheral devices, input devices, output devices, and sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

What is claimed is:

1. A system for managing a capacity plan, comprising:
a communication network interface to interface with a communication network;
a memory to store:
a plurality of container data structures corresponding to the capacity plan, each container data structure of the plurality of container data structures comprising configuration parameters specifying one or more aspects of updating exchanges included in the capacity plan; and
a ledger data structure to broadcast exchanges associated with the capacity plan, the ledger data structure comprising a plurality of sub-ledger data structures and sub-ledger values for the plurality of sub-ledger data structures, wherein each sub-ledger data structure is linked with a different container data structure of the plurality of container data structures, and wherein each exchange of the ledger data structure is broadcasted within a sub-ledger data structure of the plurality of sub-ledger data structures; and
one or more processors to:
identify a predetermined capacity plan characteristic value indicating a minimum update per cycle value for the capacity plan or a time period for completion of an update of a value of the capacity plan to zero;
calculate an update characteristic value for updating the value of the capacity plan to zero based on the identified predetermined capacity plan characteristic value by, for each of the plurality of sub-ledger data structures:
identifying a configuration parameter for the sub-ledger data structure from a container data structure using a link between the sub-ledger data structure and the container data structure; and
iteratively updating a sub-ledger value of the sub-ledger data structure using the configuration parameter for the sub-ledger data structure until the sub-ledger value reaches zero based on the identified predetermined capacity plan; and
transmit, via the communication network interface, a record comprising the update characteristic value to a computing device.

2. The system of claim 1, wherein the one or more processors are to calculate the update characteristic value by calculating a number of update cycles for updating the value of the capacity plan to zero or by calculating a minimum update per cycle, over the time period, for updating the value of the capacity plan to zero.

3. The system of claim 1, wherein the predetermined capacity plan characteristic value indicates the minimum update per cycle value, wherein the memory is to:
maintain a counter indicating a number of cycles to update the value of the capacity plan to zero; and
wherein the one or more processors are to:
iteratively, until determining the value of the capacity plan is zero or below a threshold:
identify percentage update rates of the configuration parameters of the plurality of container data structures;
increase the sub-ledger values corresponding to the plurality of container data structures based on the identified percentage update rates;
increase the value of the capacity plan based on the increase to the sub-ledger values;
reduce the value of the capacity plan by the minimum update per cycle value; and
increment a count of the counter.

4. The system of claim 3, wherein the one or more processors are to:
subsequent to determining the value of the capacity plan is zero or below the threshold, transmit, via the communication network interface, the record comprising the incremented count of the counter as the update characteristic value for updating the value of the capacity plan to zero to the computing device.

5. The system of claim 3, wherein the one or more processors are to increase the sub-ledger values corresponding to the plurality of container data structures based on the identified percentage update rates by, for each sub-ledger data structure:
identifying a percentage update for the sub-ledger data structure; and
increasing the sub-ledger value for the sub-ledger data structure based on the identified percentage update for the sub-ledger data structure.

6. The system of claim 1, wherein the predetermined capacity plan characteristic value indicates the minimum update per cycle, and wherein the one or more processors are to:
identify percentage update rates of the configuration parameters of the plurality of container data structures;

increase the sub-ledger values corresponding to the plurality of container data structures based on the identified percentage update rates;
increase the value of the capacity plan based on the increase to the sub-ledger values;
reduce the value of the capacity plan by the minimum update per cycle;
calculate a difference between the increase in the value of the capacity plan and the reduction in the value of the capacity plan;
compare the difference to a threshold; and
responsive to the difference exceeding the threshold, generate a record comprising an error alert.

7. The system of claim 1, wherein the predetermined capacity plan characteristic value indicates the time period for completion of an update of the value of the capacity plan to zero, wherein the one or more processors are to:
calculate a minimum update per cycle value based on the value of the capacity plan;
calculate, based on the minimum update per cycle value, the sub-ledger values, and the configuration parameters that correspond with each of the sub-ledger data structures, a number of cycles to update the value of the capacity plan to zero;
compare the number of cycles with the time period for completion of the update of the value of the capacity plan to zero; and
adjust the minimum update per cycle value responsive to a difference between the number of cycles and the time period for completion of the update of the value of the capacity plan to zero.

8. The system of claim 7, wherein the one or more processors are to adjust the minimum update per cycle value by:
increasing the minimum update per cycle responsive to the difference between the number of cycles and the time period for completion of the update of the value of the capacity plan to zero exceeding a threshold.

9. The system of claim 7, wherein the memory is to:
maintain a counter indicating a number of cycles to update the value of the capacity plan to zero; and
wherein the one or more processors are to calculate the number of cycles to update the value of the capacity plan to zero by, until determining the value of the capacity plan is zero or below a threshold:
identifying percentage update rates of the configuration parameters of the plurality of container data structures;
increasing the sub-ledger values corresponding to the plurality of container data structures based on the identified percentage update rates;
increasing the value of the capacity plan based on the increase to the sub-ledger values;
reducing the value of the capacity plan by the predetermined capacity plan characteristic value; and
incrementing the counter.

10. The system of claim 1, wherein the predetermined capacity plan characteristic value indicates the time period for completion of the update of the value of the capacity plan to zero, wherein the memory is to:
maintain an error counter; and
wherein the one or more processors are to:
iteratively:
calculate a minimum update per cycle value based on the value of the capacity plan;
calculate, based on the minimum update per cycle value, the sub-ledger values, and the configuration parameters that correspond with each of the sub-ledger data structures, a number of cycles to update the value of the capacity plan to zero;
compare the number of cycles with the time period for completion of the update of the value of the capacity plan to zero;
adjust the minimum update per cycle value responsive to a difference between the number of cycles and the time period for completion of the update of the value of the capacity plan to zero;
increment a count of the error counter; and
compare the count of the error counter to a threshold; and
responsive to determining the count of the counter exceeds the threshold, generate a record comprising an indication of an error.

11. The system of claim 1, wherein the memory is to:
store a first model to calculate a number of cycles to update the value of the capacity plan to zero; and
store a second model to calculate a minimum update per cycle for updating the value of the capacity plan to zero; and
wherein the one or more processors are to:
select one of the first model or the second model; and
execute the selected first model or second model to calculate the number of cycles to update the value of the capacity plan to zero or to calculate the minimum update per cycle.

12. The system of claim 11, wherein the one or more processors are to execute the second model by iteratively executing the first model.

13. A computer-implemented method for managing a capacity plan, comprising:
storing, by one or more processors in memory, a plurality of container data structures corresponding to the capacity plan, each container data structure of the plurality of container data structures comprising configuration parameters specifying one or more aspects of updating an exchange included in the capacity plan;
storing, by the one or more processors in the memory, a ledger data structure to broadcast exchanges associated with the capacity plan, the ledger comprising a plurality of sub-ledger data structures and sub-ledger values for the plurality of sub-ledger data structures, wherein each sub-ledger data structure is associated with a container data structure of the plurality of container data structures, and wherein each exchange of the ledger data structure is broadcasted within a sub-ledger data structure of the plurality of sub-ledger data structures;
identifying, by the one or more processors, a predetermined capacity plan characteristic value indicating a minimum update per cycle value for the capacity plan or a time period for completion of an update of a value of the capacity plan to zero;
calculating, by the one or more processors, an update characteristic value for updating the value of the capacity plan to zero based on the identified predetermined capacity plan characteristic value by, for each of the plurality of sub-ledger data structures:
identifying, by the one or more processors, a configuration parameter for the sub-ledger data structure from a container data structure using a link between the sub-ledger data structure and the container data structure; and
iteratively updating, by the one or more processors, a sub-ledger value of the sub-ledger data structure using the configuration parameter for the sub-ledger data structure until the sub-ledger value reaches zero based on the identified predetermined capacity plan; and transmitting, by the one or more processors, a record comprising the update characteristic value to a computing device.

14. The computer-implemented method of claim 13, wherein calculating the update characteristic value comprises:

calculating, by the one or more processors, a number of update cycles for updating the value of the capacity plan to zero; or calculating, by the one or more processors, a minimum update per cycle, over the time period, for updating the value of the capacity plan to zero.

15. The computer-implemented method of claim 13, wherein the predetermined capacity plan characteristic value indicates the minimum update per cycle value, and the method comprising:

maintaining, by the one or more processors, a counter indicating a number of cycles to update the value of the capacity plan to zero; and iteratively, by the one or more processors until determining the value of the capacity plan is zero or below a threshold:

identifying, by the one or more processors, percentage update rates of the configuration parameters of the plurality of container data structures;

increasing, by the one or more processors, the sub-ledger values corresponding to the plurality of container data structures based on the identified percentage update rates;

increasing, by the one or more processors, the value of the capacity plan based on the increase to the sub-ledger values;

reducing, by the one or more processors, the value of the capacity plan by the minimum update per cycle value; and incrementing, by the one or more processors, a count of the counter.

16. The computer-implemented method of claim 15, comprising:

subsequent to determining the value of the capacity plan is zero or below the threshold, transmitting, by the one or more processors, the record comprising the incremented count of the counter as the update characteristic value for updating the value of the capacity plan to zero to the computing device.

17. The computer-implemented method of claim 15, wherein increasing the sub-ledger values corresponding to the plurality of container data structures based on the identified percentage update rates comprises, for each sub-ledger data structure:

identifying, by the one or more processors, a percentage update for the sub-ledger data structure; and increasing, by the one or more processors, the sub-ledger value for the sub-ledger data structure based on the identified percentage update for the sub-ledger data structure.

18. The computer-implemented method of claim 13, wherein the predetermined capacity plan characteristic value indicates the minimum update per cycle, and the method comprising:

identifying, by the one or more processors, percentage update rates of the configuration parameters of the plurality of container data structures;

increasing, by the one or more processors, the sub-ledger values corresponding to the plurality of container data structures based on the identified percentage update rates;

increasing, by the one or more processors, the value of the capacity plan based on the increase to the sub-ledger values;

reducing, by the one or more processors, the value of the capacity plan by the minimum update per cycle;

calculating, by the one or more processors, a difference between the increase in the value of the capacity plan and the reduction in the value of the capacity plan;

comparing, by the one or more processors, the difference to a threshold; and responsive to the difference exceeding the threshold, generating, by the one or more processors, a record comprising an error alert.

19. One or more non-transitory computer-readable storage media having instructions stored thereon that, when executed by at least one processing circuit, cause the at least one processing circuit to:

store, in memory, a plurality of container data structures corresponding to a capacity plan, each container data structure of the plurality of container data structures comprising configuration parameters specifying one or more aspects of handling an exchange included in the capacity plan;

store, in the memory, a ledger data structure to broadcast exchanges associated with the capacity plan, the ledger data structure comprising a plurality of sub-ledger data structures and sub-ledger values for the plurality of sub-ledger data structures, wherein each sub-ledger data structure is associated with a container data structure of the plurality of container data structures, and wherein each exchange of the ledger data structure is broadcasted within a sub-ledger data structure of the plurality of sub-ledger data structures;

identify a predetermined capacity plan characteristic value indicating a minimum update per cycle value for the capacity plan or a time period for completion of an update of a value of the capacity plan to zero;

calculate an update characteristic value for updating the value of the capacity plan to zero based on the identified predetermined capacity plan characteristic value by, for each of the plurality of sub-ledger data structures:

identifying a configuration parameter for the sub-ledger data structure from a container data structure using a link between the sub-ledger data structure and the container data structure; and iteratively updating a sub-ledger value of the sub-ledger data structure using the configuration parameter for the sub-ledger data structure until the sub-ledger value reaches zero based on the identified predetermined capacity plan; and transmit a record comprising the update characteristic value to a computing device.

20. The one or more non-transitory computer-readable storage media of claim 19, wherein the instructions cause the at least one processing circuit to:

calculate a number of update cycles for updating the value of the capacity plan to zero; or calculate a minimum update per cycle, over the time period, for updating the value of the capacity plan to zero.

* * * * *